US010180593B2

(12) United States Patent
Jang et al.

(10) Patent No.: US 10,180,593 B2
(45) Date of Patent: Jan. 15, 2019

(54) DISPLAY DEVICE

(71) Applicant: SAMSUNG DISPLAY CO., LTD., Yongin-si, Gyeonggi-do (KR)

(72) Inventors: Jae Soo Jang, Suwon-si (KR); Ki Chul Shin, Seongnam-si (KR); Dae Hwan Jang, Seoul (KR)

(73) Assignee: SAMSUNG DISPLAY CO., LTD., Yongin-si, Gyeonggi-do (KR)

(*) Notice: Subject to any disclaimer, the term of this patent is extended or adjusted under 35 U.S.C. 154(b) by 0 days.

(21) Appl. No.: 15/659,983

(22) Filed: Jul. 26, 2017

(65) Prior Publication Data
US 2018/0052361 A1     Feb. 22, 2018

(30) Foreign Application Priority Data
Aug. 18, 2016 (KR) .................. 10-2016-0104787

(51) Int. Cl.
*G02F 1/1335* (2006.01)
*G02F 1/1333* (2006.01)
*G02F 1/1339* (2006.01)

(52) U.S. Cl.
CPC ...... *G02F 1/133528* (2013.01); *G02F 1/1333* (2013.01); *G02F 1/1339* (2013.01); *G02F 2001/133548* (2013.01); *G02F 2201/50* (2013.01)

(58) Field of Classification Search
CPC ............. G02F 1/133528; G02F 1/1339; G02F 2201/50; G02F 2001/133548
See application file for complete search history.

(56) References Cited

U.S. PATENT DOCUMENTS

| 9,335,582 | B2 | 5/2016 | Park et al. |
| 2010/0079706 | A1 | 4/2010 | Kim et al. |
| 2010/0118222 | A1* | 5/2010 | Lee .................. G02F 1/13362 349/40 |

(Continued)

FOREIGN PATENT DOCUMENTS

| JP | 2009-069729 A | 4/2009 |
| JP | 2011-081231 A | 4/2011 |

(Continued)

OTHER PUBLICATIONS

European Search Report dated Jan. 22, 2018, issued by the EPO for European patent application No. 17186677.5.

*Primary Examiner* — Donald Raleigh
(74) *Attorney, Agent, or Firm* — Lee & Morse, P.C.

(57) ABSTRACT

A display device includes a display area and a seal area which surrounds the display area. The display device includes a first display substrate, a second display substrate facing the first display substrate; and a sealant disposed between the first display substrate and the second display substrate, in the seal area. The first display substrate has a first base substrate, a first polarizing element including a plurality of first linear patterns extending along a first direction on the first base substrate, and a first protective layer on the first polarizing element and including a first opening. The sealant covers the first opening. Adjacent first linear patterns are separated from each other along a second direction, intersecting the first direction, by a first gap and the first opening exposes at least one first gap in the seal area.

25 Claims, 41 Drawing Sheets

(56) References Cited

U.S. PATENT DOCUMENTS

| | | | |
|---|---|---|---|
| 2014/0160396 A1* | 6/2014 | Chung | G02F 1/133502 349/62 |
| 2015/0002791 A1* | 1/2015 | Nam | G02B 5/3058 349/96 |
| 2015/0092140 A1* | 4/2015 | Takakuwa | G02B 5/3058 349/96 |
| 2016/0091752 A1 | 3/2016 | Lien et al. | |
| 2016/0131942 A1* | 5/2016 | An | G02F 1/133528 349/42 |
| 2016/0161654 A1* | 6/2016 | Yeo | G02B 5/3058 359/485.05 |
| 2016/0195775 A1* | 7/2016 | Lee | G02F 1/1368 349/43 |
| 2016/0202552 A1* | 7/2016 | Ahn | G02F 1/133528 349/122 |
| 2016/0266295 A1* | 9/2016 | Cho | G02B 5/3058 |

FOREIGN PATENT DOCUMENTS

| | | | | |
|---|---|---|---|---|
| JP | 2011081231 A | * | 4/2011 | G02F 1/1337 |
| KR | 10-2010-0035783 A | | 4/2010 | |
| KR | 10-2014-0140685 A | | 12/2014 | |

\* cited by examiner

DISPLAY DEVICE

CROSS-REFERENCE TO RELATED APPLICATION

Korean Patent Application No. 10-2016-0104787, filed on Aug. 18, 2016, in the Korean Intellectual Property Office, and entitled: "Display Device," is incorporated by reference herein in its entirety.

BACKGROUND

1. Field

Embodiments relate to a display device.

2. Description of the Related Art

Liquid crystal displays (LCDs) are lightweight, thin, and consume low power. Due to these advantages, LCDs are used in a display unit of a television, a computer, a portable terminal, etc. A conventional LCD has two polarizing plates which face each other with a liquid crystal layer interposed between them. In the LCD, the luminance of each pixel is changed by adjusting a voltage applied to the liquid crystal layer.

A conventional polarizing plate is formed by adsorbing dichromatic iodine to a polyvinyl alcohol (PVA) film and then drawing the PVA film in a direction so as to orient molecules in a certain direction. The polarizing plate transmits a polarization component of a polarization direction parallel to a transmission axis and absorbs a polarization component of a polarization direction orthogonal to the transmission axis. The polarizing plate does not have high heat resistance and is degraded by ultraviolet light.

Therefore, as another type of polarizing element, a wire grid polarizer having superior heat resistance is widely known. The wire grid polarizer has a plurality of metallic linear patterns arranged at regular intervals. A polarization component of a polarization direction perpendicular to a direction (lengthwise direction) in which the metallic linear patterns extend transmits through the wire grid polarizer, and a polarization component of a polarization direction parallel to the lengthwise direction of the metallic linear patterns is reflected by the wire grid polarizer. The polarization of the polarization component reflected by the wire grid polarizer is removed by, e.g., a reflective plate of a backlight unit. Then, the polarization component reflected by the wire grid polarizer reenters the wire grid polarizer, thereby improving light efficiency.

A protective layer may additionally be formed on the wire grid polarizer to protect the metallic linear patterns, and a space is formed between each pair of neighboring metallic linear patterns and the protective layer. In addition, gas such as air may exist in the space. In the process of manufacturing a display device, outgassing may occur due to the gas within the space, thus reducing the reliability of the display device.

SUMMARY

One or more embodiments provide a display device. The display device may include a display area and a seal area which surrounds the display area. The display device may include a first display substrate, a second display substrate facing the first display substrate, and a sealant between the first display substrate and the second display substrate in the seal area. The first display substrate may include a first base substrate, a first polarizing element including a plurality of first linear patterns extending in a first direction on the first base substrate, and a first protective layer on the first polarizing element and including a first opening. The sealant covers the first opening. Adjacent first linear patterns are separated from each other along a second direction, intersecting the first direction, by a first gap and the first opening overlaps at least a portions of the first gap in the seal area.

One or more embodiments provide a display device. The display device may include a display area, a seal area which surrounds the display area, and a peripheral area which surrounds the seal area. The display device may include a first display substrate, a second display substrate facing the first display substrate, and a sealant between the first display substrate and the second display substrate, disposed in the seal area. The first display substrate includes a first base substrate, a first polarizing element including a plurality of first linear patterns extending along a first direction on the first base substrate, and a first protective layer on the first polarizing element. The first linear patterns are separated from each other along a second direction, intersecting the first direction, by a first gap and at least one edge of the first polarizing element is in the peripheral area.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
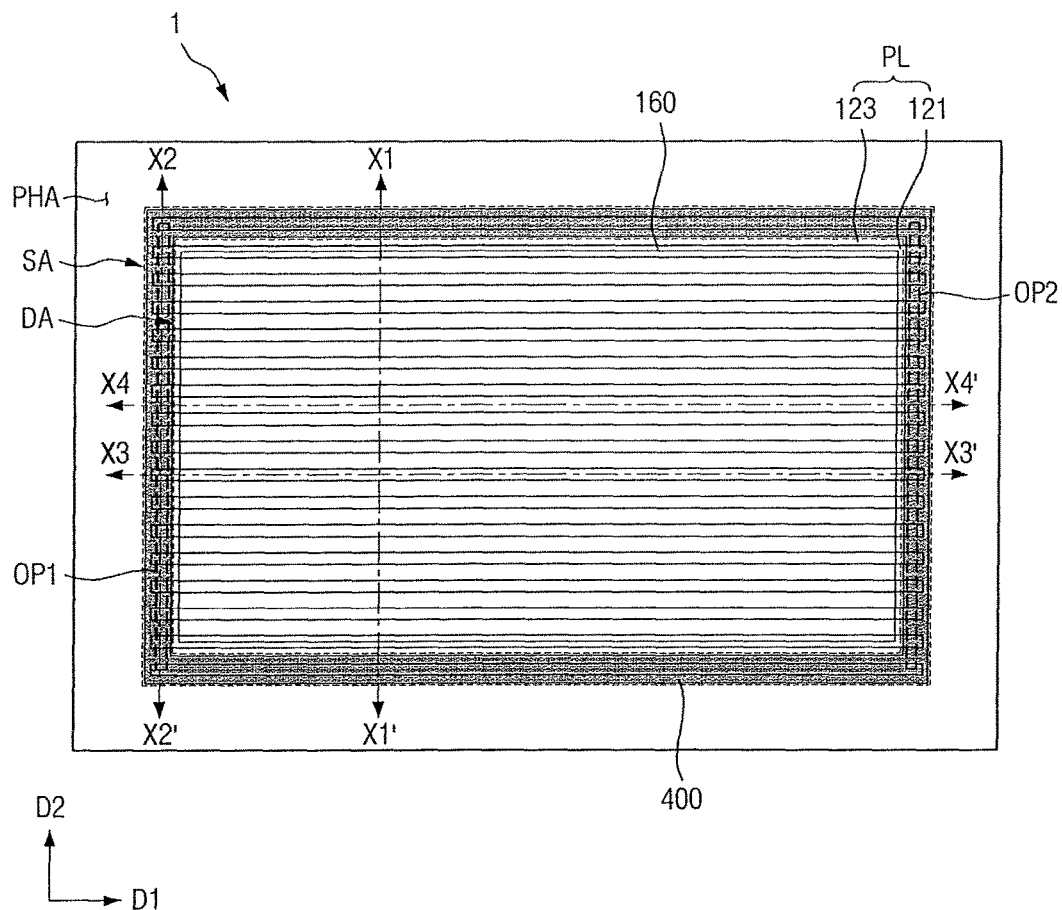
FIG. 1 illustrates a plan view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 2:
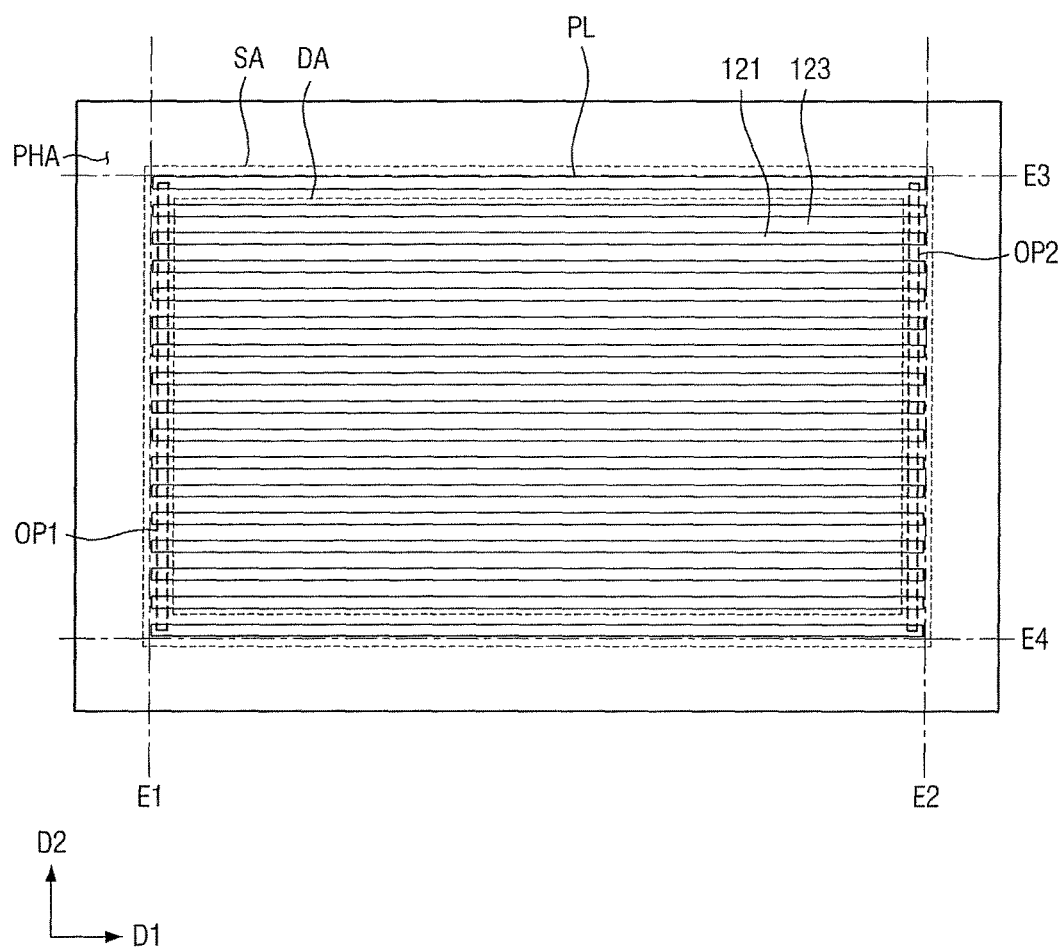
FIG. 2 illustrates a plan view of only a first polarizing element and openings of a first protective layer among components of the display device of FIG. 1.
Figure 3:
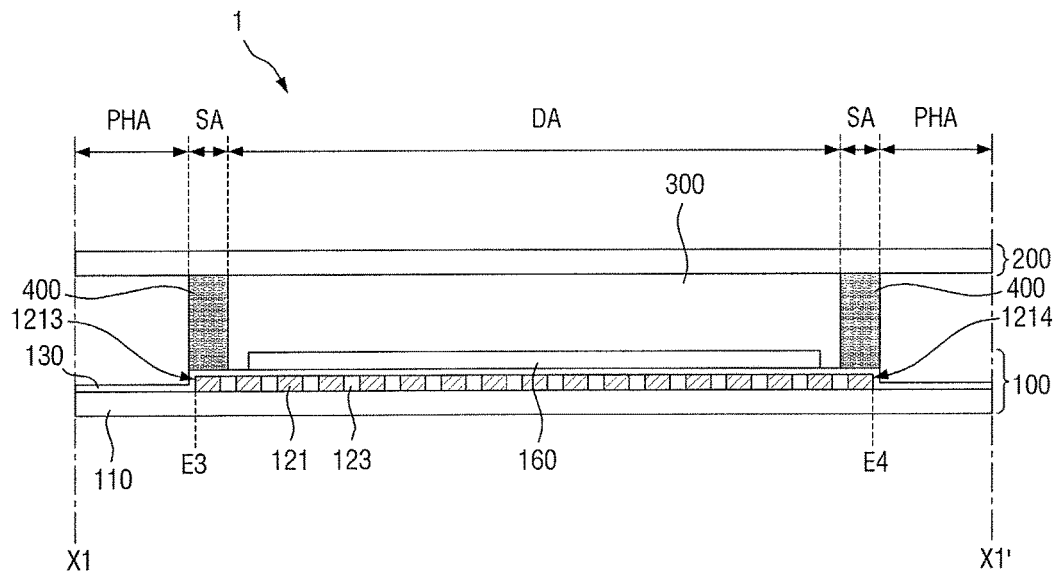
FIG. 3 illustrates a cross-sectional view taken along the line X1-X1' of FIG. 1.
Figure 4:
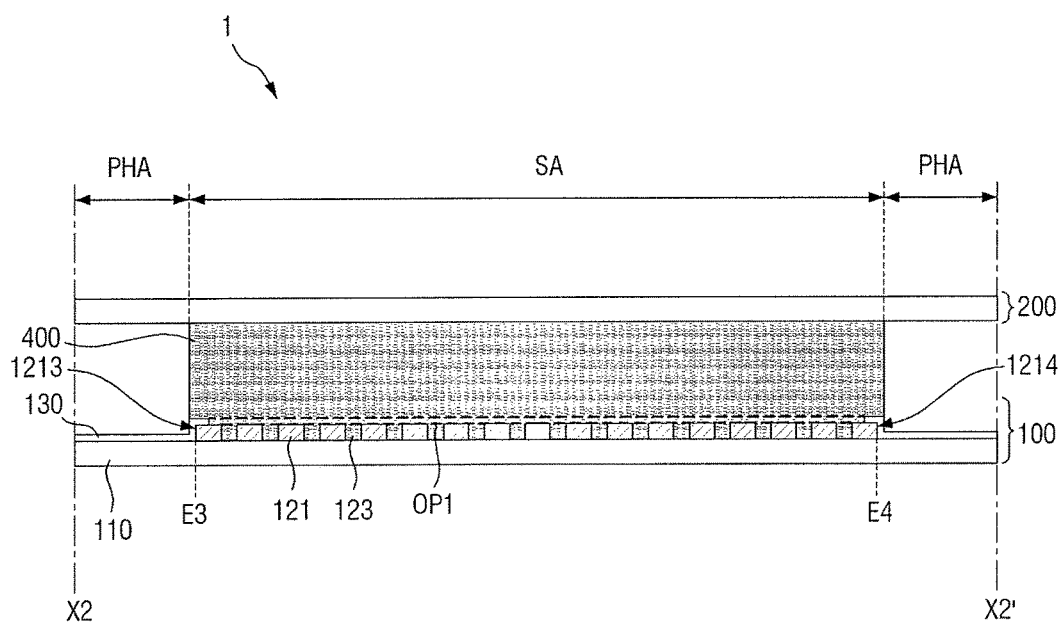
FIG. 4 illustrates a cross-sectional view taken along the line X2-X2' of FIG. 1.
Figure 5:
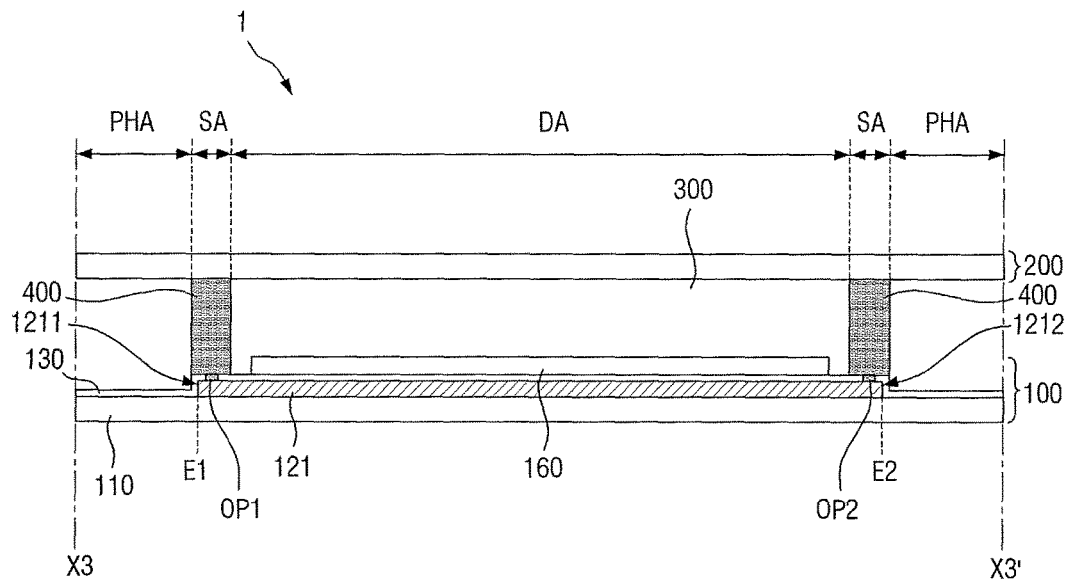
FIG. 5 illustrates a cross-sectional view taken along the line X3-X3' of FIG. 1.
Figure 6:
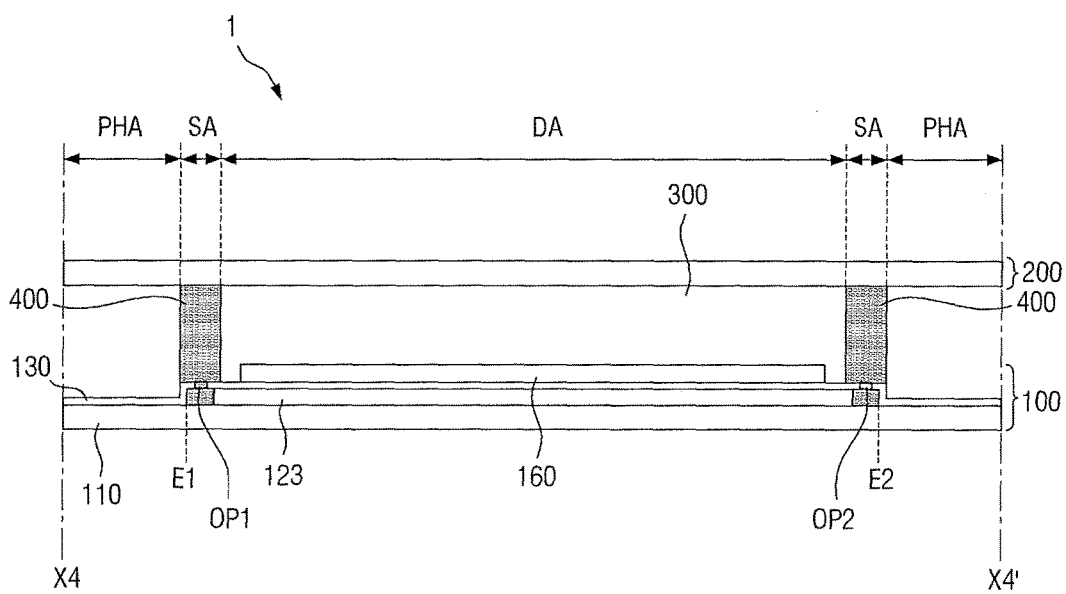
FIG. 6 illustrates a cross-sectional view taken along the line X4-X4' of FIG. 1.

FIG. 1 is a plan view of a display device 1 according to an embodiment. FIG. 2 is a plan view illustrating only a first polarizing element PL and openings OP1 and OP2 of a first protective layer 130 among components of the display device 1 of FIG. 1. FIG. 3 is a cross-sectional view taken along the line X1-X1' of FIG. 1. FIG. 4 is a cross-sectional view taken along the line X2-X2' of FIG. 1. FIG. 5 is a cross-sectional view taken along the line X3-X3' of FIG. 1. FIG. 6 is a cross-sectional view taken along the line X4-X4' of FIG. 1.

Referring to FIGS. 1 through 6, the display device 1 according to the current embodiment includes a display area DA and a seal area SA surrounding the display area DA, and may further include a peripheral area PHA surrounding the seal area SA. The display area DA is an area in which a pixel unit 160, to be described later, is disposed to display an image. The seal area SA is an area in which no image is displayed and a sealant 400, to be described later, is disposed. The peripheral area PHA is an outer part of a non-display area which surrounds the seal area SA.

The display device 1 may be of any type of display device. In an example, the display device 1 may be any one of a twisted nematic (TN) display device, a vertical alignment (VA) display device, a patterned vertical alignment (PVA) display device, an in-plane switching display device, a fringe-field switching (FFS) display device, and a plane-to-line switching (PLS) display device.

The display device 1 may include a first display substrate 100, a second display substrate 200 which faces the first display substrate 100, a liquid crystal layer 300 between the first display substrate 100 and the second display substrate 200, and the sealant 400 between the first display substrate 100 and the second display substrate 200 and located in the seal area SA.

The first display substrate 100 will hereinafter be described. A first base substrate 110 may include a transparent insulating substrate. Here, when the insulating substrate is transparent, it may be 100% transparent or semi-transparent enough to meet a transmittance level specified in design requirements. The first base substrate 110 may be, e.g., a glass substrate, a quartz substrate, or a transparent resin substrate. In addition, the first base substrate 110 may include polymer or plastic having high thermal resistance. In some embodiments, the first base substrate 110 may have flexibility. That is, the first base substrate 110 may be a deformable substrate that can be rolled, folded, bent, etc.

The first polarizing element PL may be located on the first base substrate 110. The first polarizing element PL may be located in the display area DA, and a part of the first polarizing element PL may be located in the seal area SA. Alternatively, the first polarizing element PL may be located in the seal area SA and a part of the first polarizing element PL may also be located in the peripheral area PHA.

The first polarizing element PL may polarize light that is transmitted through the first base substrate 110. The first polarizing element PL may include a plurality of first linear patterns 121 extending in a first direction D1. Each pair of neighboring first linear patterns 121 may be separated from each other by a first gap 123 along a second direction D2 intersecting the first direction D1. The first linear patterns 121 may be arranged with a period shorter than a wavelength of visible light.

Light is typically unpolarized or randomly polarized, e.g., vibrates in more than one plane direction relative to the direction of propogation. Therefore, when randomly polarized light is incident upon the first linear patterns 121, a first portion oscillating in a direction perpendicular to the direction (the first direction D1) in which the first linear patterns 121 extend passes through the first polarizing element PL, and a second portion is reflected by the first linear patterns 121. That is, the first polarizing element PL transmits only P-polarized light and reflects S-polarized light. As a result, only the P-polarized light proceeds upward, e.g., along a third direction D3, orthogonal to the first and second directions, towards the second substrate 200.

The S-polarized light reflected by the first linear patterns 121 may be scattered by a light guide plate (LGP) included in a backlight unit under the first polarizing element PL in the display device 1. After the polarization of the S-polarized light is offset in this way, the light may be reflected again by a reflective plate, e.g., in the backlight unit. As a result, the light may reenter the first polarizing element PL. This process may be repeated. Accordingly, light efficiency can be improved, resulting in reduced power consumption and/or enhance luminance of the display device 1.

The first polarizing element PL may include a first edge E1 and a second edge E2 which are located opposite each other along the direction (i.e., the first direction D1) in which the first linear patterns 121 extend. In addition, the first polarizing element PL may include a third edge E3 and a fourth edge E4 which are located opposite each other along the direction (i.e., the second direction D2) intersecting the direction in which the first linear patterns 121 extend. In the drawings, the first edge E1, the second edge E2, the third edge E3 and the fourth edge E4 form a quadrilateral. However, this is merely an example, and embodiments are not limited to this example.

At least one of the first edge E1 and the second edge E2 of the first polarizing element PL may be located in an area other than the display area DA. For example, at least one of the first edge E1 and the second edge E2 of the first polarizing element PL may be located in the seal area SA. Alternatively, both the first edge E1 and the second edge E2 of the first polarizing element PL may be located in the seal area SA as illustrated in the drawings. Alternatively, although not illustrated in the drawings, at least one of the first edge E1 and the second edge E2 of the first polarizing element PL may be located in the peripheral area PHA. For ease of description, a case where both the first edge E1 and the second edge E2 of the first polarizing element PL are located in the seal area SA will be described below as an example.

In some embodiments, at least one of the third edge E3 and the fourth edge E4 of the first polarizing element PL may be located in an area other than the display area DA. In the drawings, both the third edge E3 and the fourth edge E4 of the first polarizing element PL are located in the seal area SA. However, this is merely an example.

The first linear patterns 121 of the first polarizing element PL may include at least one of aluminum (Al), gold (Au), silver (Ag), copper (Cu), chrome (Cr), iron (Fe), and nickel (Ni). In an example, the first linear patterns 121 may include aluminum or an aluminum alloy having relatively high reflectivity.

A space inside the first gap 123 between each pair of neighboring first linear patterns 121 may be in a vacuum. The first gap 123 will be described in greater detail later.

The first protective layer 130 may be located on the first base substrate 110 and the first polarizing element PL. The first protective layer 130 may include an inorganic insulating material such as silicon nitride (SiNx) or silicon oxide (SiOx). The first protective layer 130 may cover the first polarizing element PL to protect the first polarizing element PL. A part of the first protective layer 130 which is located on the first polarizing element PL may not contact the first base substrate 110. For example, a part of the first protective layer 130 which overlaps the first gap 123 may not contact the first base substrate 110. Accordingly, a space may be defined in the first gap 123 by the first base substrate 110, the first linear patterns 121, and the first protective layer 130.

In some embodiments, the first protective layer 130 may completely cover the first polarizing element PL. More specifically, side surfaces 1211 of the first linear patterns 121 located at the first edge E1 of the first polarizing element PL may contact the first protective layer 130. In addition, side surfaces 1212 of the first linear patterns 121 located at the second edge E2 of the first polarizing element PL may contact the first protective layer 130. Similarly, a side surface 1213 of a first linear pattern 121 located at the third edge E3 of the first polarizing element PL and a side surface 1214 of a first linear pattern 121 located at the fourth edge E4 of the first polarizing element PL may contact the first protective layer 130.

Openings OP1 and OP2 located in the seal area SA that expose the first gaps 123 of the first polarizing element PL may be formed in the first protective layer 130. In an example, a first opening OP1 and a second opening OP2 may be formed in the first protective layer 130 in the seal area SA. The first opening OP1 may be formed adjacent to the first edge E1 of the first polarizing element PL and the second opening OP2 may be formed adjacent to the second edge E2 of the first polarizing element PL.

The first opening OP1 may extend in the second direction D2 intersecting the direction in which the first linear patterns 121 extend. When seen from above, the first opening OP1 may overlap each of the first gaps 123 of the first polarizing elements PL. Like the first opening OP1, the second opening OP2 may extend along the second direction D2 intersecting the direction in which the first linear patterns 121 extend and overlap each of the first gaps 123.

As described above, a space is defined in each of the first gaps 123. In addition, the first protective layer 130 may completely cover the first polarizing element PL. Therefore, without the first and second openings OP1 and OP2, the space within each of the first gaps 123 may be sealed. In the process of manufacturing the display device 1, if the first protective layer 130 which covers the first polarizing element PL is formed after the formation of the first polarizing element PL, gas used in the manufacturing process or air may exist in the sealed space within each of the first gaps 123. Due to the air or gas within each of the first gaps 123, outgassing may occur in the display area DA, possibly resulting in the contamination of the liquid crystal layer 300. In the present embodiment, however, the first opening OP1 and the second opening OP2 are formed in the first protective layer 130 to release the air or gas within each of the first gaps 123 in the process of manufacturing the display device 1. Accordingly, the contamination of the liquid crystal layer 300 due to outgassing may be reduced or prevented.

While both the first opening OP1 and the second opening OP2 are formed in the first protective layer 130 in the drawings, this is merely an example. In some embodiments, one of the first opening OP1 and the second opening OP2 may be omitted.

The pixel unit 160 may be located on the first protective layer 130 in the display area DA. The pixel unit 160 may include a plurality of pixels arranged in a matrix. Each of the pixels may include a switching element, e.g., a thin-film transistor (TFT), and a pixel electrode electrically connected to the TFT. The pixels may be controlled by a driver circuit of the display device 1 to display an image in the display area DA.

The second display substrate 200 may be disposed on the first display substrate 100 to face the first display substrate 100 and separated therefrom along the third direction D3. In some embodiments, the second display substrate 200 may include a common electrode. In some embodiments, the second display substrate 200 may further include a light-blocking layer, an overcoat layer, a color filter, etc.

The liquid crystal layer 300 may be interposed between the first display substrate 100 and the second display substrate 200. The liquid crystal layer 300 includes a plurality of liquid crystal molecules that determine transmittance of incident light by changing their arrangement according to an electric field formed in the liquid crystal layer 300.

The sealant 400 is disposed between the first display substrate 100 and the second display substrate 200 to seal the liquid crystal layer 300. The sealant 400 may be located only in the seal area SA of the display device 1. In other words, the seal area SA of the display device 1 may be defined as an area in which the sealant 400 is disposed. The sealant 400 may be made of a photocurable material or a thermosetting material.

When seen from above, the sealant 400 may overlap the first polarizing element PL. In addition, when seen from above, the first and second openings OP1 and OP2 of the first protective layer 130 may completely overlap, e.g., along the third direction D3, the sealant 400. The sealant 400 may be located on the first protective layer 130 to contact the first protective layer 130. The sealant 400 may cover the first and second openings OP1 and OP2, thereby sealing the first and second openings OP1 and OP2. In other words, the first and second openings OP1 and OP2 may be blocked by the sealant 400.

In some embodiments, part of the sealant 400 may be located in the first and second openings OP1 and OP2. Part of the sealant 400 may be located in the first gaps 123 through the first and second openings OP1 and OP2 to contact the first linear patterns 121 and to further contact the first base substrate 110.

Figure 7:
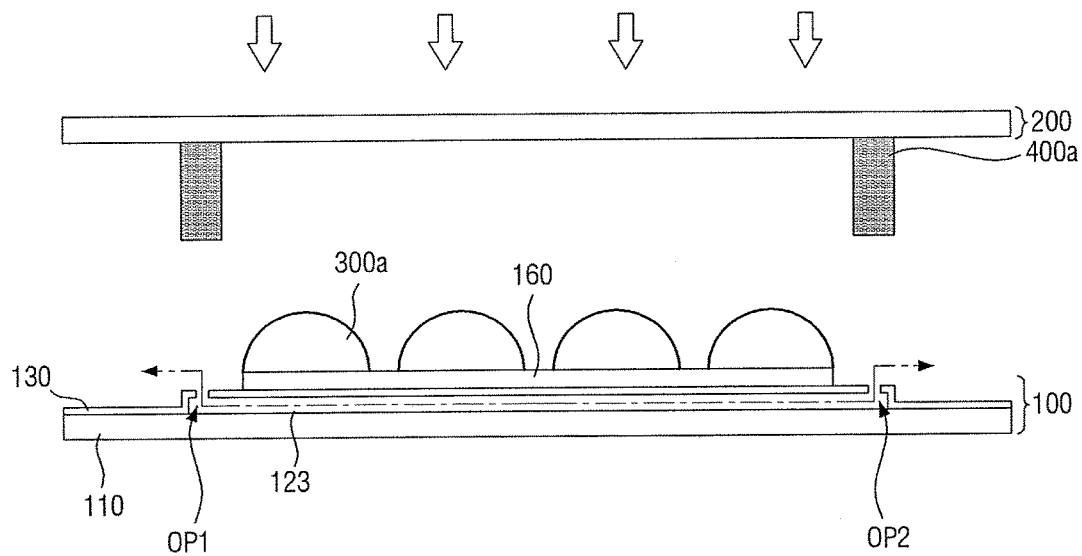
FIGS. 7 and 8 illustrate cross-sectional views of stages in a method of manufacturing a display device based on the structure in FIG. 6.
Figure 8:
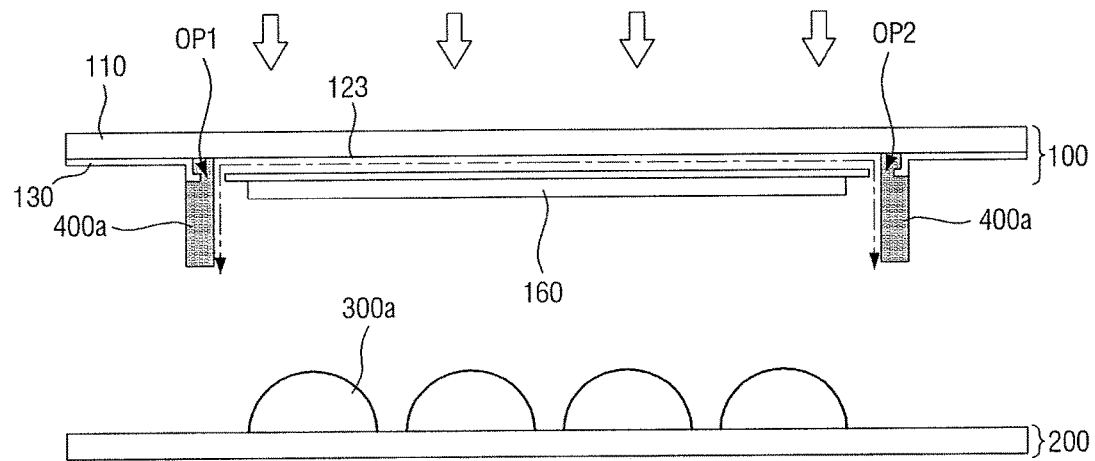

FIGS. 7 and 8 are cross-sectional views illustrating stages in a method of manufacturing a display device based on the structure illustrated in FIG. 6. The cross-sectional views of FIGS. 7 and 8 are based on the structure taken along the line X4-X4' of FIG. 1.

Referring to FIG. 7, liquid crystals 300a are dropped onto the first display substrate 100 in the form of droplets, and a sealing material 400a is coated on a part of a surface of the second display substrate 200 which corresponds to the seal area SA. Then, the second display substrate 200 is placed on the first display substrate 100, and the first display substrate 100 and the second display substrate 200 are bonded together by applying pressure to the second display substrate 200. At this time, the liquid crystals 300a are spread between the first display substrate 100 and the second display substrate 200 by the pressure. Accordingly, the liquid crystal layer 300 (see FIG. 3) is formed.

When the sealing material 400a is made of a thermosetting material, the process of bonding the first display substrate 100 and the second display substrate 200 together may be accomplished by a high-temperature hot press process. In some cases, a high-temperature baking process or a high-temperature curing process may additionally be performed. That is, the first display substrate 100 and the second display substrate 200 may be exposed to high temperature during the bonding process. Therefore, during the process of bonding the first display substrate 100 and the second display substrate 200 together, air or gas trapped within the first gaps 123 may expand due to the high temperature and thus be exposed out of the first protective layer 130. The exposed air or gas can contaminate the liquid crystal layer 300 or affect other components. In other words, outgassing may occur due to the air or gas within the first gaps 123, thereby reducing the reliability of the display device 1.

On the other hand, according to embodiments, bonding the first display substrate 100 and the second display substrate 200 may be performed in a vacuum, e.g., in a vacuum chamber. Since the first and second openings OP1 and OP2, which expose the first gaps 123, are formed in the first protective layer 130, if bonding is performed in a vacuum, the air or gas within the first gaps 123 may be released through the first and second openings OP1 and OP2. Accordingly, the space within each of the first gaps 123 may become a vacuum. In a state where the space within each of the first gaps 123 is maintained in a vacuum, the first display substrate 100 and the second display substrate 200 may be bonded together, and the first and second openings OP1 and OP2 may be sealed by the sealing material 400a or the sealant 400 (see FIG. 3). Therefore, the probability of outgassing due to the gas within the first gaps 123 is reduced. Accordingly, the probability that a defect will occur in the display device 1 in the manufacturing process is reduced, and a display device 1 with improved reliability can be provided.

Alternatively, referring to FIG. 8, liquid crystals 300a may be dropped onto the second display substrate 200, and a sealing material 400a may be coated on a part of a surface of the first display substrate 100 which corresponds to the seal area SA. In this case, the sealing material 400a may be coated to not block the first and second openings OP1 and OP2. Then, the first display substrate 100 may be placed on the second display substrate 200, and the first display substrate 100 and the second display substrate 200 may be bonded together in a vacuum by applying pressure to the first display substrate 100. At this time, the air or gas within the first gaps 123 may be released through the first and second openings OP1 and OP2, and part of the sealing material 400a may be spread by the pressure, thereby sealing the first and second openings OP1 and OP2.

As described above, the process of bonding the first display substrate 100 and the second display substrate 200 may be performed in a vacuum. Accordingly, the space within each of the first gaps 123 may be maintained in a vacuum. In addition, since the first and second openings OP1 and OP2 of the first protective layer 130 are sealed by the sealing material 400a or the sealant 400 (see FIG. 3), the space within each of the first gaps 123 may be maintained in a vacuum.

Figure 9:
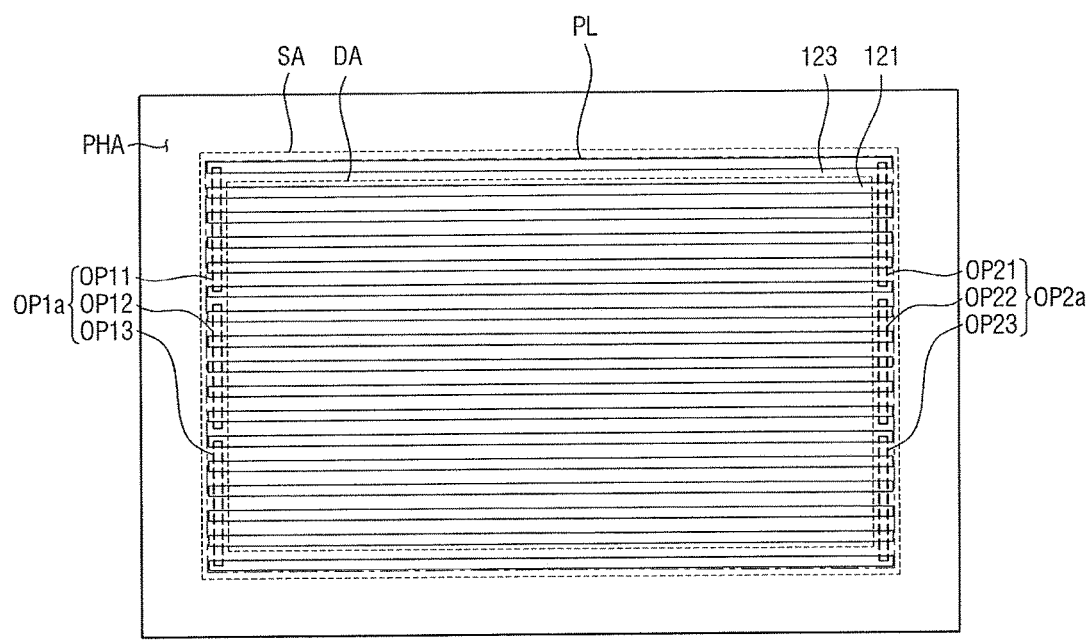
FIG. 9 illustrates a plan view of a modified embodiment of the structure in FIG. 2.
Figure 9:
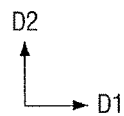

FIG. 9 is a plan view of a modified embodiment of the structure illustrated in FIG. 2, more specifically, illustrates a modified embodiment of the first opening OP1. Referring to FIGS. 2 through 9, unlike the first opening OP1 of FIG. 2, a first opening OP1a of a first protective layer may consist of a plurality of sub-openings (OP11, OP12 and OP13) separated from each other.

For example, the first opening OP1a may include a first sub-opening OP11, a second sub-opening OP12 separated from the first sub-opening OP11, and a third sub-opening OP13 separated from the first sub-opening OP11 and the second sub-opening OP12. The first through third sub-openings OP11 through OP13 may be separated from each other along a direction, e.g., a second direction D2 intersecting a direction in which first linear patterns 121 extend and may be arranged side by side with each other along the second direction D2.

Similarly, unlike the second opening OP2 of FIG. 2, a second opening OP2a of the first protective layer may consist of a plurality of sub-openings OP21 through OP23 separated from each other. The sub-openings OP21 through OP23 may be separated from each other along a direction, e.g., the second direction D2 intersecting the direction in which the first linear patterns 121 extend and may be arranged side by side with each other along the second direction D2.

In the drawing, each of the first opening OP1a and the second opening OP2a includes three sub-openings. However, this is merely an example, and there is no limit to the number of sub-openings.

The display device 1 according to the above-described embodiment includes the first polarizing element PL. Therefore, the display device 1 is thinner than a display device to which a separate polarizing plate is attached. In addition, the probability that outgassing will occur in the process of manufacturing the display device 1 due to gas (such as air) trapped in the first polarizing element PL and that a defect will occur due to the outgassing can be reduced. Accordingly, a display device with improved reliability can be manufactured.

Figure 10:
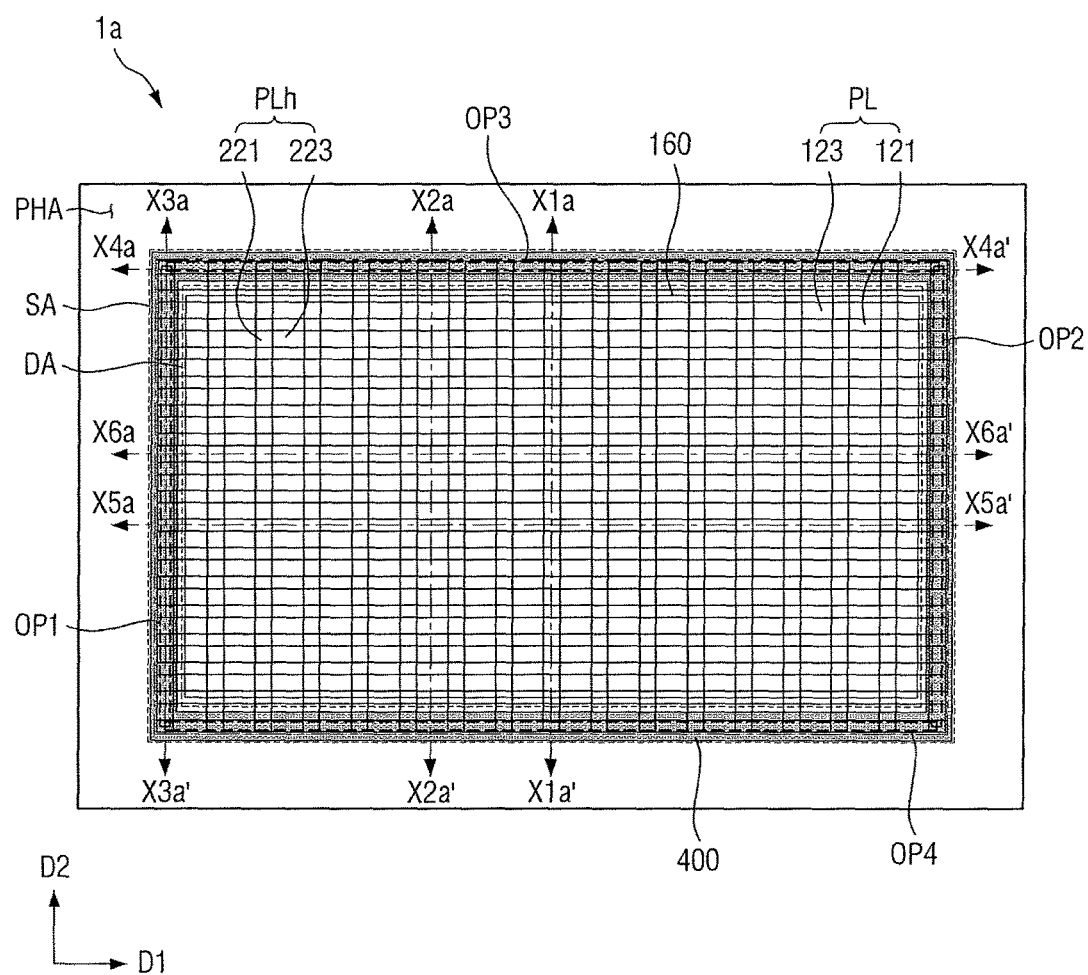
FIG. 10 illustrates a plan view of a display device according to an embodiment.
Figure 11:
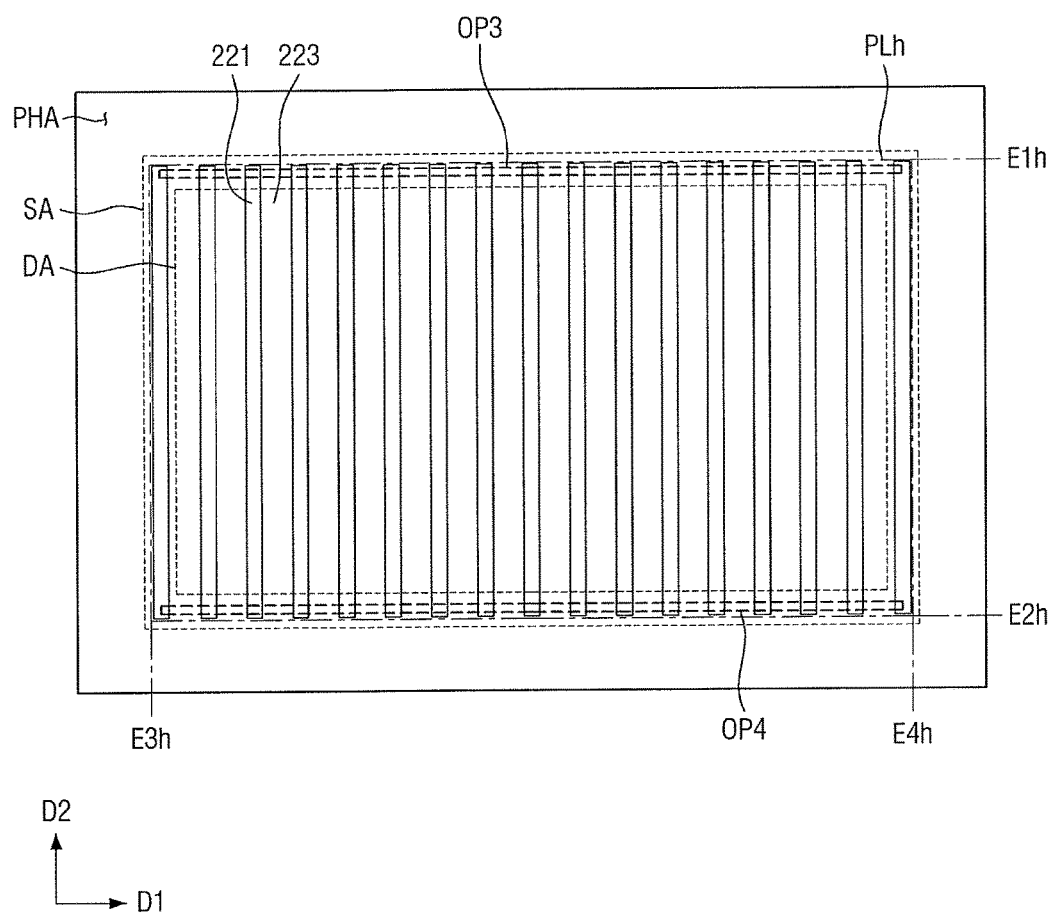
FIG. 11 illustrates a plan view of only a second polarizing element and openings of a second protective layer among components of the display device of FIG. 10.
Figure 12:
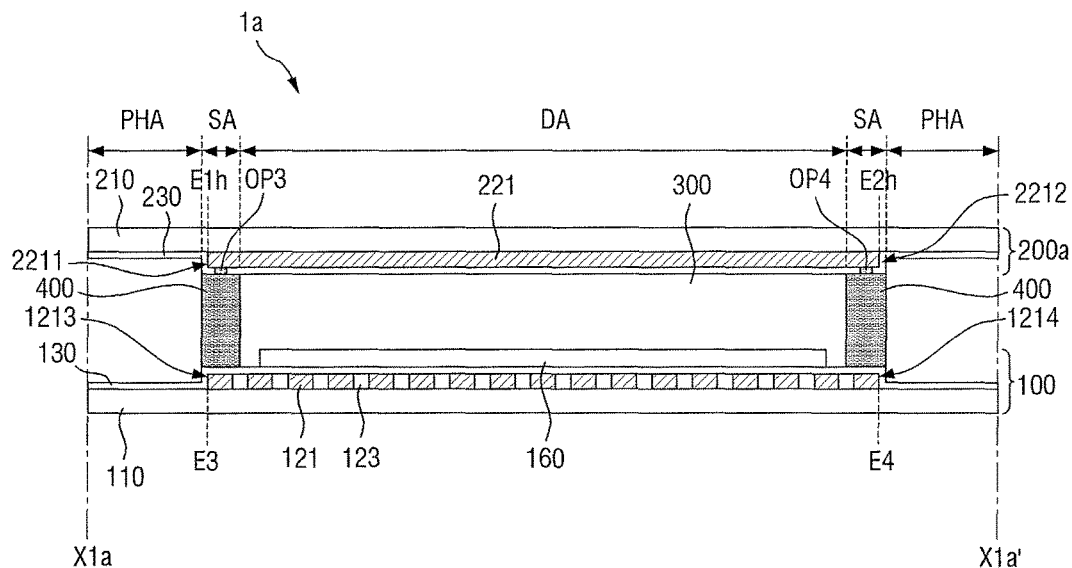
FIG. 12 illustrates a cross-sectional view taken along the line X1a-X1a' of FIG. 10.
Figure 13:
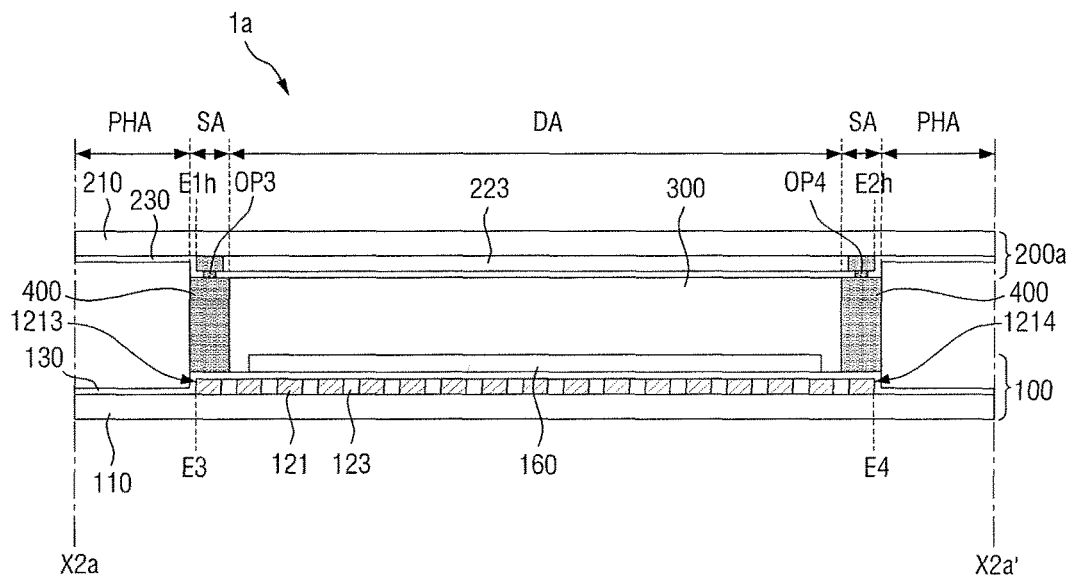
FIG. 13 illustrates a cross-sectional view taken along the line X2a-X2a' of FIG. 10.
Figure 14:
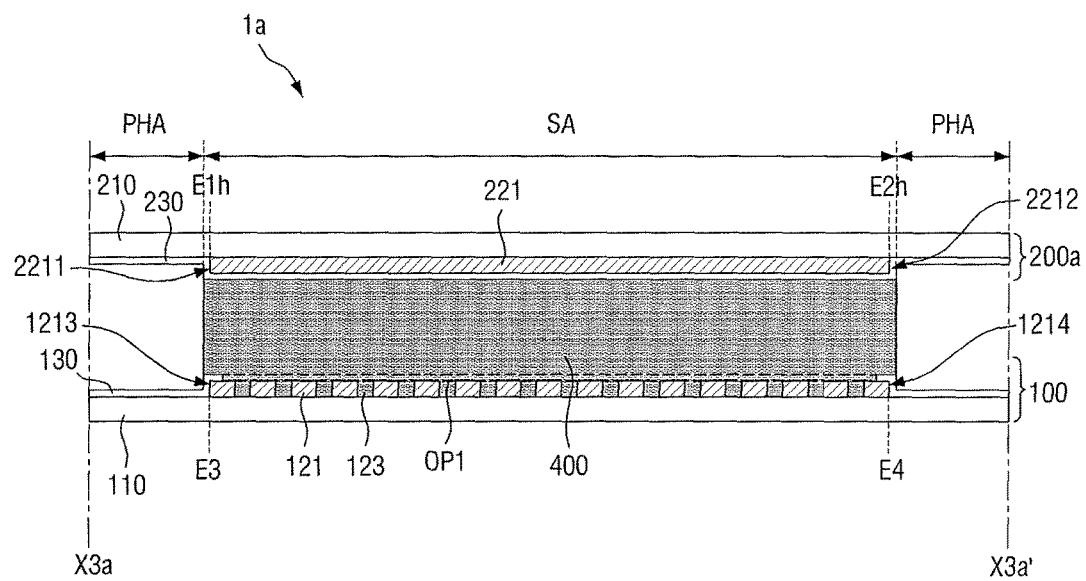
FIG. 14 illustrates a cross-sectional view taken along the line X3a-X3a' of FIG. 10.
Figure 15:
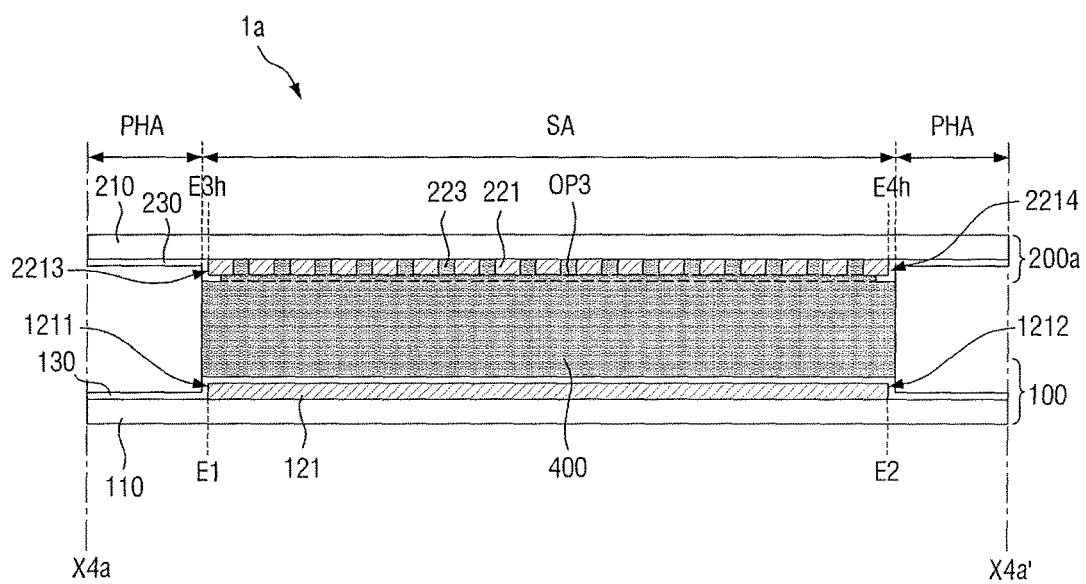
FIG. 15 illustrates a cross-sectional view taken along the line X4a-X4a' of FIG. 10.
Figure 16:
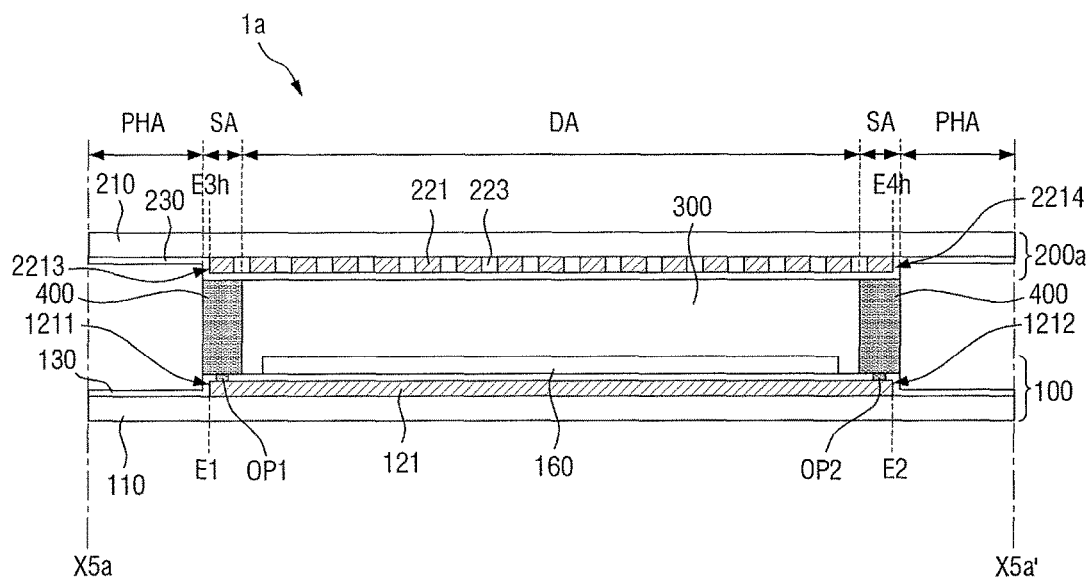
FIG. 16 illustrates a cross-sectional view taken along the line X5a-X5a' of FIG. 10.
Figure 17:
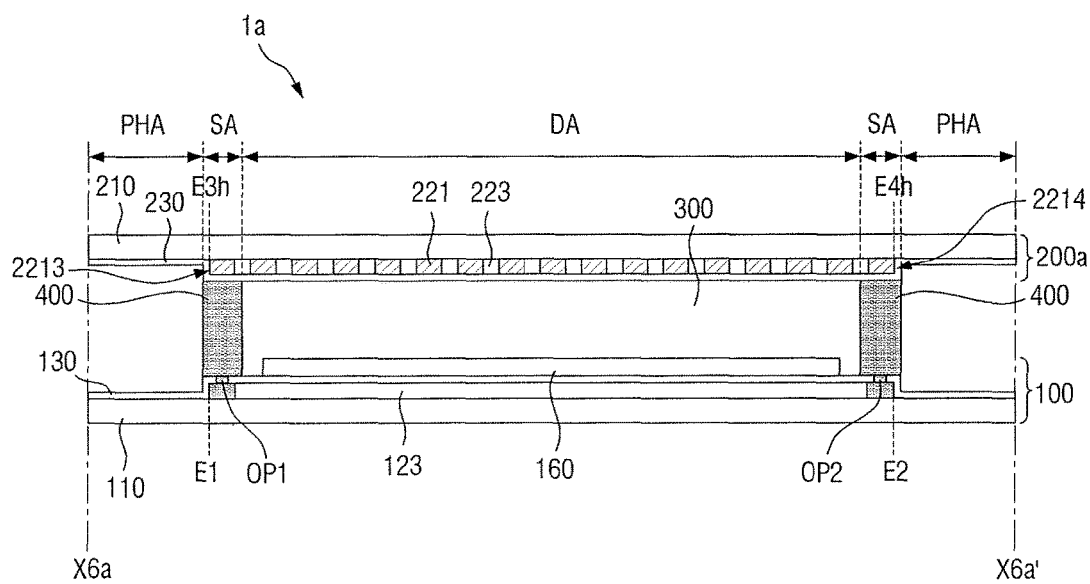
FIG. 17 illustrates a cross-sectional view taken along the line X6a-X6a' of FIG. 10.

FIG. 10 is a plan view of a display device 1a according to an embodiment. FIG. 11 is a plan view illustrating only a second polarizing element PLh and openings OP3 and OP4 of a second protective layer 230 among components of the display device 1a of FIG. 10. FIG. 12 is a cross-sectional view taken along the line X1a-X1a' of FIG. 10. FIG. 13 is a cross-sectional view taken along the line X2a-X2a' of FIG. 10. FIG. 14 is a cross-sectional view taken along the line X3a-X3a' of FIG. 10. FIG. 15 is a cross-sectional view taken along the line X4a-X4a' of FIG. 10. FIG. 16 is a cross-sectional view taken along the line X5a-X5a' of FIG. 10. FIG. 17 is a cross-sectional view taken along the line X6a-X6a' of FIG. 10.

Referring to FIGS. 10 through 17, the display device 1a according to the current embodiment may include the first display substrate 100, a second display substrate 200a which faces the first display substrate 100, the liquid crystal layer 300 which is interposed between the first display substrate 100 and the second display substrate 200a, and a sealant 400 between the first display substrate 100 and the second display substrate 200a and located in a seal area SA.

The biggest difference between the display device 1a according to the current embodiment and the display device 1 described above with reference to FIGS. 1 through 6 is that the second display substrate 200a of the display device 1a includes the second polarizing element PLh and the second protective layer 230. Other components of the display device 1a according to the current embodiment are substantially identical or similar to those of the display device 1 described above with reference to FIGS. 1 through 6. Therefore, the following description will focus on differences between the display device 1a according to the current embodiment and the display device 1 described above with reference to FIGS. 1 through 6.

The second display substrate 200a will hereinafter be described. A second base substrate 210 may include a transparent insulating substrate. The second base substrate 210 may be, e.g., a glass substrate, a quartz substrate or a transparent resin substrate or may include polymer or plastic having high thermal resistance. In some embodiments, the second base substrate 210 may have flexibility.

The second polarizing element PLh may be located on a surface of the second base substrate 210 that faces the first display substrate 100. The second polarizing element PLh may be located in a display area DA, and a part of the second polarizing element PLh may be located in the seal area SA. Alternatively, a part of the second polarizing element PLh may also be located in a peripheral area PHA.

The second polarizing element PLh may include a plurality of second linear patterns 221 extending along a direction. Each pair of neighboring second linear patterns 221 may be separated from each other by a second gap 223 along a direction intersecting the above direction. The second linear patterns 221 may be arranged with a period shorter than a wavelength of visible light. The second linear patterns 221 of the second polarizing element PLh may include at least one of aluminum (Al), gold (Au), silver (Ag), copper (Cu), chrome (Cr), iron (Fe), and nickel (Ni).

In some embodiments, the second linear patterns 221 may extend in a direction (e.g., a second direction D2) intersecting a direction (e.g., a first direction D1) in which first linear patterns 121 extend. In an example, a polarization axis of a first polarizing element PL located under the liquid crystal layer 300 and a polarization axis of the second polarizing element PLh located on the liquid crystal layer 300 may be orthogonal to each other. This is the same as a case where polarization axes of conventional polarizing plates employed under and above the liquid crystal layer 300 are orthogonal to each other. Hereinafter, a case where the second linear patterns 221 extend along the second direction D2 and are separated from each other by the second gap 223 along the first direction D1 will be described as an example.

The second polarizing element PLh may include a first edge E1h and a second edge E2h which are located opposite each other along the direction (i.e., the second direction D2) in which the second linear patterns 221 extend. In addition, the second polarizing element PLh may include a third edge E3h and a fourth edge E4h which are located opposite each other along the direction (i.e., the first direction D1) intersecting the direction in which the second linear patterns 221 extend. In the drawings, the first edge E1h, the second edge E2h, the third edge E3h, and the fourth edge E4h of the second polarizing element PLh form a quadrilateral. However, this is merely an example, and embodiments are not limited to this example.

At least one of the first edge E1h and the second edge E2h of the second polarizing element PLh may be located in an area other than the display area DA. For example, at least one of the first edge E1h and the second edge E2h of the second polarizing element PLh may be located in the seal area SA. Alternatively, both the first edge E1h and the second edge E2h of the second polarizing element PLh may be located in the seal area SA as illustrated in the drawings. Alternatively, at least one of the first edge E1h and the second edge E2h of the second polarizing element PLh may be located in the peripheral area PHA. For ease of description, a case where both the first edge E1h and the second edge E2h of the second polarizing element PLh are located in the seal area SA will be described below as an example.

In some embodiments, at least any one of the third edge E3h and the fourth edge E4h of the second polarizing element PLh may be located in an area other than the display area DA. In the drawings, both the third edge E3h and the fourth edge E4h of the second polarizing element PLh are located in the seal area SA. However, this is merely an example.

The second protective layer 230 may be located on a surface of the second base substrate 210 and the second polarizing element PLh. The second protective layer 230 may include an inorganic insulating material such as silicon nitride (SiNx) or silicon oxide (SiOx). Like a first protective layer 130, the second protective layer 230 may cover all or part of the second polarizing element PLh to protect the second polarizing element PLh. The second protective layer 230 may be located in the display area DA and the seal area SA. In some embodiments, the second protective layer 230 may also be located in the peripheral area PHA. A part of the second protective layer 230 which is located on the second polarizing element PLh may not contact the surface of the second base substrate 210. Accordingly, a space may be defined in the second gap 223 by the second base substrate 210, the second linear patterns 221, and the second protective layer 230. In addition, the space within the second gap 223 may be in a vacuum.

In some embodiments, the second protective layer 230 may completely cover the second polarizing element PLh. More specifically, side surfaces 2211 of the second linear patterns 221 located at the first edge E1h of the second polarizing element PLh may contact the second protective layer 230. In addition, side surfaces 2212 of the second linear patterns 221 located at the second edge E2h of the second polarizing element PLh may contact the second protective layer 230. Similarly, a side surface 2213 of a second linear pattern 221 located at the third edge E3h of the second polarizing element PLh and a side surface 2214 of a second linear pattern 221 located at the fourth edge E4h of the second polarizing element PLh may contact the second protective layer 230.

The openings OP3 and OP4 located in the seal area SA that expose the second gaps 223 of the second polarizing element PLh may be formed in the second protective layer 230. In an example, a third opening OP3 and a fourth opening OP3 may be formed in the second protective layer 230 in the seal area SA. The third opening OP3 may be formed adjacent to the first edge E1h of the second polarizing element PLh and the fourth opening OP4 may be formed adjacent to the second edge E2h of the second polarizing element PLh.

The third opening OP3 may extend in a direction, e.g., the first direction D1 intersecting the direction in which the second linear patterns 221 extend. When seen from above, the third opening OP3 may overlap each of the second gaps 223 of the second polarizing elements PLh. Like the third opening OP3, the fourth opening OP4 may extend along the first direction D1 and overlap each of the second gaps 223. In some embodiments, one of the third opening OP3 and the fourth opening OP4 may be omitted.

The sealant 400 may overlap the first polarizing element PL and the second polarizing element PLh. When seen from above, first and second openings OP1 and OP2 of the first protective layer 130 may completely overlap the sealant 400. The sealant 400 may contact the first protective layer 130, thereby sealing the first and second openings OP1 and OP2. In other words, the first and second openings OP1 and OP2 of the first polarizing element PL may be blocked by the sealant 400. Similarly, when seen from above, the third and fourth openings OP3 and OP4 of the second protective layer 230 may completely overlap the sealant 400. The sealant 400 may contact the second protective layer 230, thereby sealing the third and fourth openings OP3 and OP4 of the second protective layer 230. That is, like the first and second openings OP1 and OP2 of the first protective layer 130, the third and fourth openings OP3 and OP4 of the second protective layer 230 may be blocked by the sealant 400.

In some embodiments, part of the sealant 400 may be located in the third and fourth openings OP3 and OP4 of the second protective layer 230. Part of the sealant 400 may be located in the second gaps 223 through the third and fourth openings OP3 and OP4 of the second protective layer 230 to contact the surface of the second base substrate 210 and the second linear patterns 221.

The display device 1a described above includes the first polarizing element PL and the second polarizing element PLh. Therefore, like the display device 1 described above with reference to FIGS. 1 through 6, the display device 1a can be reduced in thickness.

Alternatively, the first display substrate 100 may not include the first polarizing element PL and the first protective layer 130, and the second display substrate 200a may include the second polarizing element PLh and the second protective layer 230.

Figure 18:
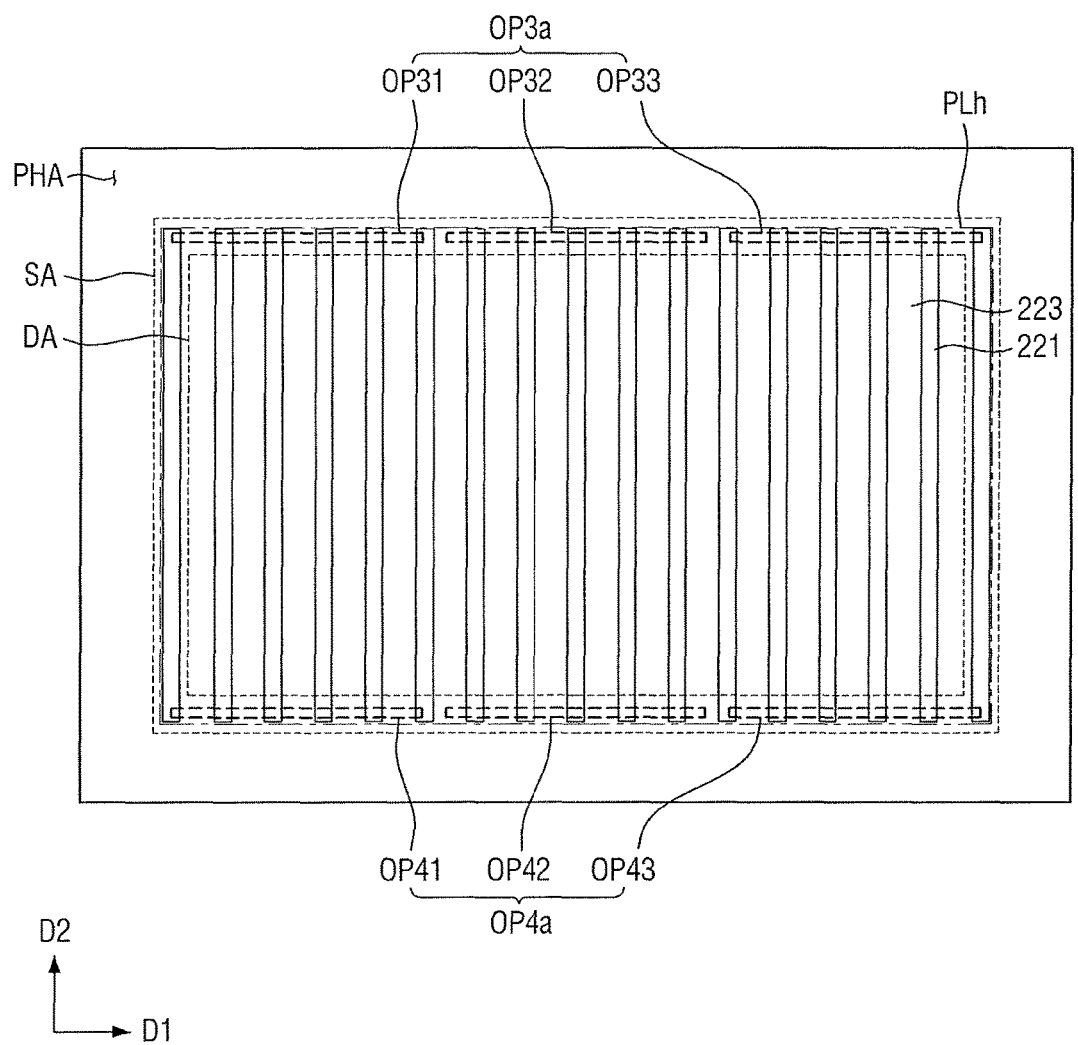
FIG. 18 illustrates a plan view of a modified embodiment of the structure in FIG. 11.

FIG. 18 is a plan view of a modified embodiment of the structure illustrated in FIG. 11, more specifically, illustrates a modified embodiment of the third and fourth openings OP3 and OP4 of the second protective layer 230.

Referring to FIGS. 10 through 18, unlike the third opening OP3 of FIG. 11, a third opening OP3a of a second protective layer may consist of a plurality of sub-openings OP31 through OP33 separated from each other in a direction (e.g., a first direction D1) intersecting a direction in which second linear patterns 221 extend.

Similarly, unlike the fourth opening OP4 of FIG. 11, a fourth opening OP4a of the second protective layer may consist of a plurality of sub-openings OP41 through OP43 separated from each other. The sub-openings OP41 through OP43 may be separated from each other along the first direction D1. In the drawing, each of the third opening OP3a and the fourth opening OP4a includes three sub-openings. However, this is merely an example, and there is no limit to the number of sub-openings.

Figure 19:
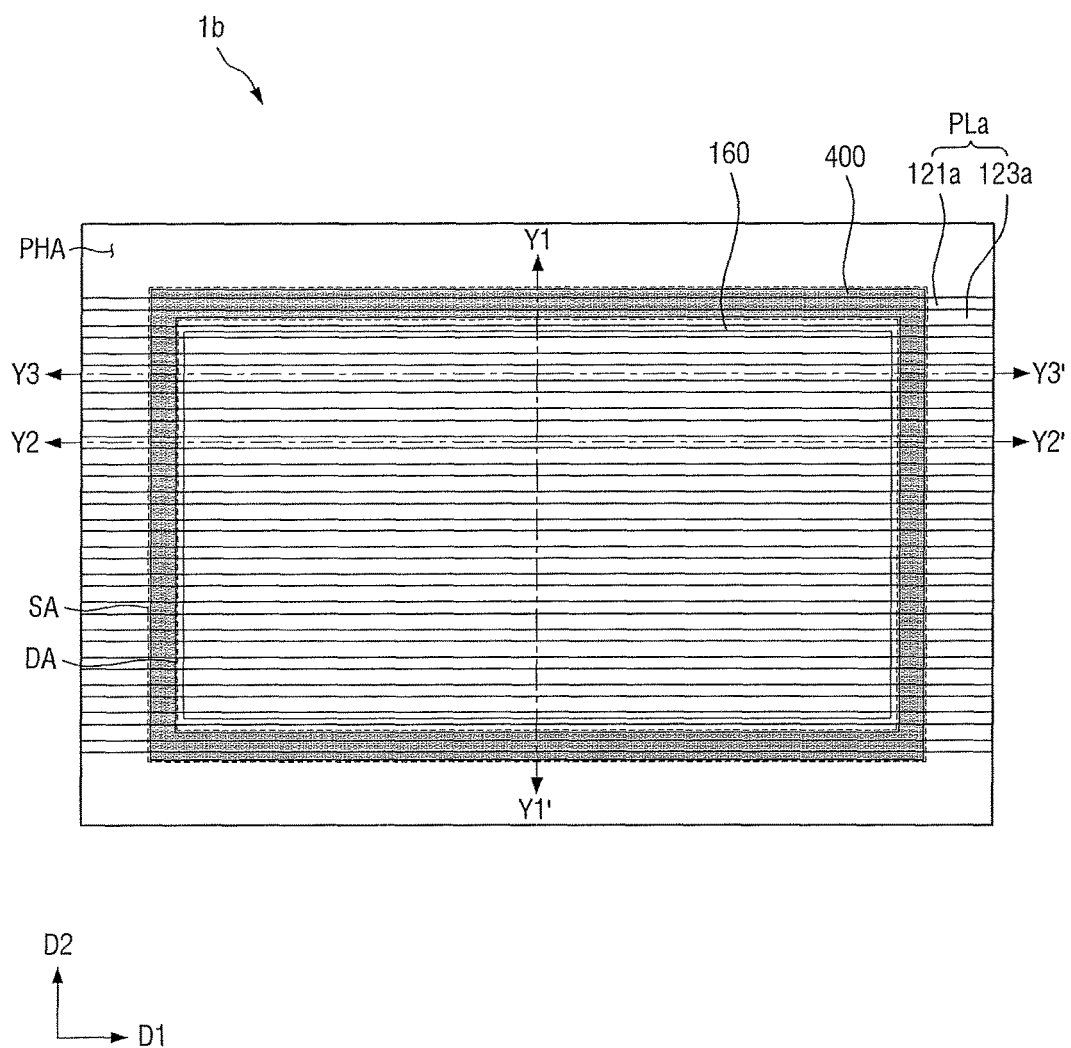
FIG. 19 illustrates a plan view of a display device according to an embodiment.
Figure 20:
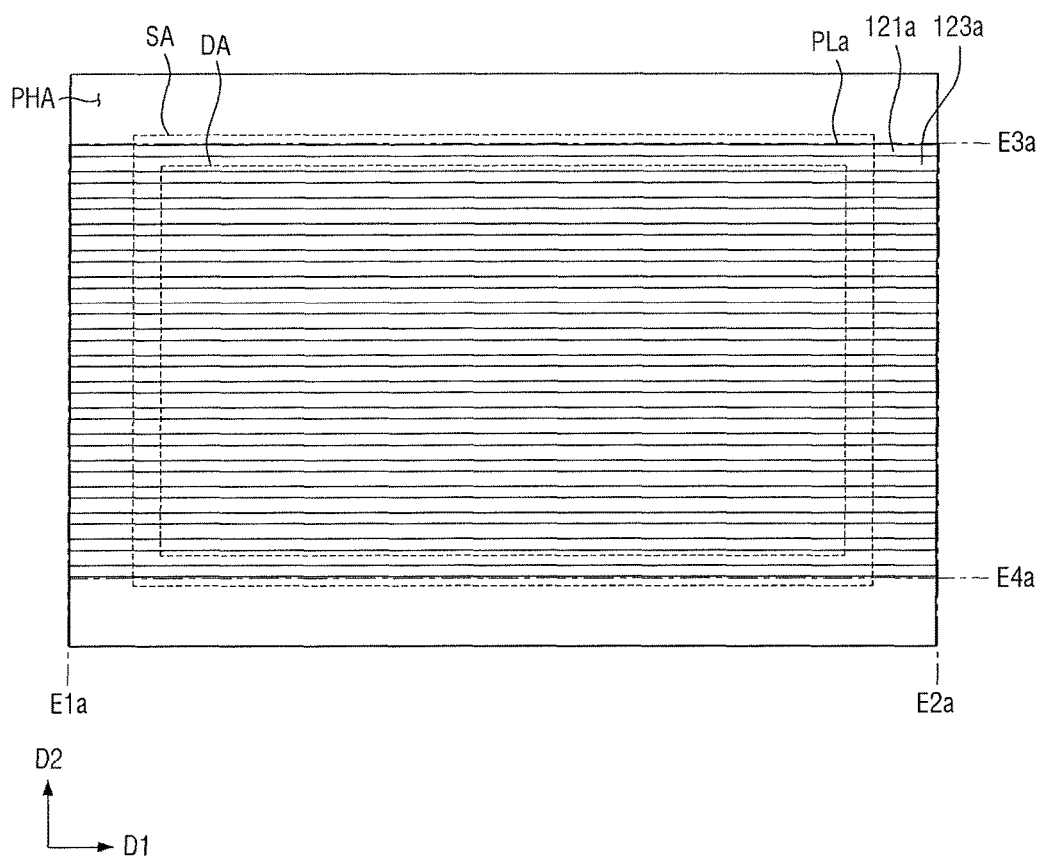
FIG. 20 illustrates a plan view of only a first polarizing element among components of the display device of FIG. 19.
Figure 21:
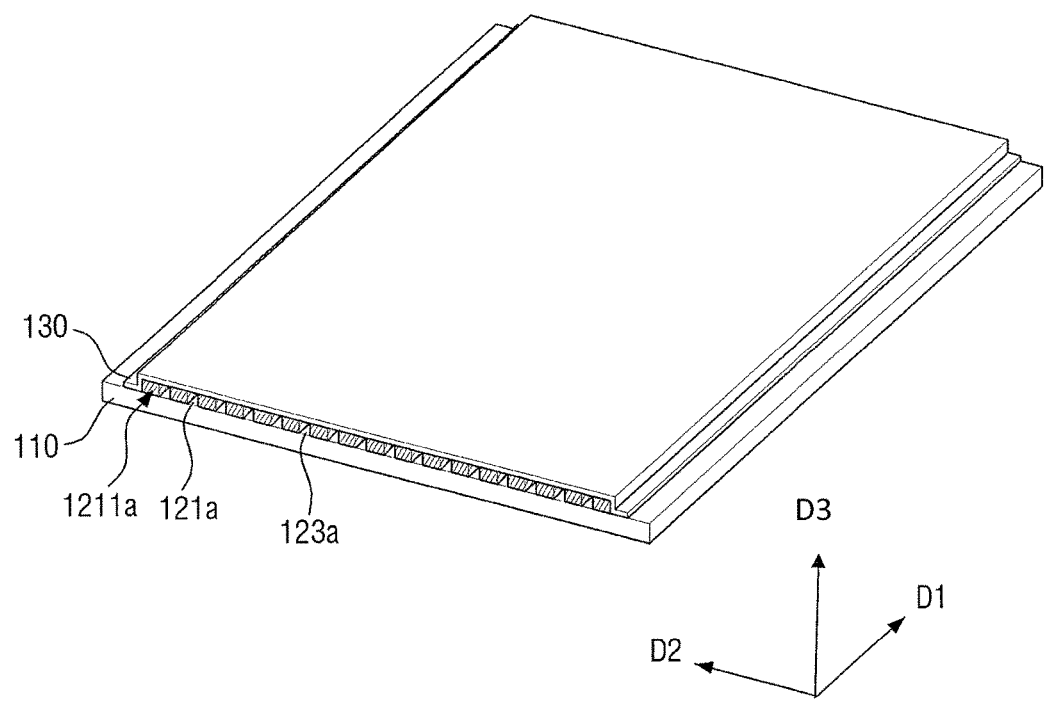
FIG. 21 illustrates a perspective view of the first polarizing element in FIG. 20.
Figure 22:
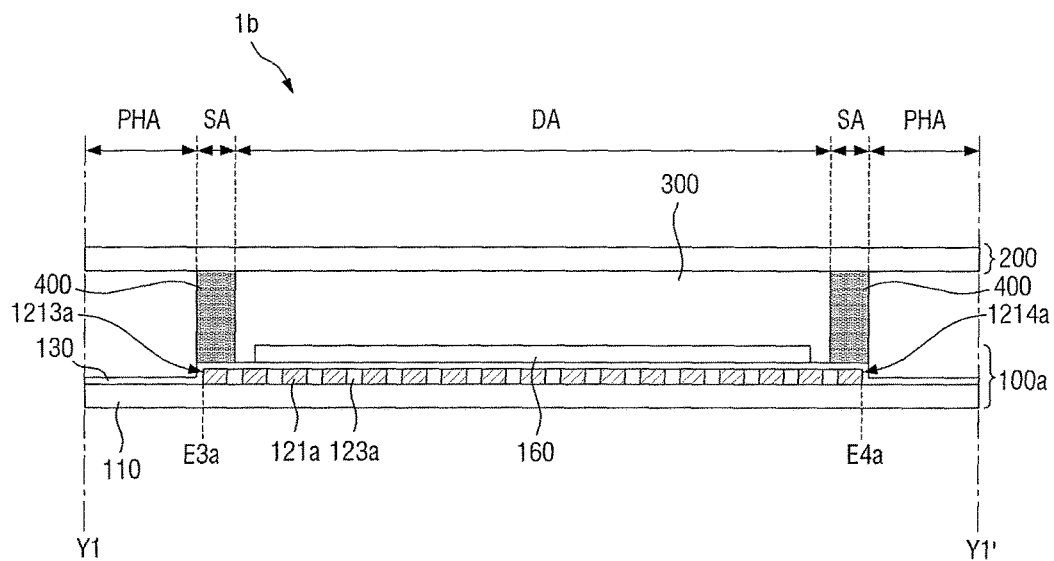
FIG. 22 illustrates a cross-sectional view taken along the line Y1-Y1' of FIG. 19.
Figure 23:
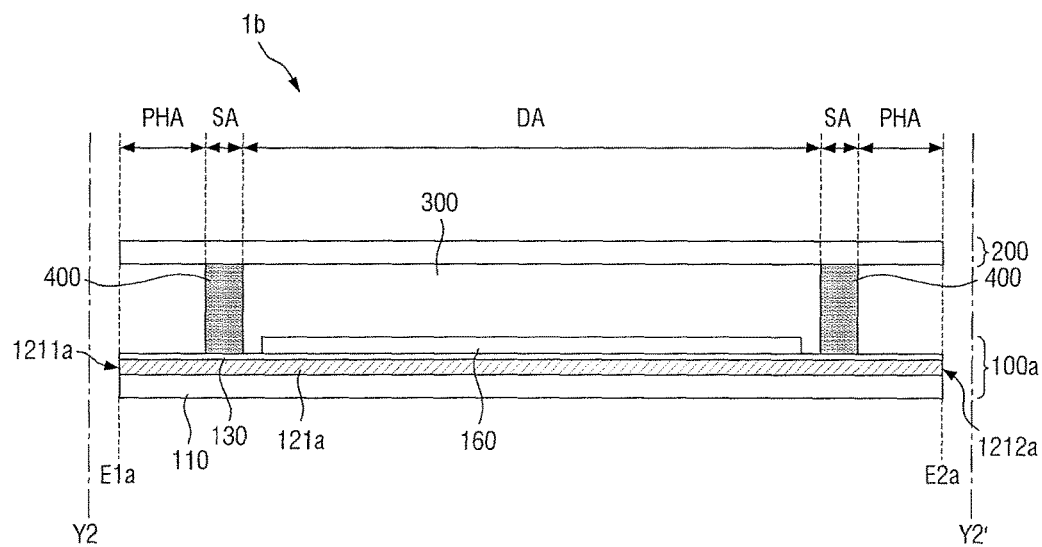
FIG. 23 illustrates a cross-sectional view taken along the line Y2-Y2' of FIG. 19.
Figure 24:
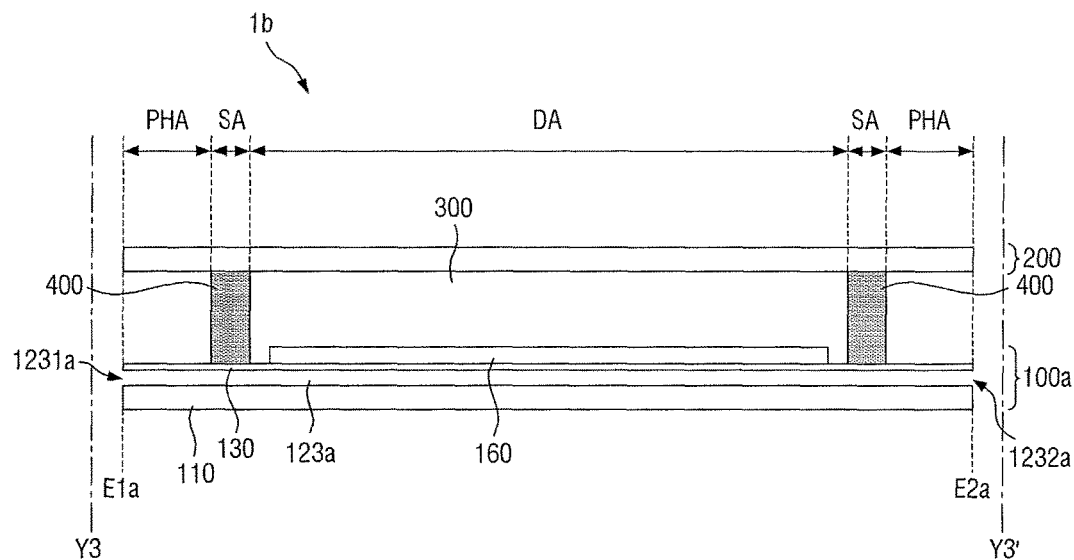
FIG. 24 illustrates a cross-sectional view taken along the line Y3-Y3' of FIG. 19.

FIG. 19 is a plan view of a display device 1b according to an embodiment. FIG. 20 is a plan view illustrating only a first polarizing element PLa among components of the display device 1b of FIG. 19. FIG. 21 is a perspective view of the first polarizing element PLa illustrated in FIG. 20. FIG. 22 is a cross-sectional view taken along the line Y1-Y1' of FIG. 19. FIG. 23 is a cross-sectional view taken along the line Y2-Y2' of FIG. 19. FIG. 24 is a cross-sectional view taken along the line Y3-Y3' of FIG. 19.

Referring to FIGS. 19 through 24, the display device 1b according to the current embodiment may include a first display substrate 100a, the second display substrate 200 which faces the first display substrate 100a, the liquid crystal layer 300 between the first display substrate 100a and the second display substrate 200, and a sealant 400 between the first display substrate 100a and the second display substrate 200 and located in a seal area SA.

The display device 1b according to the current embodiment is different from the display device 1 described above with reference to FIGS. 1 through 6 in that at least any one of edges of the first polarizing element PLa is located in a peripheral area PHA and that no opening is formed in a first protective layer 130. Other components of the display device 1b according to the current embodiment are substantially identical or similar to those of the display device 1 described above with reference to FIGS. 1 through 6. Therefore, the following description will focus on differences between the display device 1b according to the current embodiment and the display device 1 described above with reference to FIGS. 1 through 6.

The first polarizing element PLa may be located on the first base substrate 110. The first polarizing element PLa may be located not only in a display area DA and the seal area SA, but also in the peripheral area PHA.

The first polarizing element PLa may include a plurality of first linear patterns 121a extending in the first direction D1. Each pair of neighboring first linear patterns 121a may be separated from each other by a first gap 123a along a second direction D2 intersecting the first direction D1. In addition, air, etc. may exist in the first gap 123a.

The first polarizing element PLa may include a first edge E1a and a second edge E2a opposite each other along the first direction D1 in which the first linear patterns 121a extend, and a third edge E3a and a fourth edge E4a which are located opposite each other along the second direction D2 intersecting the direction in which the first linear patterns 121a extend.

At least any one of the first edge E1a and the second edge E2a of the first polarizing element PLa may be located in the peripheral area PHA. In some embodiments, both the first edge E1a and the second edge E2a of the first polarizing element PLa may be located in the peripheral area PHA as illustrated in the drawings. For ease of description, a case where both the first edge E1a and the second edge E2a of the first polarizing element PLa are located in the peripheral area PHA will be described below as an example.

The first protective layer 130 located on the first polarizing element PLa may partially cover the first polarizing element PLa. More specifically, in some embodiments, side surfaces 1211a of the first linear patterns 121a located at the first edge E1a of the first polarizing element PLa may not contact the first protective layer 130. In addition, side surfaces 1212a of the first linear patterns 121a located at the second edge E2a of the first polarizing element PLa may not contact the first protective layer 130. That is, the first protective layer 130 may not completely cover the first polarizing element PLa along the first direction D1. Accordingly, a first end 1231a of each of the first gaps 123a at the first edge E1a may be open. Similarly, a second end 1232a of each of the first gaps 123a at the second edge E2a may be open. Alternatively, in some embodiments, if at least one of the first edge E1a and the second edge E2a of the first polarizing element PLa is located in the peripheral area PHA, one of the first end 1231a and the second end 1232a of each of the first gaps 123a may be open.

In some embodiments, at least any one of the third edge E3a and the fourth edge E4a of the first polarizing element PLa may be located in an area other than the display area DA. In the drawings, both the third edge E3a and the fourth edge E4a of the first polarizing element PLa are located in the seal area SA, but embodiments are not limited thereto.

In some embodiments, a side surface 1213a of a first linear pattern 121a located at the third edge E3a of the first polarizing element PLa and a side surface 1214a of a first linear pattern 121a located at the fourth edge E4a of the first polarizing element PLa may contact the first protective layer 130. That is, the first protective layer 130 may completely cover the first polarizing element PLa along the second direction D2 and may not completely cover the first polarizing element PLa along the first direction D1.

Other features of the first polarizing element PLa are substantially the same as those of the first polarizing element PL described above with reference to FIGS. 1 through 6 and, thus, description thereof will not be repeated.

As described above, the first display substrate 100a and the second display substrate 200 may be exposed to high temperature while being bonded together. Therefore, during the process of bonding the first display substrate 100a and the second display substrate 200 together, if gas used in the manufacturing process or air is trapped in the first gaps 123a, it may cause outgassing.

On the other hand, in the display device 1b according to the current embodiment, at least any one of the first end 1231a and the second end 1232a of each of the first gaps 123a is open. Therefore, the gas within each of the first gaps 123a can be released through the first end 1231a or the second end 1232a of each of the first gaps 123a without being trapped in each of the first gaps 123a. This can prevent outgassing due to the gas within each of the first gaps 123a, which makes it possible to provide a display device 1b with improved reliability.

Figure 25:
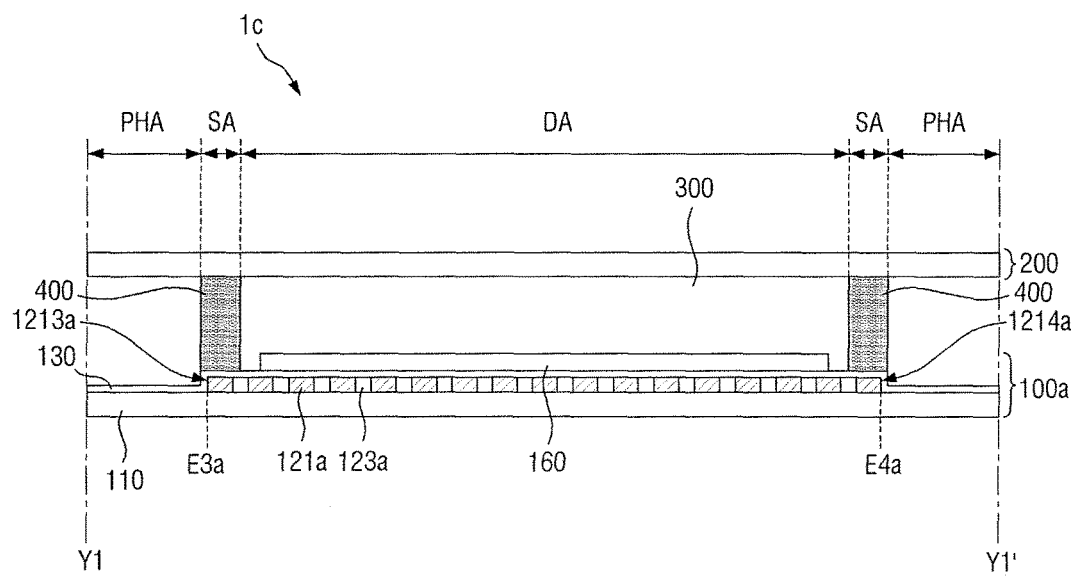
FIG. 25 illustrates a cross-sectional view of a display device according to an embodiment, taken along the line Y1-Y1' of FIG. 19.
Figure 26:
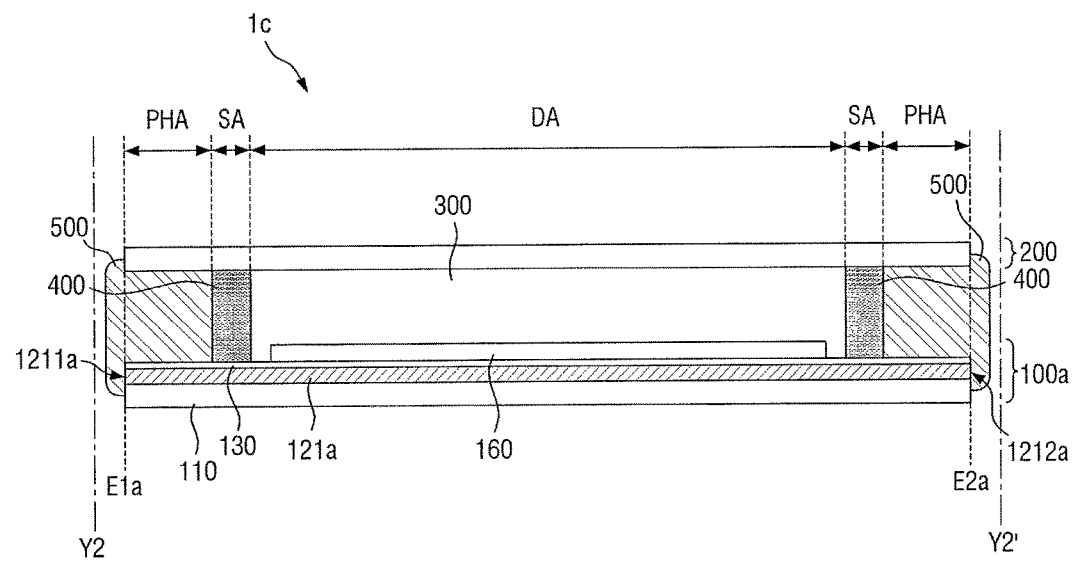
FIG. 26 illustrates a cross-sectional view of the display device according to the embodiment, taken along the line Y2-Y2' of FIG. 19.
Figure 27:
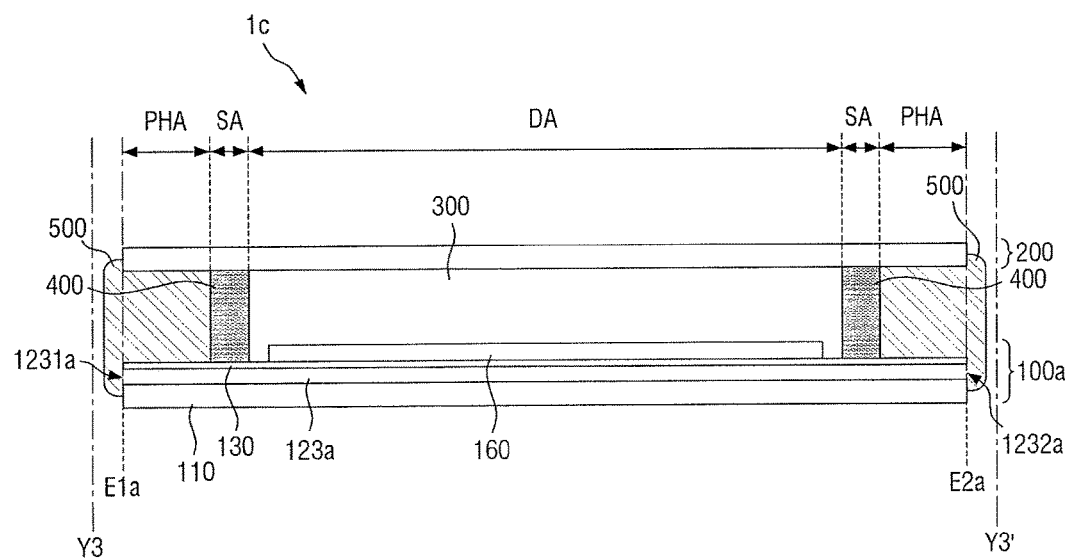
FIG. 27 illustrates a cross-sectional view of the display device according to the embodiment, taken along the line Y3-Y3' of FIG. 19.

FIG. 25 is a cross-sectional view of a display device 1c according to an embodiment, taken along the line Y1-Y1' of FIG. 19. FIG. 26 is a cross-sectional view of the display device 1c according to the embodiment, taken along the line Y2-Y2' of FIG. 19. FIG. 27 is a cross-sectional view of the display device 1c according to the embodiment, taken along the line Y3-Y3' of FIG. 19.

Referring to FIGS. 25 through 27, the display device 1c according to the current embodiment is different from the display device 1b described above with reference to FIGS. 19 through 24 in that it further includes an auxiliary sealing part 500. Other components of the display device 1c according to the current embodiment are substantially identical to those of the display device 1b described above with reference to FIGS. 19 through 24.

The auxiliary sealing part 500 may be located in a peripheral area PHA of the display device 1c. The auxiliary sealing part 500 may seal a first end 1231a of each first gap 123a at a first edge E1a and a second end 1232a of each first gap 123a at a second edge E2a. In addition, the auxiliary sealing part 500 may cover side surfaces 1211a of first linear patterns which are located at the first edge E1a and side surfaces 1212a of the first linear patterns which are located at the second edge E2a. In particular, the auxiliary sealing part 500 may have a same height as and extend from the sealing part 400 in the first and second directions to the first edge E1a and the second edge E2a, and then may further extend along the third direction to contact the first display substrate 100 and the second display substrate 200.

A first polarizing element PLa may include, e.g., metal. Therefore, the first polarizing element PLa may corrode when exposed to the atmosphere.

The display device 1c according to the current embodiment can be manufactured without outgassing. Therefore, the reliability of the manufacturing process can be improved. In addition, the auxiliary sealing part 500 additionally included in the display device 1c covers an exposed part of the first polarizing element PLa, thereby preventing the corrosion of the first polarizing element PLa. Accordingly, the reliability of the display device 1c can be improved.

Figure 28:
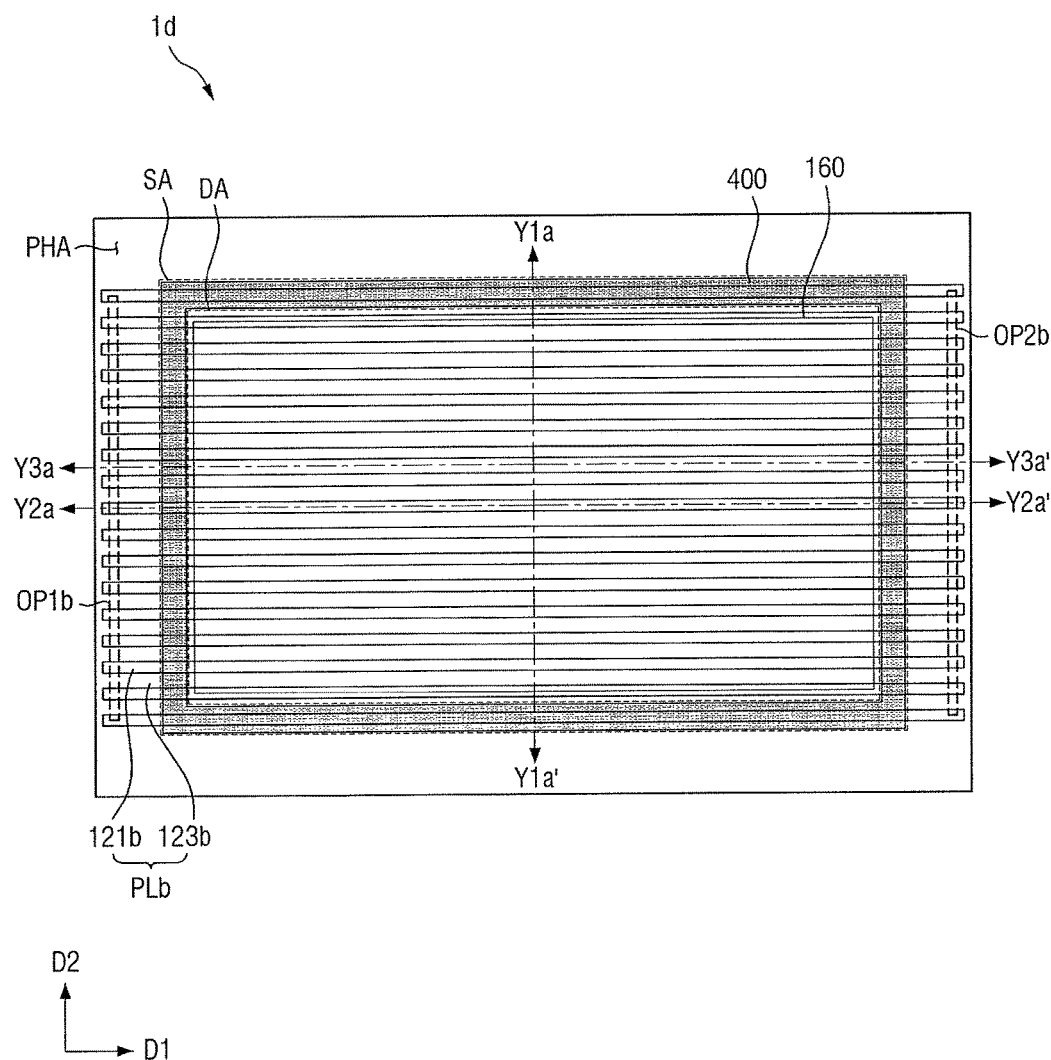
FIG. 28 illustrates a plan view of a display device according to an embodiment.
Figure 29:
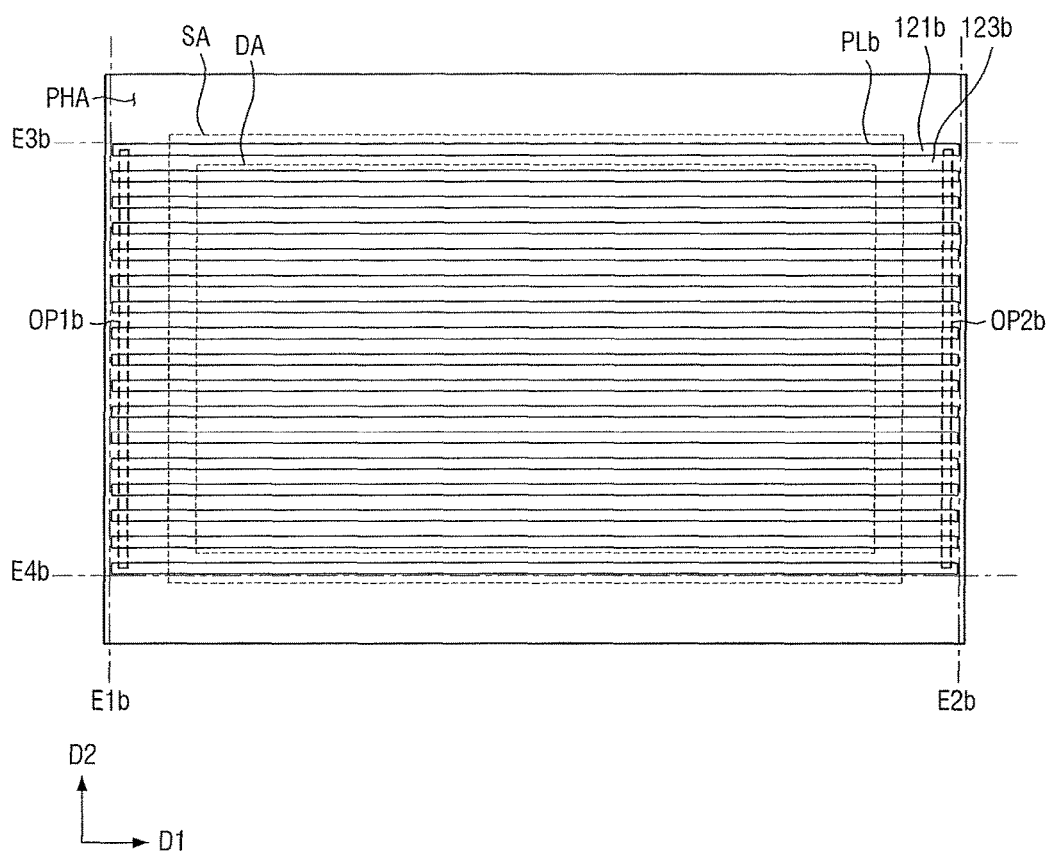
FIG. 29 illustrates a plan view of only a first polarizing element and openings of a first protective layer among components of the display device of FIG. 28.
Figure 30:
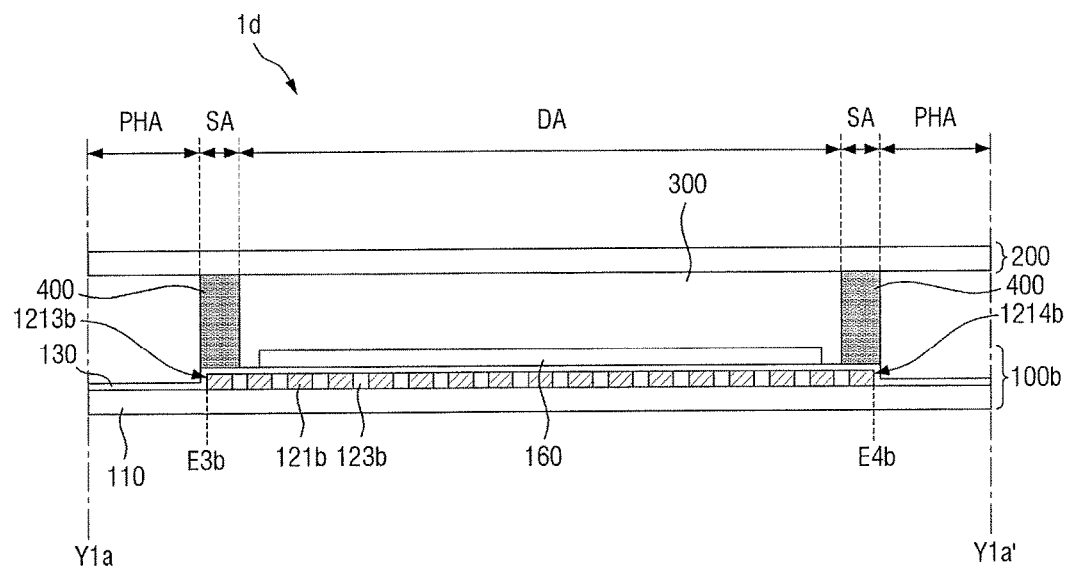
FIG. 30 illustrates a cross-sectional view taken along the line Y1$a$-Y1$a$' of FIG. 28.
Figure 31:
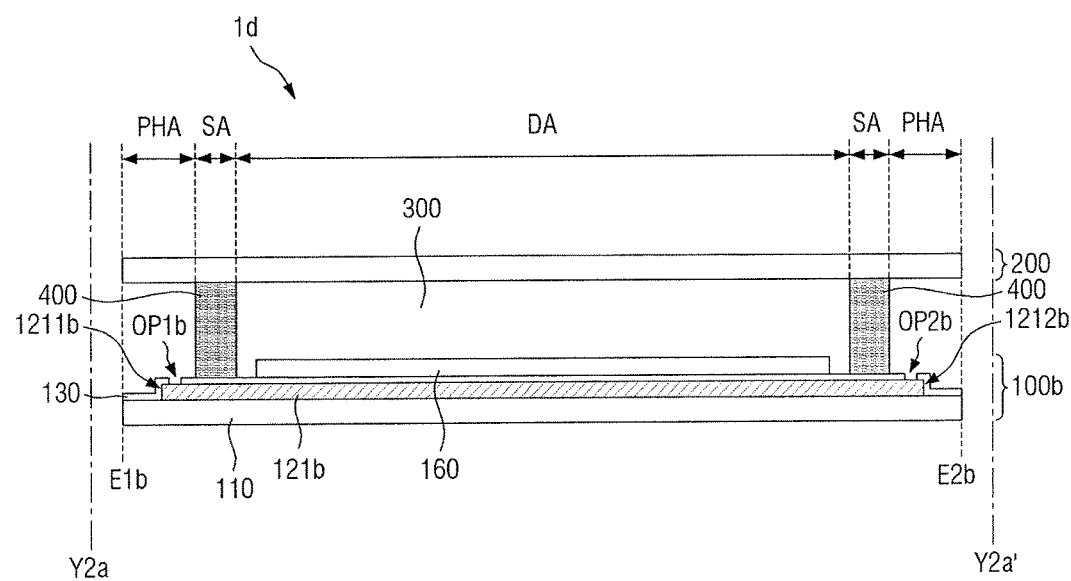
FIG. 31 illustrates a cross-sectional view taken along the line Y2$a$-Y2$a$' of FIG. 28.
Figure 32:
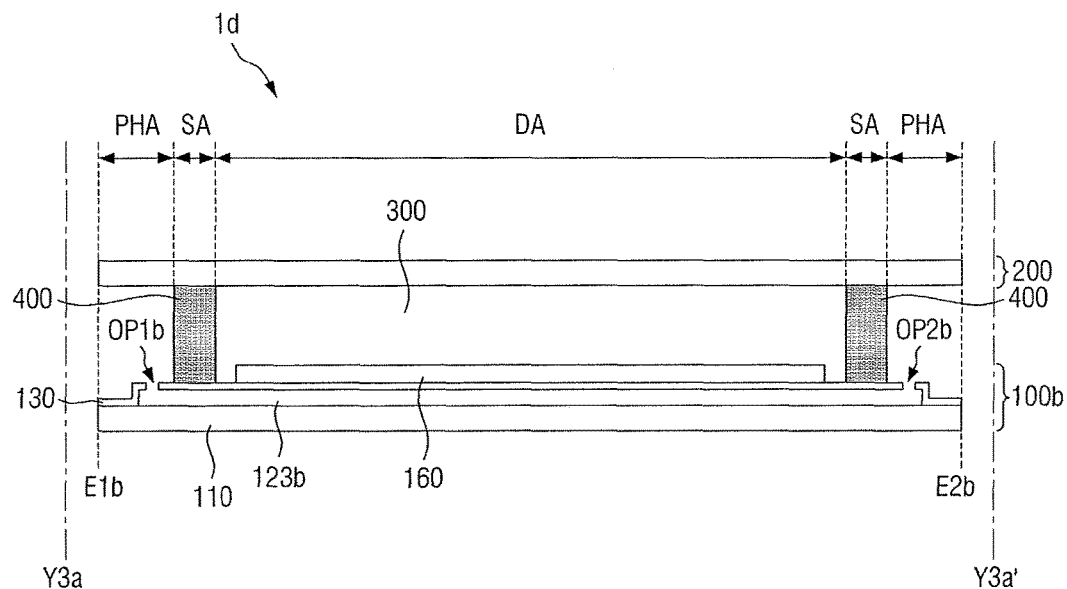
FIG. 32 illustrates a cross-sectional view taken along the line Y3$a$-Y3$a$' of FIG. 28.

FIG. 28 is a plan view of a display device 1d according to an embodiment. FIG. 29 is a plan view illustrating only a first polarizing element PLb and openings OP1b and OP2b of the first protective layer 130 among components of the display device 1d of FIG. 28. FIG. 30 is a cross-sectional view taken along the line Y1a-Y1a' of FIG. 28. FIG. 31 is a cross-sectional view taken along the line Y2a-Y2a' of FIG. 28. FIG. 32 is a cross-sectional view taken along the line Y3a-Y3a' of FIG. 28.

Referring to FIGS. 28 through 32, the display device 1d according to the current embodiment may include a first display substrate 100b, the second display substrate 200 which faces the first display substrate 100b, the liquid crystal layer 300 between the first display substrate 100b and the second display substrate 200, and the sealant 400 between the first display substrate 100b and the second display substrate 200 and located in a seal area SA.

The biggest difference between the display device 1d according to the current embodiment and the display device 1b described above with reference to FIGS. 19 through 24 is that the openings OP1b and OP2b are formed in the first protective layer 130 of the first display substrate 100b. Other components of the display device 1d according to the current embodiment are substantially identical or similar to those of the display device 1b described above with reference to FIGS. 19 through 24. Therefore, the following description will focus on differences between the display device 1d according to the current embodiment and the display device 1b described above with reference to FIGS. 19 through 24.

The first display substrate 100b will hereinafter be described. The first polarizing element PLb may be located on a first base substrate 110. The first polarizing element PLb may be located not only in a display area DA and the seal area SA but also in a peripheral area PHA.

The first polarizing element PLb may include a plurality of first linear patterns 121b extending in a first direction D1. Each pair of neighboring first linear patterns 121b may be separated from each other by a first gap 123b along a second direction D2 intersecting the first direction D1. In addition, air, etc. may exist in the first gap 123b.

The first polarizing element PLb may include a first edge E1b and a second edge E2b which are located opposite each other along the first direction D1 in which the first linear patterns 121b extend, and a third edge E3b and a fourth edge E4b which are located opposite each other along the second direction D2 intersecting the direction in which the first linear patterns 121b extend. At least one of the first edge E1b and the second edge E2b of the first polarizing element PLb may be located in the peripheral area PHA. A case where both the first edge E1b and the second edge E2b of the first polarizing element PLb are located in the peripheral area PHA will hereinafter be described as an example.

The first protective layer 130 may be located on the first base substrate 110 and the first polarizing element PLb. The first protective layer 130 may completely cover the first polarizing element PLb. More specifically, side surfaces 1211b of the first linear patterns 121b located at the first edge E1b of the first polarizing element PLb may contact the first protective layer 130. In addition, side surfaces 1212b of the first linear patterns 121b located at the second edge E2b of the first polarizing element PLb may contact the first protective layer 130. In addition, a side surface 1213b of a first linear pattern 121b located at the third edge E3b of the first polarizing element PLb and a side surface 1214b of a first linear pattern 121b located at the fourth edge E4b of the first polarizing element PLb may contact the first protective layer 130. That is, the first protective layer 130 may completely cover the first polarizing element PLb along the first direction D1 and the second direction D2.

The openings OP1b and OP2b located in the peripheral area PHA that expose the first gaps 123b of the first polarizing element PLb may be formed in the first protective layer 130. More specifically, a first opening OP1b and a second opening OP2b may be formed in the first protective layer 130 in the peripheral area PHA. The first opening OP1b may be formed adjacent to the first edge E1b of the first polarizing element PLb and the second opening OP2b may be formed adjacent to the second edge E2b of the first polarizing element PLb. The first opening OP1b and the second opening OP2b of the first protective layer 130 may not be located in the seal area SA and may not overlap the sealant 400. That is, when seen from above, the first opening OP1b of the first protective layer 130 may be located between the first edge E1b of the first polarizing element PLb and the seal area SA, and the second opening OP2b of the first protective layer 130 may be located between the second edge E2b of the first polarizing element PLb and the seal area SA.

Top surfaces of the first linear patterns 121b may be partially exposed by the first and second openings OP1b and OP2b. Similarly, a top surface of the first base substrate 110 may be partially exposed by the first and second openings OP1b and OP2b. The first opening OP1b and the second opening OP2b may extend along the second direction D2 and overlap each of the first gaps 123b. In some embodiments, any one of the first opening OP1b and the second opening OP2b may be omitted.

In the case of the display device 1d according to the current embodiment, gas within each of the first gaps 123b may be released through the first opening OP1b or the second opening OP2b in the process of bonding the first display substrate 100b and the second display substrate 200 together. In other words, the gas within each of the first gaps 123b is not trapped in the first polarizing element PLb. Therefore, it is possible to prevent outgassing from occurring due to the gas within each of the first gaps 123b in the process of bonding the first display substrate 100b and the second display substrate 200 together. Accordingly, a display device 1d with improved reliability can be provided.

Figure 33:
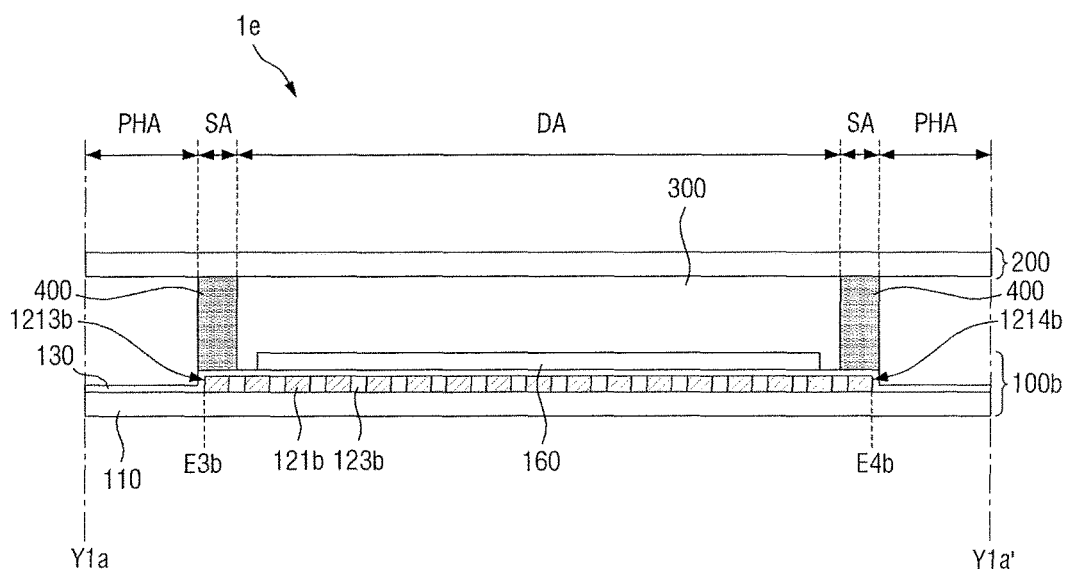
FIG. 33 illustrates a cross-sectional view of a display device according to an embodiment, taken along the line Y1$a$-Y1$a$' of FIG. 28.
Figure 34:
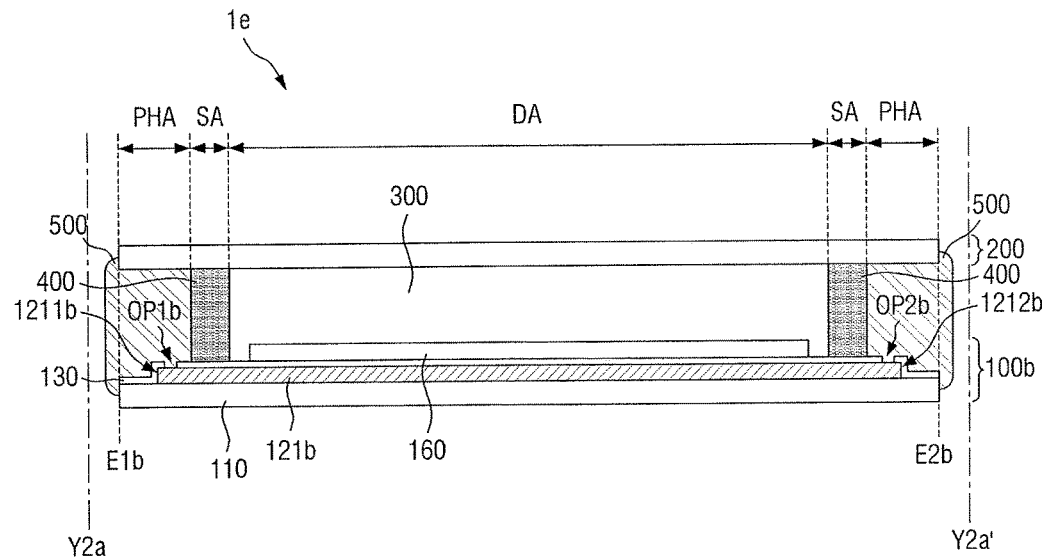
FIG. 34 illustrates a cross-sectional view of the display device according to the embodiment, taken along the line Y2$a$-Y2$a$' of FIG. 28.
Figure 35:
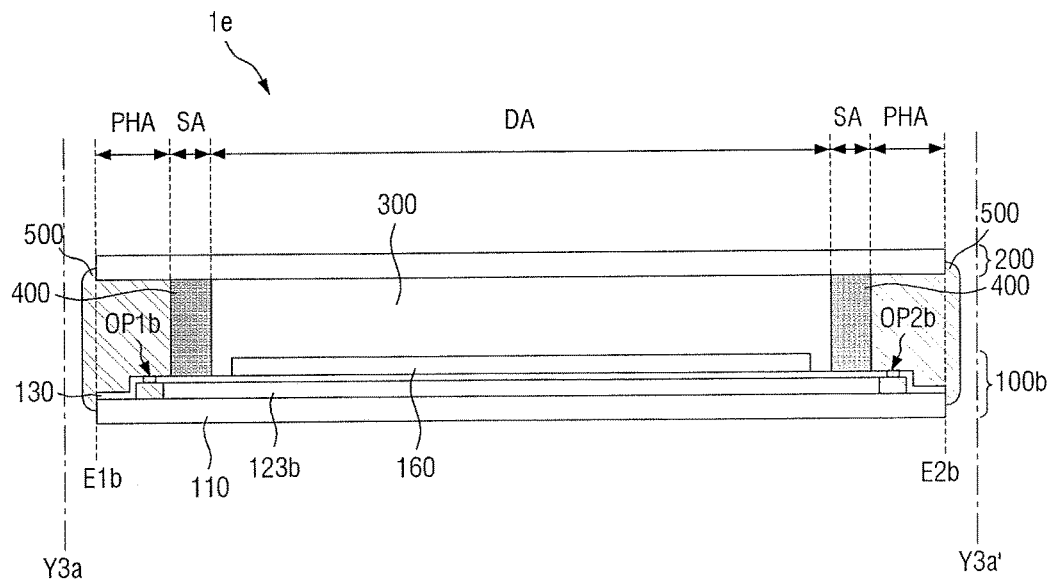
FIG. 35 illustrates a cross-sectional view of the display device according to the embodiment, taken along the line Y3$a$-Y3$a$' of FIG. 28.

FIG. 33 is a cross-sectional view of a display device 1e according to an embodiment, taken along the line Y1a-Y1a' of FIG. 28. FIG. 34 is a cross-sectional view of the display device 1e according to the embodiment, taken along the line Y2a-Y2a' of FIG. 28. FIG. 35 is a cross-sectional view of the display device 1e according to the embodiment, taken along the line Y3a-Y3a' of FIG. 28.

Referring to FIGS. 33 through 35, the display device 1e according to the current embodiment is different from the display device 1d described above with reference to FIGS. 28 through 32 in that it further includes the auxiliary sealing part 500. Other components of the display device 1e according to the current embodiment are substantially identical to those of the display device 1d described above with reference to FIGS. 28 through 32.

The auxiliary sealing part 500 may be located in a peripheral area PHA of the display device 1e. The auxiliary sealing part 500 may be located between a first display substrate 100b and a second display substrate 200 and seal openings OP1b and OP2b of a first protective layer 130. Part of the auxiliary sealing part 500 may be located in the openings OP1b and OP2b to contact a first base substrate 110 and first linear patterns 121b. Accordingly, the probability of corrosion of a first polarizing element PLb can be reduced, thereby improving the reliability of the display device 1e.

Figure 36:
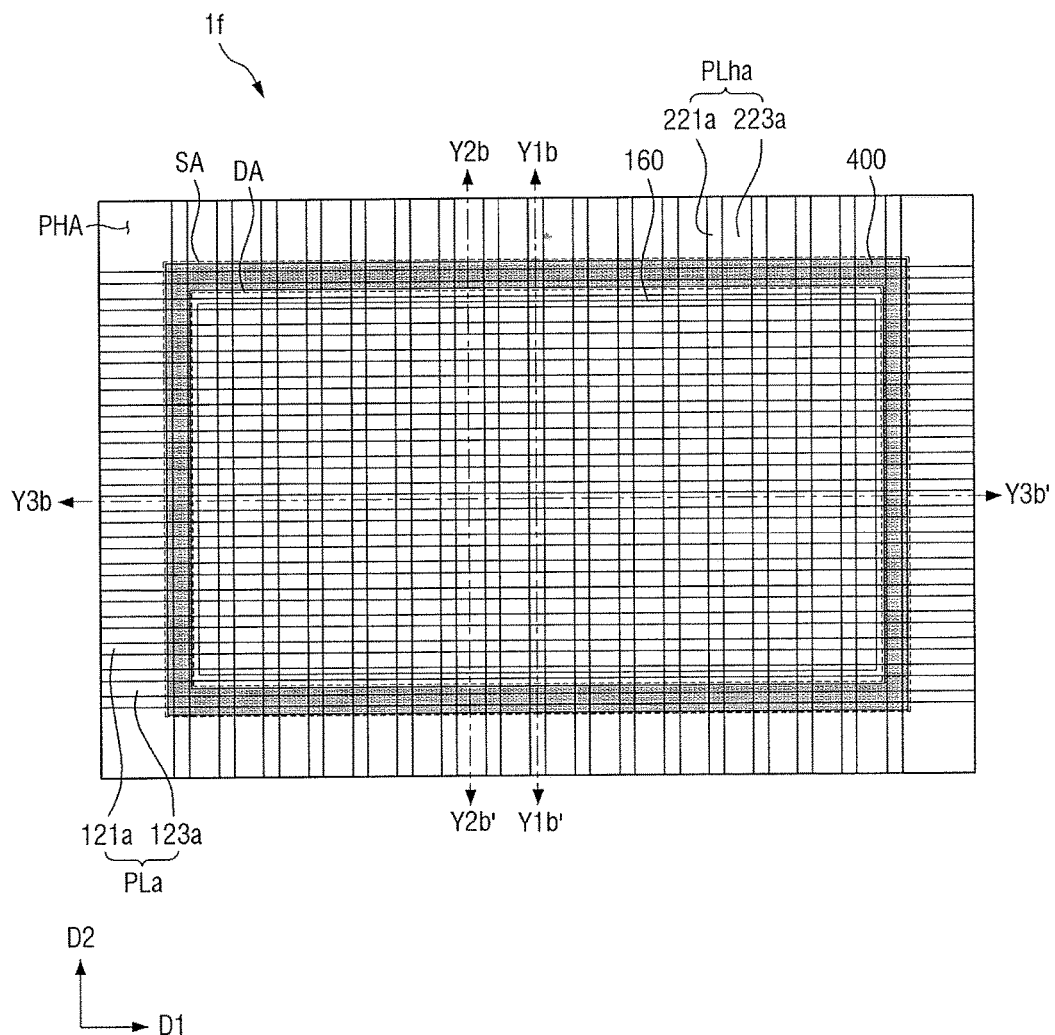
FIG. 36 illustrates a plan view of a display device according to an embodiment.
Figure 37:
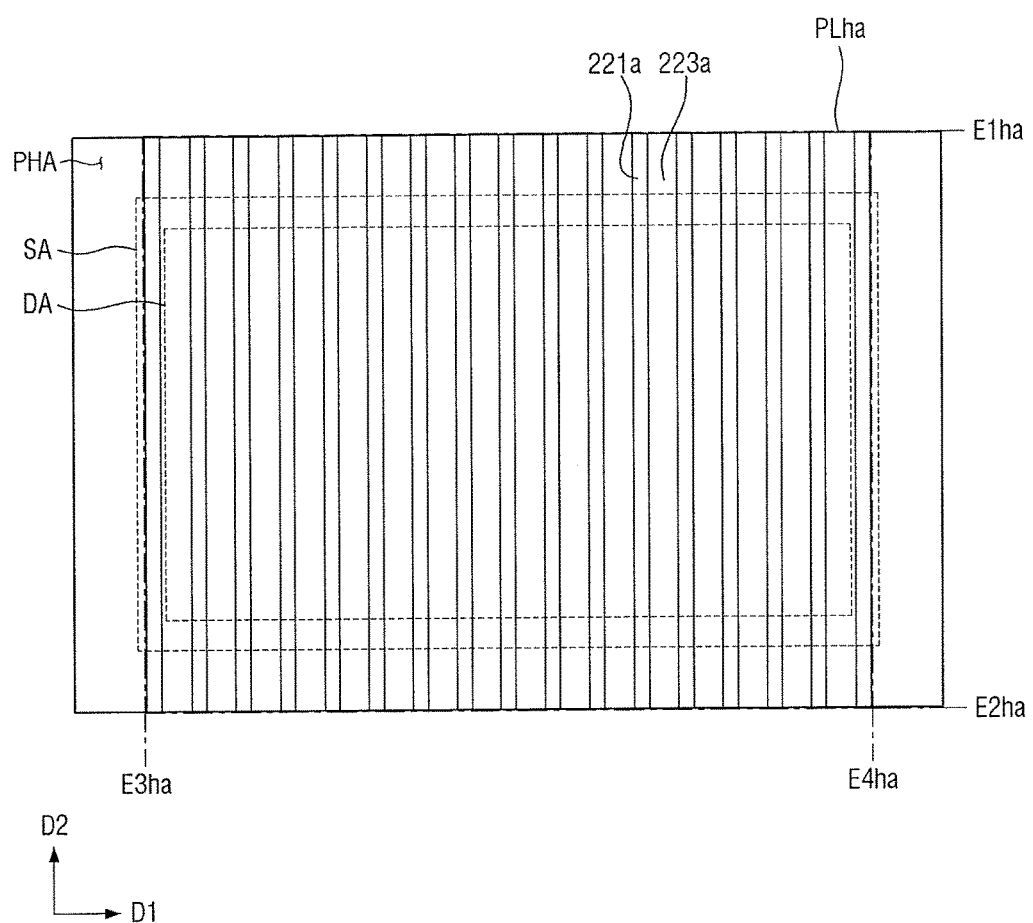
FIG. 37 illustrates a plan view of only a second polarizing element and openings of a second protective layer among components of the display device of FIG. 36.
Figure 38:
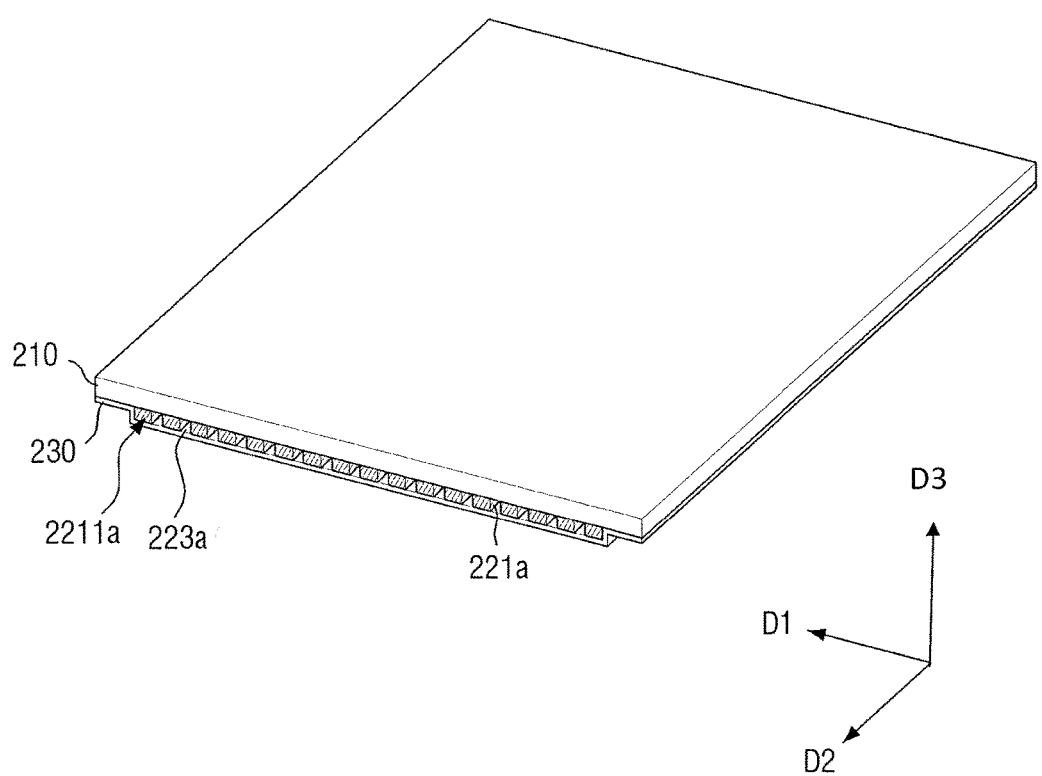
FIG. 38 illustrates a perspective view of the second polarizing element illustrated in FIG. 37.
Figure 39:
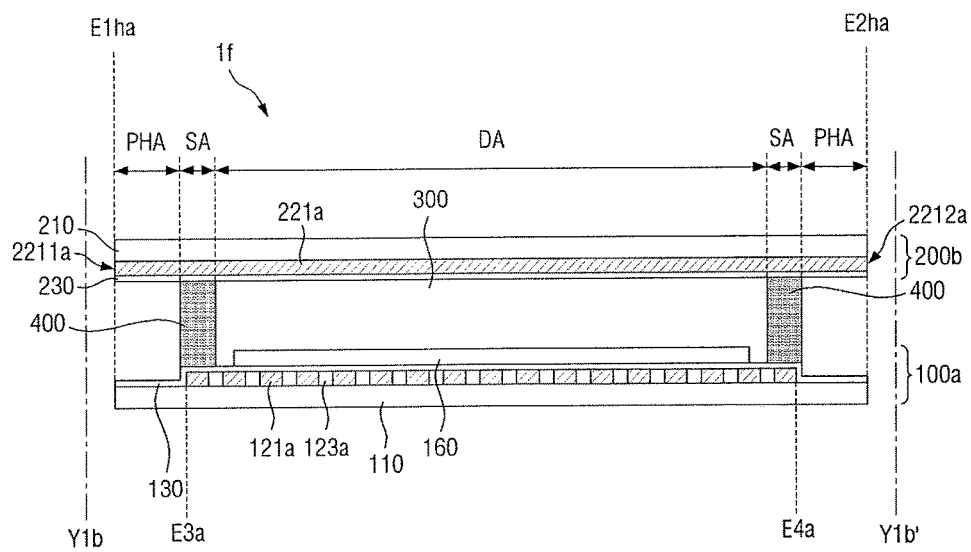
FIG. 39 illustrates a cross-sectional view taken along the line Y1$b$-Y1$b$' of FIG. 36.
Figure 40:
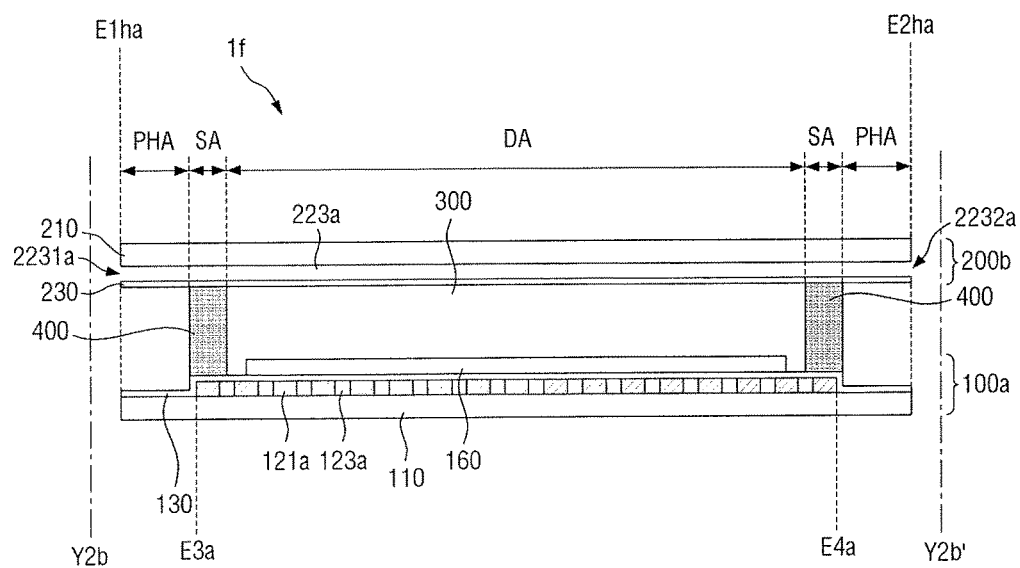
FIG. 40 illustrates a cross-sectional view taken along the line Y2$b$-Y2$b$' of FIG. 36.
Figure 41:
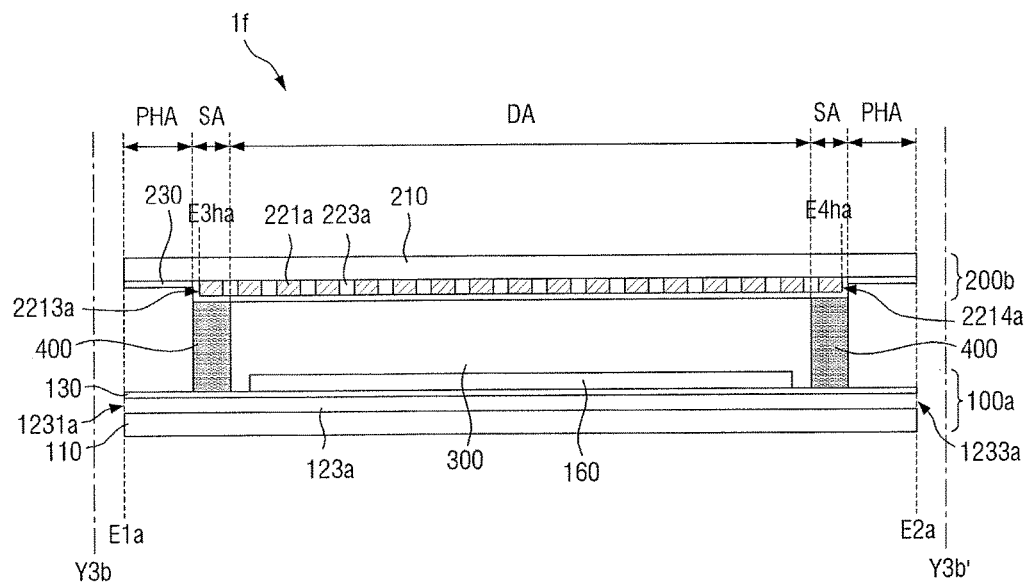
FIG. 41 illustrates a cross-sectional view taken along the line Y3$b$-Y3$b$' of FIG. 36.

FIG. 36 is a plan view of a display device 1f according to an embodiment. FIG. 37 is a plan view illustrating only a second polarizing element PLha and openings of a second protective layer 230 among components of the display device 1f of FIG. 36. FIG. 38 is a perspective view of the second polarizing element PLha illustrated in FIG. 37. FIG. 39 is a cross-sectional view taken along the line Y1b-Y1b' of FIG. 36. FIG. 40 is a cross-sectional view taken along the line Y2b-Y2b' of FIG. 36. FIG. 41 is a cross-sectional view taken along the line Y3b-Y3b' of FIG. 36.

Referring to FIGS. 36 through 41, the display device 1f according to the current embodiment may include the first display substrate 100a, the second display substrate 200b which faces the first display substrate 100a, the liquid crystal layer 300 between the first display substrate 100a and the second display substrate 200b, and the sealant 400 between the first display substrate 100a and the second display substrate 200b and located in a seal area SA.

The biggest difference between the display device 1f according to the current embodiment and the display device 1b described above with reference to FIGS. 19 through 24 is that the second display substrate 200b of the display device 1f includes the second polarizing element PLha and the second protective layer 230. Other components of the display device 1f according to the current embodiment are substantially identical or similar to those of the display device 1b described above with reference to FIGS. 19 through 24. Therefore, the following description will focus on differences between the display device 1f according to the current embodiment and the display device 1b described above with reference to FIGS. 19 through 24.

The second display substrate 200b will hereinafter be described. The second polarizing element PLha may be located on a surface of the second base substrate 210 which faces the first display substrate 100a. The second polarizing element PLha may be located in a display area DA, the seal area SA and a peripheral area PHA.

The second polarizing element PLha may include a plurality of second linear patterns 221a extending along a second direction D2. Each pair of neighboring second linear patterns 221a may be separated from each other by a second gap 223a along a first direction D1.

The second polarizing element PLha may include a first edge E1ha and a second edge E2ha which are located opposite each other along the second direction D2 in which the second linear patterns 221a extend, and a third edge E3ha and a fourth edge E4ha which are located opposite each other along the first direction D1. In addition, air may exist in the second gap 223a.

At least any one of the first edge E1ha and the second edge E2ha of the second polarizing element PLha may be located in the peripheral area PHA. A case where both the first edge E1ha and the second edge E2ha of the second polarizing element PLha are located in the peripheral area PHA will hereinafter be described as an example.

The second protective layer 230 may be located on a surface of the second base substrate 210 and the second polarizing element PLha. The second protective layer 230 may partially cover the second polarizing element PLha. More specifically, in some embodiments, side surfaces 2211a of the second linear patterns 221a located at the first edge E1ha of the second polarizing element PLha and side surfaces 2212a of the second linear patterns 221a located at the second edge E2ha of the second polarizing element PLha may not contact the second protective layer 230. Accordingly, a first end 2231a of each of the second gaps 223a at the first edge E1ha may be open. Similarly, a second end 2232a of each of the second gaps 223a at the second edge E2ha may be open. Alternatively, in some embodiments, any one of the first end 2231a and the second end 2232a of each of the second gaps 223a may be open.

In some embodiments, at least one of the third edge E3ha and the fourth edge E4ha of the second polarizing element PLha may be located in an area other than the display area DA. A case where both the third edge E3ha and the fourth edge E4ha of the second polarizing element PLha are located in the seal area SA as illustrated in the drawings will hereinafter be described as an example, but embodiments are not limited to this example.

In some embodiments, a side surface 2213a of a second linear pattern 221a located at the third edge E3ha of the second polarizing element PLha and a side surface 2214a of a second linear pattern 221a located at the fourth edge E4ha of the second polarizing element PLha may contact the second protective layer 230. That is, the second protective layer 230 may completely cover the second polarizing element PLha along the first direction D1 and may not completely cover the second polarizing element PLha along the second direction D2.

In the display device 1f according to the current embodiment, at least one of a first end 1231a and a second end 1232a of each first gap 123a is open out of a first protective layer 130, and at least one of the first end 2231a and the second end 2232a of each second gap 223a is open out of the second protective layer 230. Accordingly, gas is not trapped in each of the first and second gaps 123a and 223a, thereby preventing the occurrence of outgassing. Hence, a display device 1f with improved reliability can be provided.

Although not illustrated in the drawings, in some embodiments, the first display substrate 100a may not include a first polarizing element PLa and the first protective layer 130, and the second display substrate 200b may include the second polarizing element PLha and the second protective layer 230.

Figure 42:
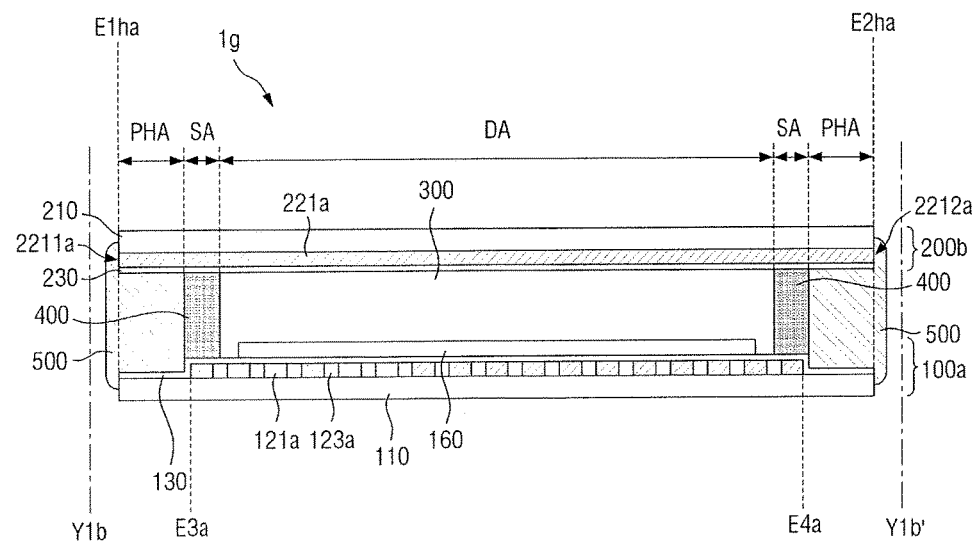
FIG. 42 illustrates a cross-sectional view of a display device according to an embodiment, taken along the line Y1$b$-Y1$b$' of FIG. 36.
Figure 43:
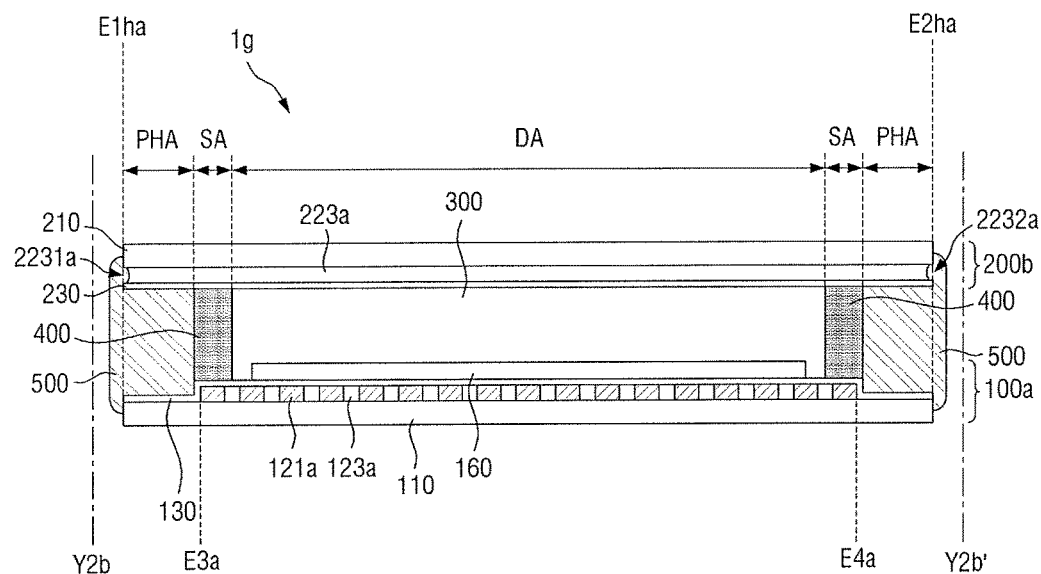
FIG. 43 illustrates a cross-sectional view of the display device according to the embodiment, taken along the line Y2$b$-Y2$b$' of FIG. 36.
Figure 44:
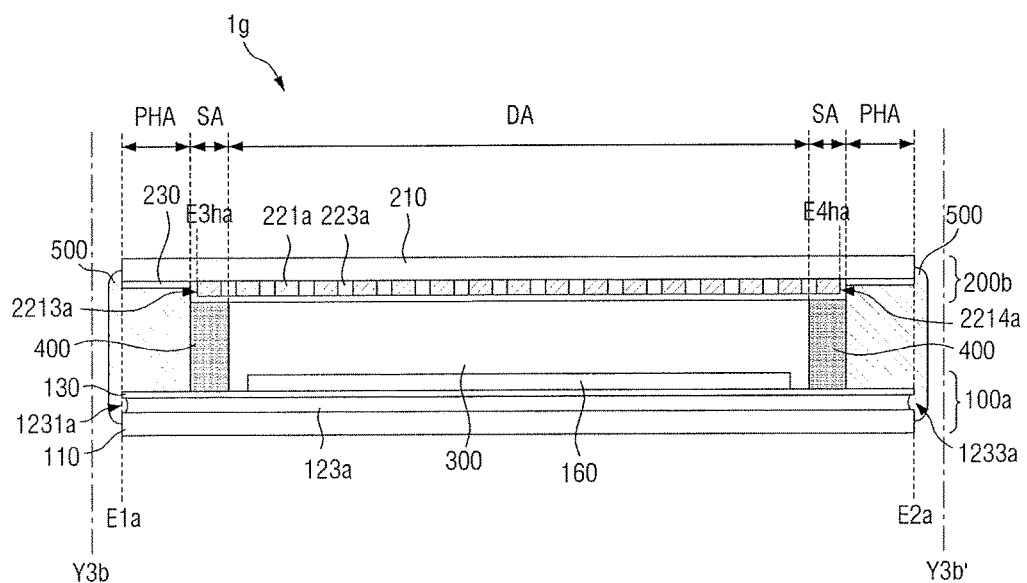
FIG. 44 illustrates a cross-sectional view of the display device according to the embodiment, taken along the line Y3$b$-Y3$b$' of FIG. 36.

FIG. 42 is a cross-sectional view of a display device 1g according to an embodiment, taken along the line Y1b-Y1b' of FIG. 36. FIG. 43 is a cross-sectional view of the display device 1g according to the embodiment, taken along the line Y2b-Y2b' of FIG. 36. FIG. 44 is a cross-sectional view of the display device 1g according to the embodiment, taken along the line Y3b-Y3b' of FIG. 36.

Referring to FIGS. 42 through 44, the display device 1g according to the current embodiment is different from the display device 1f described above with reference to FIGS. 36 through 41 in that it further includes an auxiliary sealing part 500. Other components of the display device 1g according to the current embodiment are substantially identical to those of the display device 1f described above with reference to FIGS. 36 through 41.

The auxiliary sealing part 500 may be located in a peripheral area PHA of the display device 1g. The auxiliary sealing part 500 may be located at edges of a first display substrate 100a and a second display substrate 200b. The auxiliary sealing part 500 may seal a first end 1211a and a second end 1212a of each first gap 121a, and a first end 2211a and a second end 2212a of each second gap 221a. Part of the auxiliary sealing part 500 may be located in the second gaps 221a to contact a second base substrate 210 and second linear patterns 221a.

Figure 45:
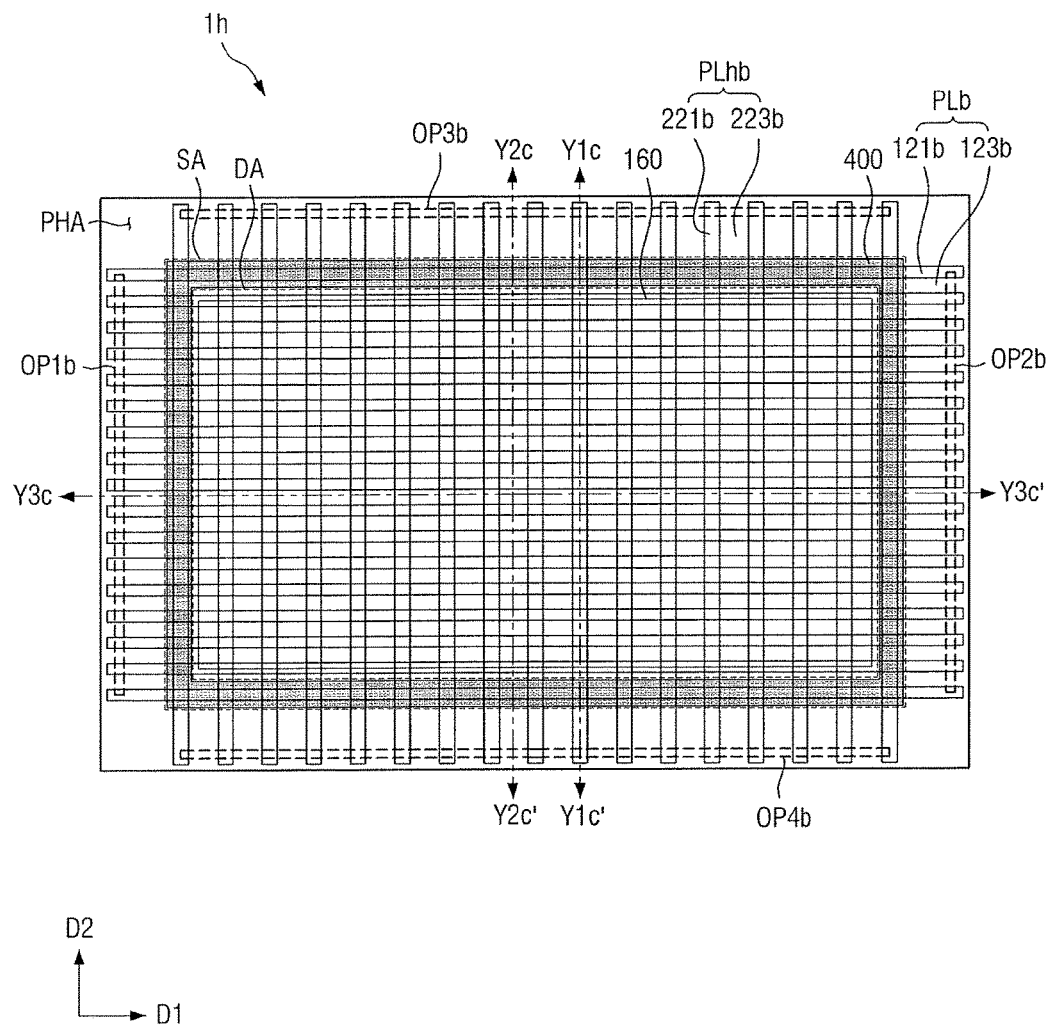
FIG. 45 illustrates a plan view of a display device according to an embodiment.
Figure 46:
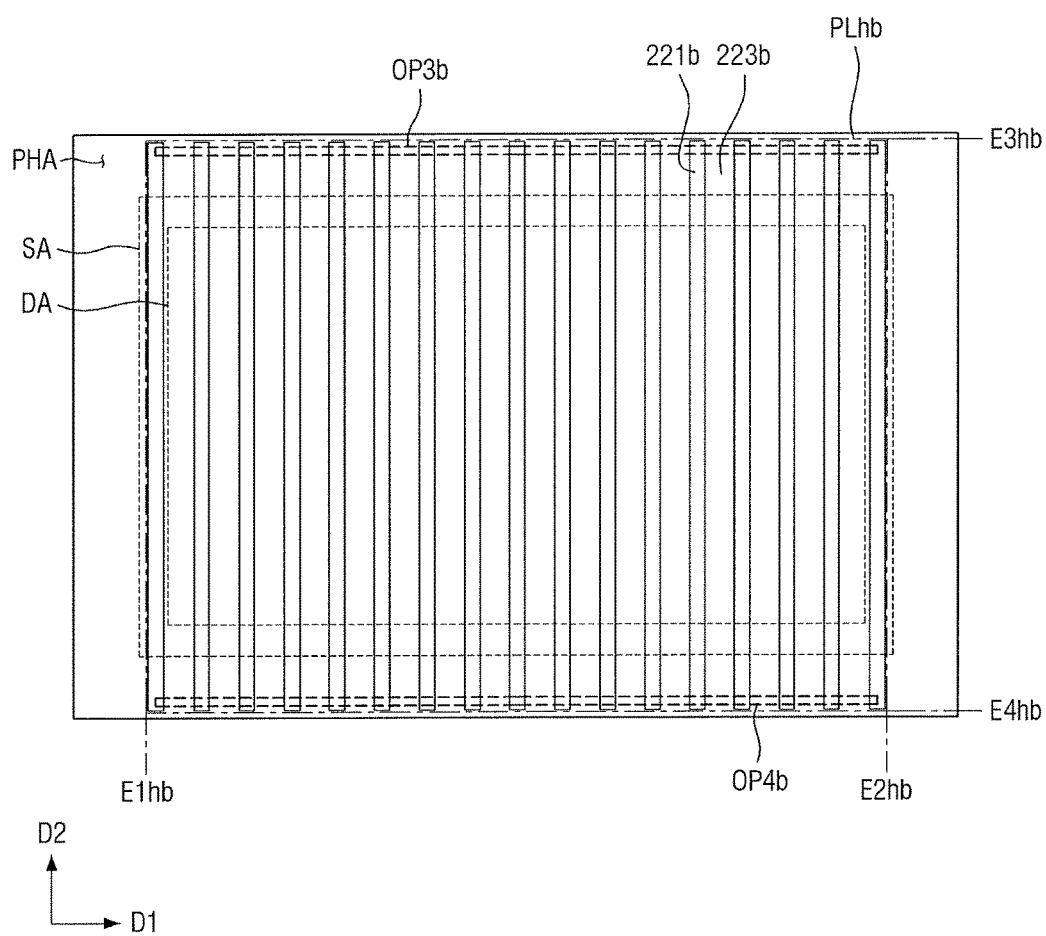
FIG. 46 illustrates a plan view of only a second polarizing element and openings of a second protective layer among components of the display device of FIG. 45.
Figure 47:
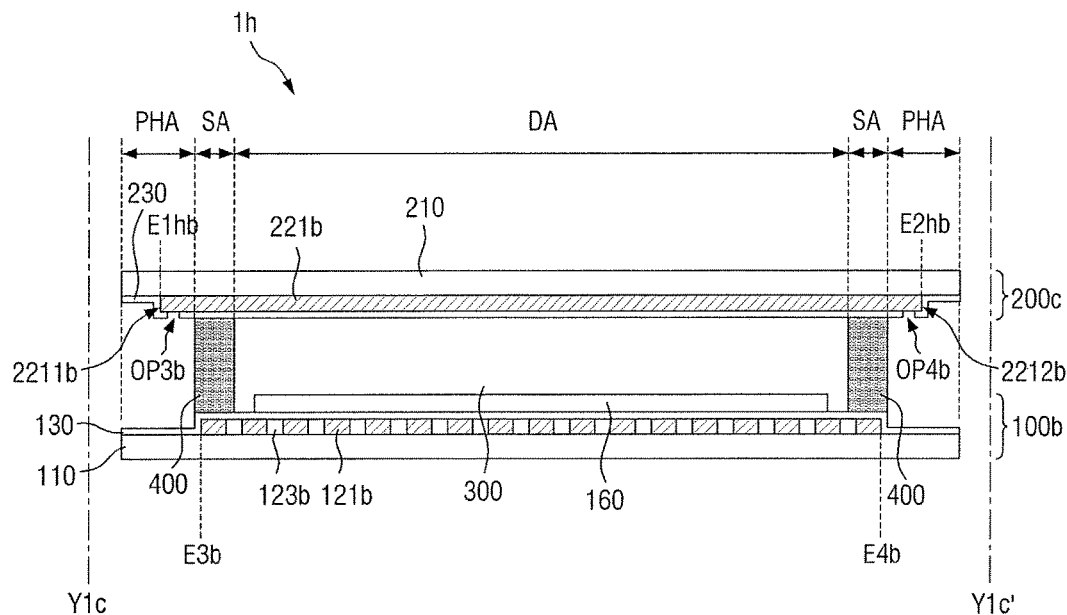
FIG. 47 illustrates a cross-sectional view taken along the line Y1$c$-Y1$c$' of FIG. 45.
Figure 48:
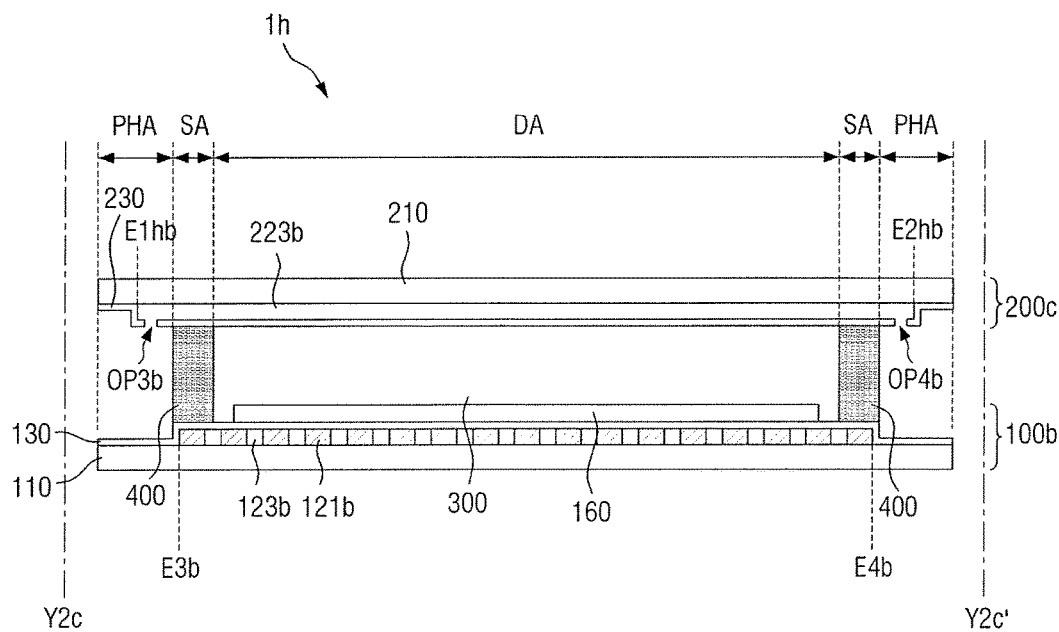
FIG. 48 illustrates a cross-sectional view taken along the line Y2$c$-Y2$c$' of FIG. 45.
Figure 49:
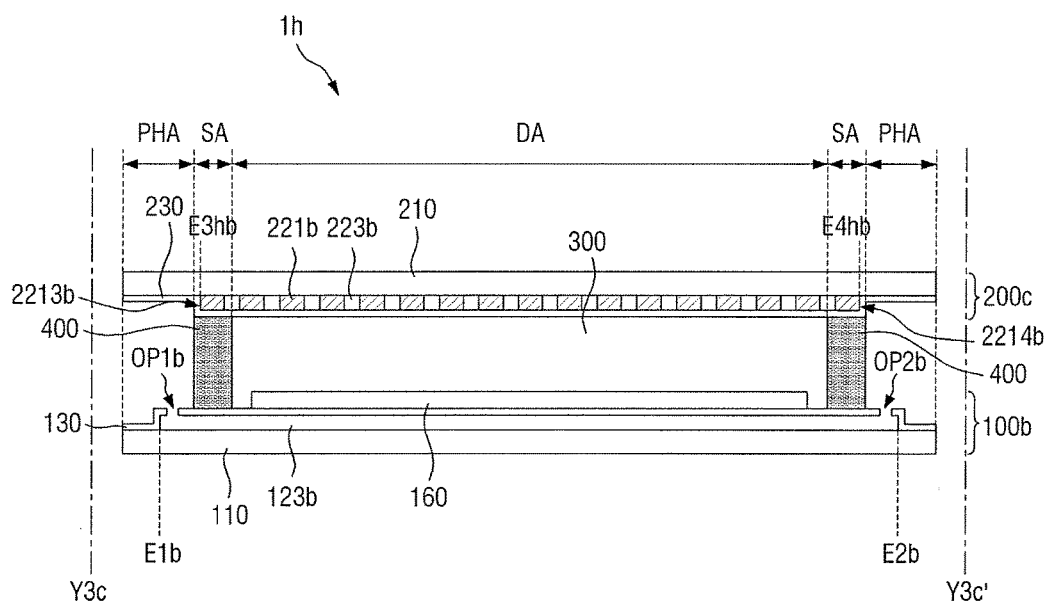
FIG. 49 illustrates a cross-sectional view taken along the line Y3$c$-Y3$c$' of FIG. 45.

FIG. 45 is a plan view of a display device 1h according to an embodiment. FIG. 46 is a plan view illustrating only a second polarizing element PLhb and openings OP3 and OP4 of a second protective layer 230 among components of the display device 1h of FIG. 45. FIG. 47 is a cross-sectional view taken along the line Y1c-Y1c' of FIG. 45. FIG. 48 is a cross-sectional view taken along the line Y2c-Y2c' of FIG. 45. FIG. 49 is a cross-sectional view taken along the line Y3c-Y3c' of FIG. 45.

Referring to FIGS. 45 through 49, the display device 1h according to the current embodiment may include the first display substrate 100b, a second display substrate 200c which faces the first display substrate 100b, the liquid crystal layer 300 between the first display substrate 100b and the second display substrate 200c, and the sealant 400 between the first display substrate 100b and the second display substrate 200c and located in a seal area SA.

The biggest difference between the display device 1h according to the current embodiment and the display device 1d described above with reference to FIGS. 28 through 32 is that the second display substrate 200c of the display device 1h includes the second polarizing element PLhb and the second protective layer 230 and that the openings OP3b and OP4b are formed in the second protective layer 230. Other components of the display device 1h according to the current embodiment are substantially identical or similar to those of the display device 1d described above with reference to FIGS. 28 through 32. Therefore, the following description will focus on differences between the display device 1h according to the current embodiment and the display device 1d described above with reference to FIGS. 28 through 32.

The second display substrate 200c will hereinafter be described. The second polarizing element PLhb may be located on a surface of a second base substrate 210 which faces the first display substrate 100b. The second polarizing element PLhb may be located not only in a display area DA and the seal area SA, but also in a peripheral area PHA.

The second polarizing element PLhb may include a plurality of second linear patterns 221b extending in a second direction D2. Each pair of neighboring second linear patterns 221b may be separated from each other by a second gap 223b along a first direction D1 intersecting the second direction D2. In addition, gas such as air may exist in the second gap 223b.

The second polarizing element PLhb may include a first edge E1hb and a second edge E2hb which are located opposite each other along the second direction D2 and a third edge E3hb and a fourth edge E4hb which are located opposite each other along the first direction D1. At least any one of the first edge E1hb and the second edge E2hb of the second polarizing element PLhb may be located in the peripheral area PHA. A case where both the first edge E1hb and the second edge E2hb of the second polarizing element PLhb are located in the peripheral area PHA will hereinafter be described as an example.

The second protective layer 230 may be located on the surface of the second base substrate 210 and the second polarizing element PLhb. The second protective layer 230 may completely cover the second polarizing element PLhb along the first direction D1 and the second direction D2. More specifically, a side surface 2211b of a second linear pattern 221b located at the first edge E1hb of the second polarizing element PLhb and a side surface 2212b of a second linear pattern 221b located at the second edge E2hb of the second polarizing element PLhb may contact the second protective layer 230. In addition, side surfaces 2213b of the second linear patterns 221b located at the third edge E3hb of the second polarizing element PLhb and side surfaces 2214b of the second linear patterns 221b located at the fourth edge E4hb of the second polarizing element PLb may contact the second protective layer 230.

The openings OP3b and OP4b located in the peripheral area PHA that expose the second gaps 223b of the second polarizing element PLhb may be formed in the second protective layer 230. The openings OP3b and OP4b of the second protective layer 230 may not be located in the seal area SA and may not overlap the sealant 400. If the openings OP3b and OP4b of the second protective layer 230 are referred to a third opening OP3b and a fourth opening OP4b, the third opening OP3b of the second protective layer 230, when seen from above, may be located between the first edge E1hb of the second polarizing element PLhb and the seal area SA, and the fourth opening OP4b of the second protective layer 230, when seen from above, may be located between the second edge E2hb of the second polarizing element PLhb and the seal area SA. Each of the third and fourth openings OP3b and OP4b of the second protective layer 230 may extend along the first direction D1 and overlap each of the second gaps 223b.

In the case of the display device 1h according to the current embodiment, air within each first gap 123b may be released through openings OP1b and OP2b of a first protective layer 130 during the process of bonding the first display substrate 100b and the second display substrate 200c together. Similarly, air within each second gap 223b may be released through the openings OP3b and OP4b of the second protective layer 230. Therefore, it is possible to prevent outgassing from occurring in the process of bonding the first display substrate 100b and the second display substrate 200c.

Figure 50:
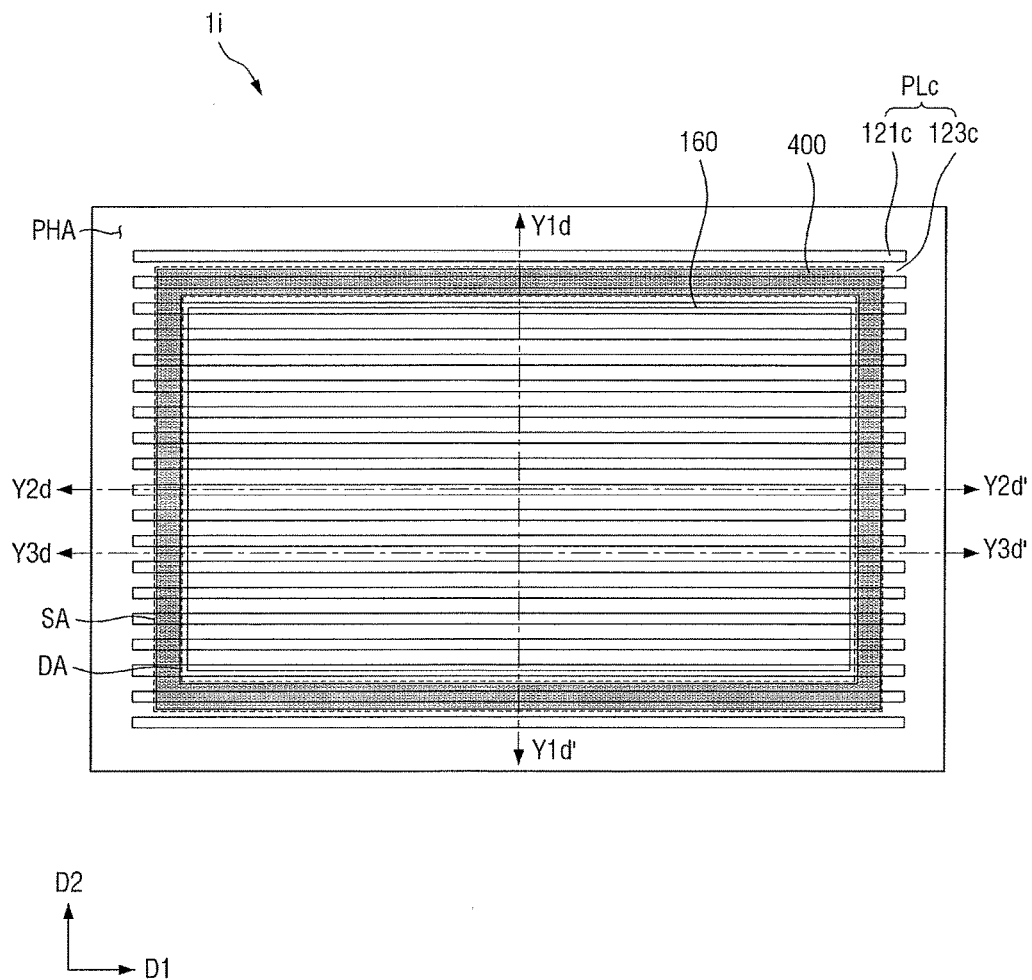
FIG. 50 illustrates a plan view of a display device according to an embodiment.
Figure 51:
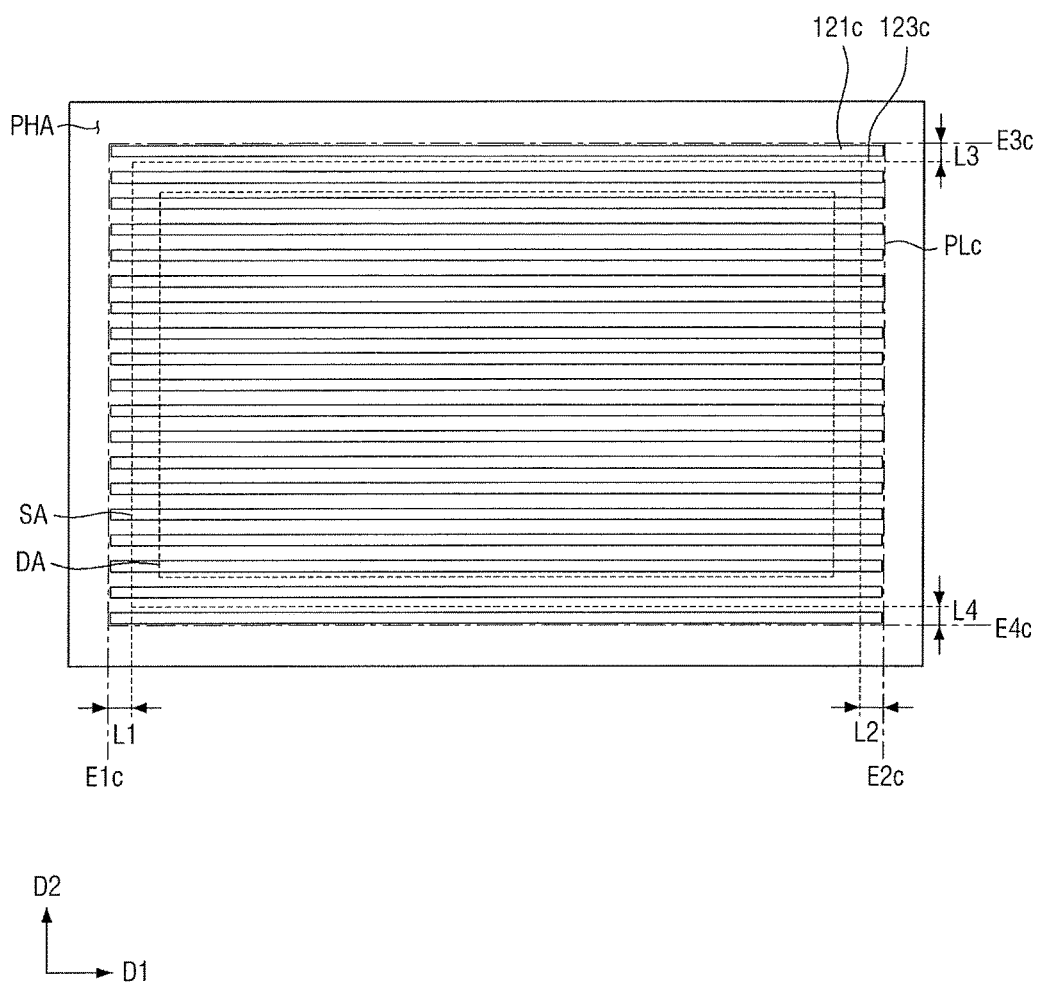
FIG. 51 illustrates a plan view of only a first polarizing element among components of the display device of FIG. 50.
Figure 52:
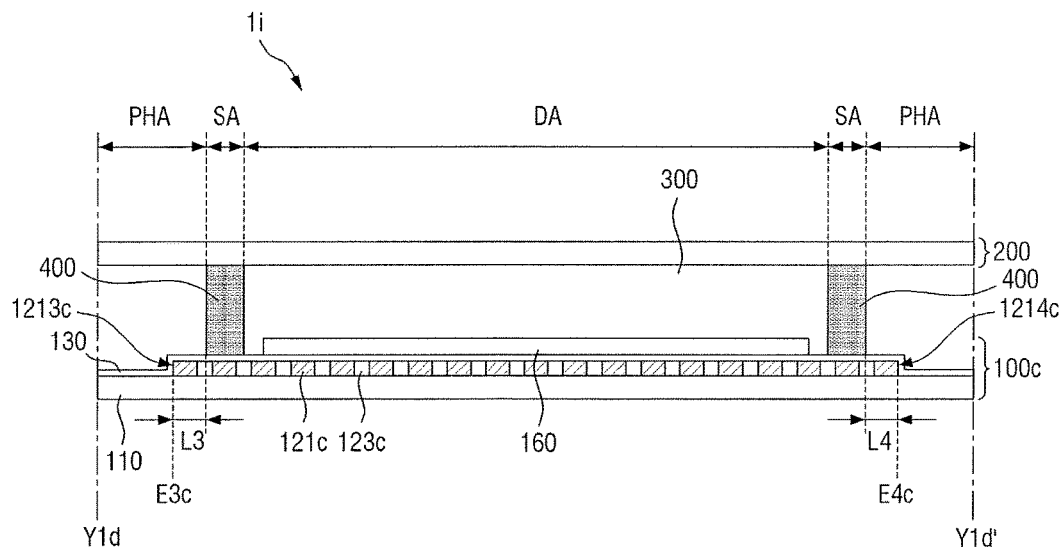
FIG. 52 illustrates a cross-sectional view taken along the line Y1$d$-Y1$d$' of FIG. 50.
Figure 53:
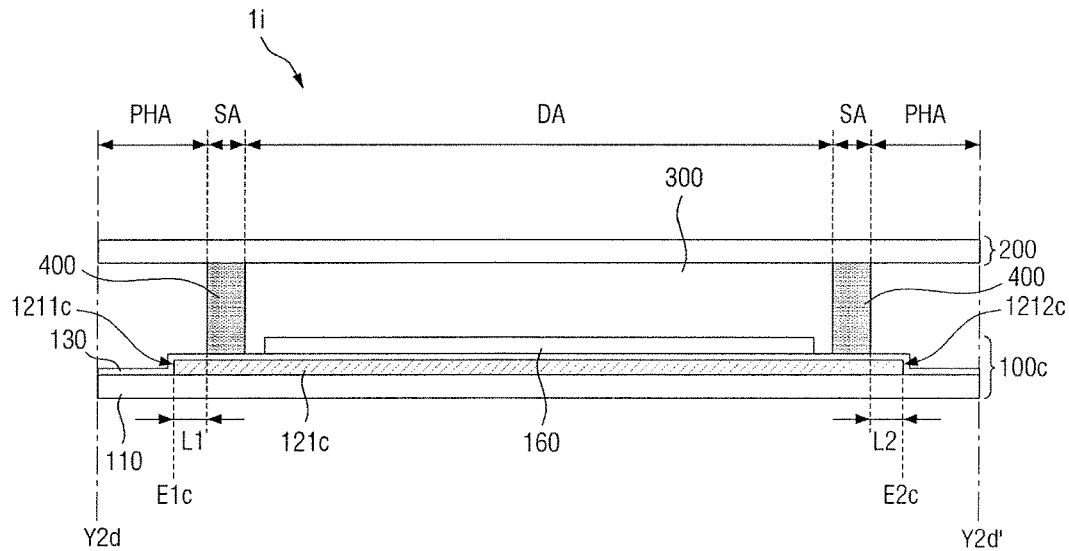
FIG. 53 illustrates a cross-sectional view taken along the line Y2$d$-Y2$d$' of FIG. 50.
Figure 54:
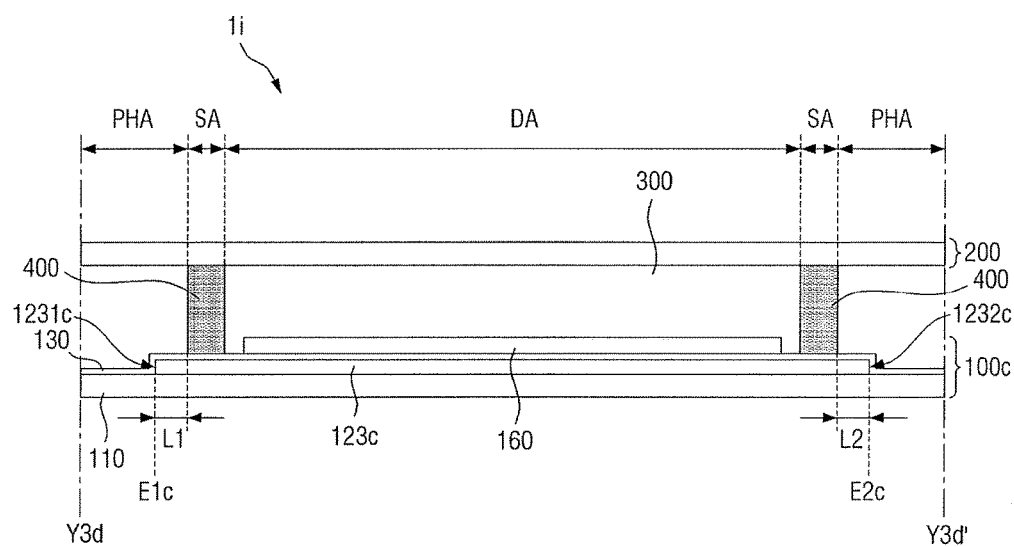
FIG. 54 illustrates a cross-sectional view taken along the line Y3$d$-Y3$d$' of FIG. 50.

FIG. 50 is a plan view of a display device 1i according to an embodiment. FIG. 51 is a plan view illustrating only a first polarizing element PLc among components of the display device 1i of FIG. 50. FIG. 52 is a cross-sectional view taken along the line Y1d-Y1d' of FIG. 50. FIG. 53 is a cross-sectional view taken along the line Y2d-Y2d' of FIG. 50. FIG. 54 is a cross-sectional view taken along the line Y3d-Y3d' of FIG. 50.

Referring to FIGS. 50 through 54, the display device 1i according to the current embodiment may include a first display substrate 100c, the second display substrate 200 which faces the first display substrate 100c, the liquid crystal layer 300 between the first display substrate 100c and the second display substrate 200, and the sealant 400 between the first display substrate 100c and the second display substrate 200 and located in a seal area SA.

The biggest difference between the display device 1i according to the current embodiment and the display device 1d described above with reference to FIGS. 28 through 32 is that no openings are formed in a first protective layer 130 of the first display substrate 100c. Other components of the display device 1i according to the current embodiment are substantially identical or similar to those of the display device 1d described above with reference to FIGS. 28 through 32. Therefore, the following description will focus on differences between the display device 1i according to the current embodiment and the display device 1d described above with reference to FIGS. 28 through 32.

The first display substrate 100c will hereinafter be described. A first polarizing element PLc may be located on a first base substrate 110. The first polarizing element PLc may include a plurality of first linear patterns 121c extending in a first direction D1. Each pair of neighboring first linear patterns 121c may be separated from each other by a first gap 123c along a second direction D2 intersecting the first direction D1. In addition, gas such as air may exist in the first gap 123c.

The first polarizing element PLc may include a first edge E1c and a second edge E2c located opposite each other along the first direction D1 in which the first linear patterns 121c extend, and a third edge E3c and a fourth edge E4c located opposite each other along the second direction D2 intersecting the direction in which the first linear patterns 121c extend.

The first protective layer 130 may be located on the first base substrate 110 and the first polarizing element PLc. The first protective layer 130 may completely cover the first polarizing element PLc. More specifically, side surfaces 1211c of the first linear patterns 121c located at the first edge E1c of the first polarizing element PLc may contact the first protective layer 130. In addition, side surfaces 1212c of the first linear patterns 121c located at the second edge E2c of the first polarizing element PLc may contact the first protective layer 130. In addition, a first end 1231c of each of the first gaps 123c located at the first edge E1c of the first polarizing element PLc may be sealed by the first protective layer 130. Likewise, a second end 1232c of each of the first gaps 123c located at the second edge E2c of the first polarizing element PLc may be sealed by the first protective layer 130.

In addition, a side surface 1213c of a first linear pattern 121c located at the third edge E3c of the first polarizing element PLc and a side surface 1214c of a first linear pattern 121 located at the fourth edge E4c of the first polarizing element PLc may contact the first protective layer 130. That is, the first protective layer 130 may completely cover the first polarizing element PLc along the first direction D1 and the second direction D2. At least one of the first edge E1c, the second edge E2c, the third edge E3c and the fourth edge E4c of the first polarizing element PLc may be located in a peripheral area PHA.

The first polarizing element PLc may be formed by a nanoimprint process. For example, the first polarizing element PLc may be formed by forming a metal layer on the first base substrate 110, coating resin on the metal layer, transferring patterns onto the resin using an imprint mold, and etching the metal layer using the resin having the transferred patterns as a mask. In the above nanoimprint process, the resin may be pushed toward the edge side in the pattern transfer process, or the patterns may not be transferred with uniform pressure. For such reasons, the first linear patterns 121c may be formed non-uniformly on the edge side of the first polarizing element PLc. In this case, if the first polarizing element PLc is covered with the first protective layer 130, outgassing may occur, that is, gas may be released out of the first protective layer 130 on the edge side of the first polarizing element PLc. That is, the probability of outgassing may be relatively higher on the edge side of the first polarizing element PLc than in other parts.

In the current embodiment, the first through fourth edges E1c through E4c of the first polarizing element PLc with a relatively high probability of outgassing may be disposed not in a display area DA but in the peripheral area PHA. Accordingly, even if outgassing occurs on the edge side of the first polarizing element P1c, it may not affect the liquid crystal layer 300 of the display area DA. Consequently, the reliability of the display device 1i can be improved. Further, since the first protective layer 130 completely covers the first polarizing element PLc, the probability of corrosion of the first polarizing element PLc can be reduced.

Hereinafter, a case where the first edge E1c, the second edge E2c, the third edge E3c and the fourth edge E4c of the first polarizing element PLc are all located in the peripheral area PHA will be described as an example. When seen from above, a distance L1 between the first edge E1c of the first polarizing element PLc and the seal area SA or the sealant 400 may be 5 micrometers or more. Similarly, a distance L2 between the second edge E2c and the seal area SA, a distance L3 between the third edge E3c and the seal area SA, and a distance L4 between the fourth edge E4c and the seal area SA may be 5 micrometers or more. Since the distances between the first through fourth edges E1c through E4c of the first polarizing element PLc and the seal area SA are 5 micrometers or more, even if outgassing occurs at the first through fourth edges E1c through E4c of the first polarizing element PLc, the effect of outgassed gas on the liquid crystal layer 300 can be minimized.

Figure 55:
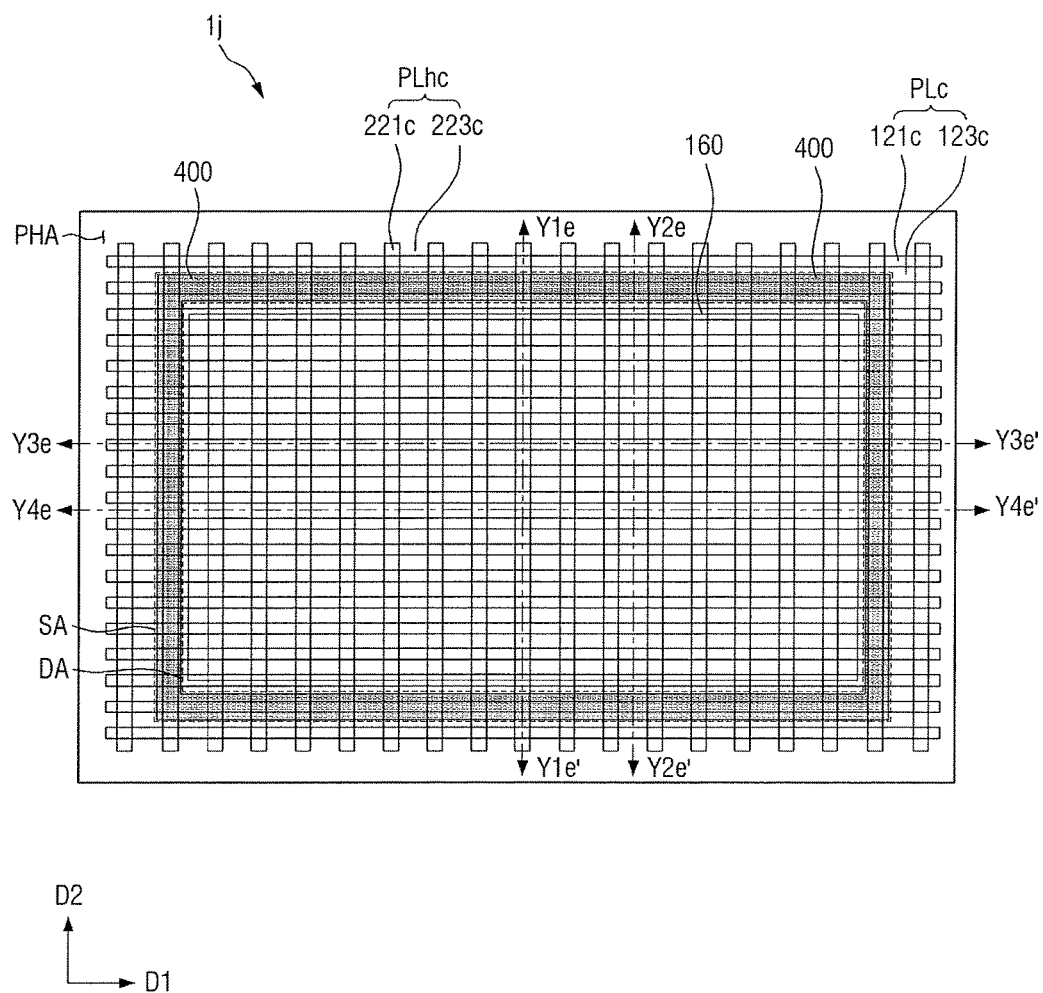
FIG. 55 illustrates a plan view of a display device according to an embodiment.
Figure 56:
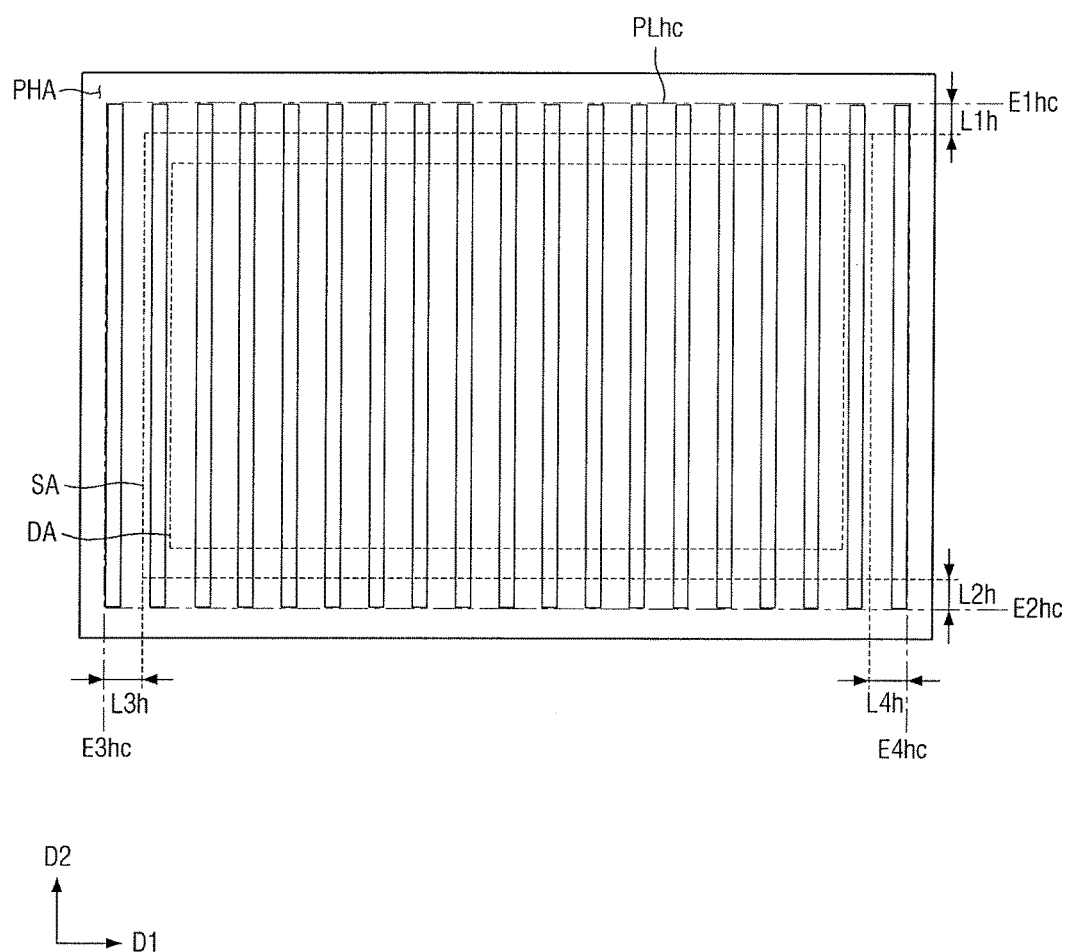
FIG. 56 illustrates a plan view illustrating only a second polarizing element among components of the display device of FIG. 55.
Figure 57:
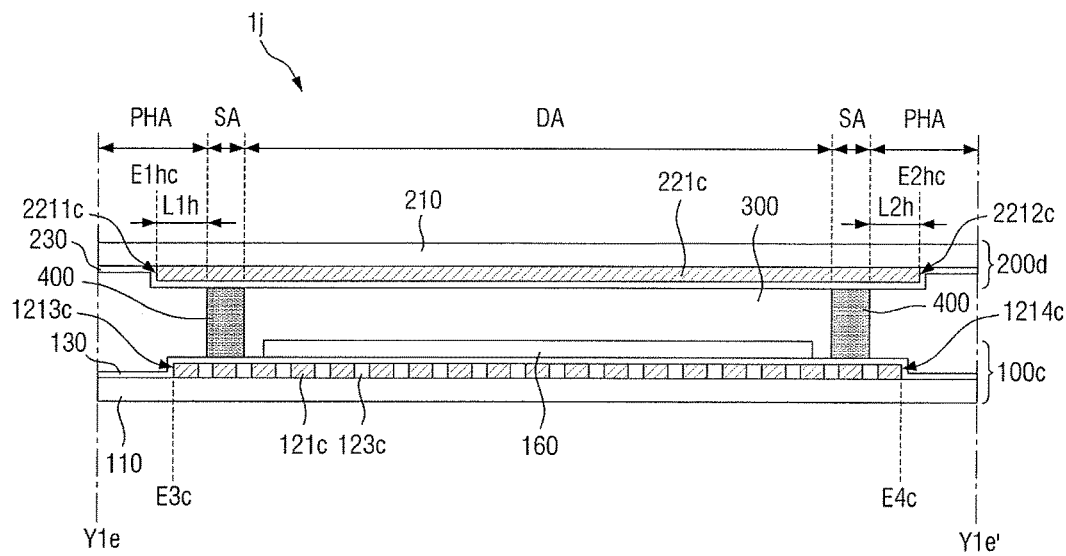
FIG. 57 illustrates a cross-sectional view taken along the line Y1$e$-Y1$e$' of FIG. 55.
Figure 58:
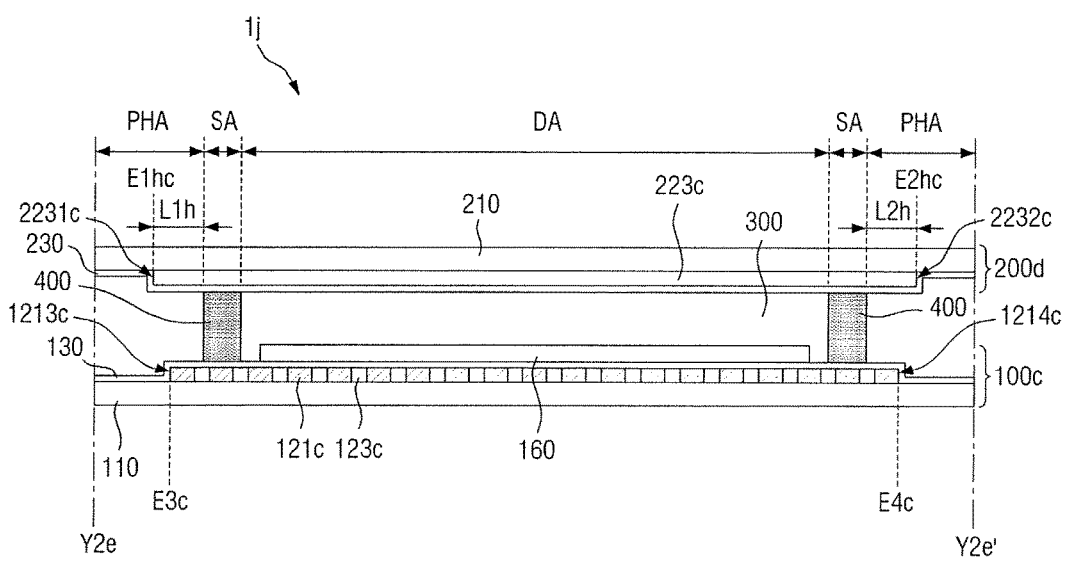
FIG. 58 illustrates a cross-sectional view taken along the line Y2$e$-Y2$e$' of FIG. 55.
Figure 59:
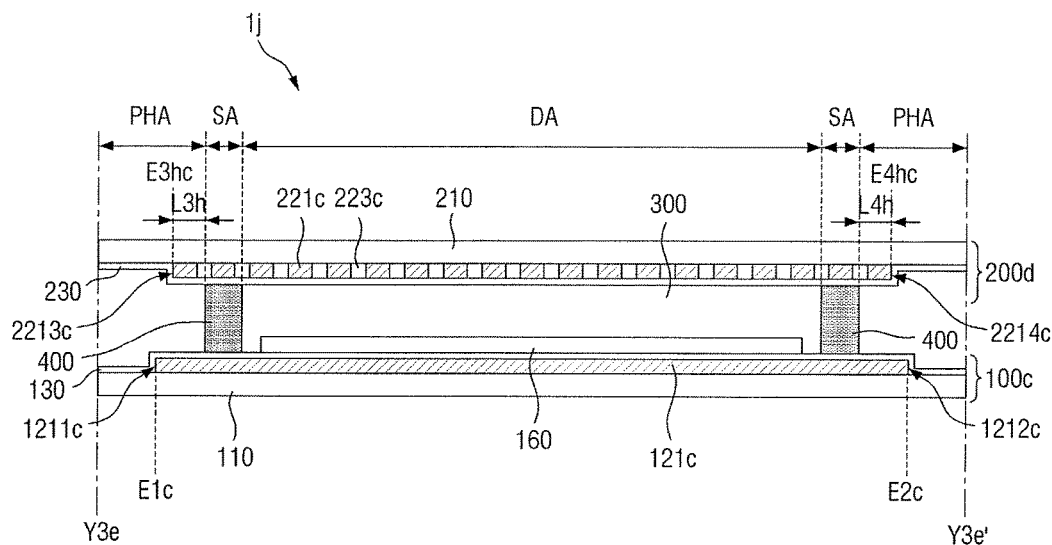
FIG. 59 illustrates a cross-sectional view taken along the line Y3$e$-Y3$e$' of FIG. 55.
Figure 60:
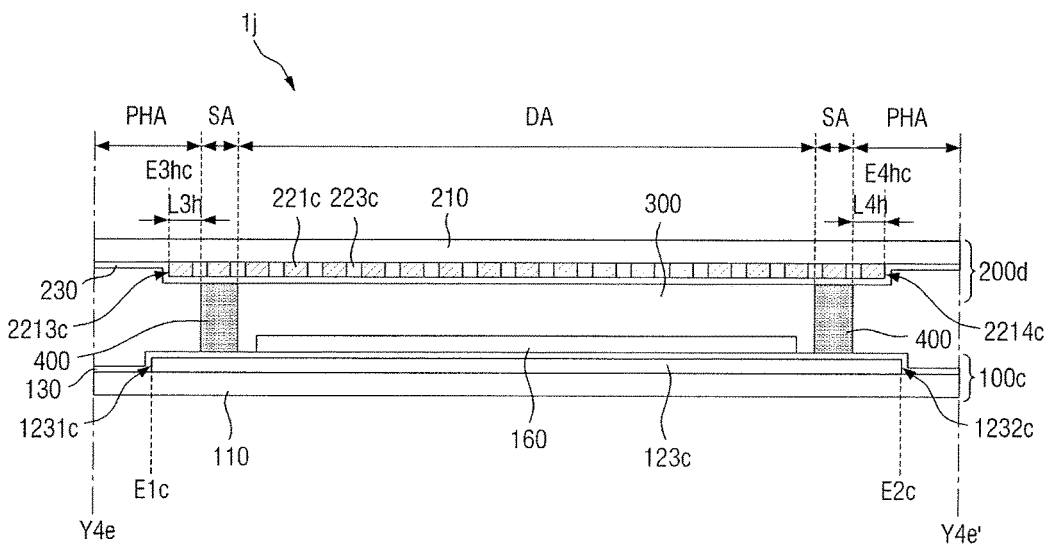
FIG. 60 illustrates a cross-sectional view taken along the line Y4$e$-Y4$e$' of FIG. 55.

FIG. 55 is a plan view of a display device 1j according to an embodiment. FIG. 56 is a plan view illustrating only a second polarizing element PLhc among components of the display device 1j of FIG. 55. FIG. 57 is a cross-sectional view taken along the line Y1e-Y1e' of FIG. 55. FIG. 58 is a cross-sectional view taken along the line Y2e-Y2e' of FIG. 55. FIG. 59 is a cross-sectional view taken along the line Y3e-Y3e' of FIG. 55. FIG. 60 is a cross-sectional view taken along the line Y4e-Y4e' of FIG. 55.

Referring to FIGS. 55 through 60, the display device 1j according to the current embodiment may include the first display substrate 100c, a second display substrate 200d which faces the first display substrate 100c, the liquid crystal layer 300 between the first display substrate 100c and the second display substrate 200d, and the sealant 400 between the first display substrate 100c and the second display substrate 200d and located in a seal area SA.

The biggest difference between the display device 1j according to the current embodiment and the display device 1i described above with reference to FIGS. 50 through 54 is that the second display substrate 100d includes the second polarizing element PLhc and a second protective layer 230. Other components of the display device 1j according to the current embodiment are substantially identical or similar to those of the display device 1i described above with reference to FIGS. 50 through 54. Therefore, the following description will focus on differences between the display device 1j according to the current embodiment and the display device 1i described above with reference to FIGS. 50 through 54.

The second display substrate 200d will hereinafter be described. The second polarizing element PLhc may be located on a surface of a second base substrate 210 which faces the first display substrate 100c.

The second polarizing element PLhc may include a plurality of second linear patterns 221c extending in a second direction D2. Each pair of neighboring second linear patterns 221c may be separated from each other by a second gap 223c along a first direction D1 intersecting the second direction D2. In addition, gas such as air may exist in the second gap 223c.

The second polarizing element PLhc may include a first edge E1hc and a second edge E2hc which are located opposite each other along the second direction D2 and a third edge E3hc and a fourth edge E4hc which are located opposite each other along the first direction D1.

The second protective layer 230 may be located on the surface of the second base substrate 210 and the second polarizing element PLhc. The second protective layer 230 may completely cover the second polarizing element PLhc along the first direction D1 and the second direction D2. More specifically, side surfaces 2211c of the second linear patterns 221c located at the first edge E1hc of the second polarizing element PLhc and side surfaces 2212c of the second linear patterns 221c located at the second edge E2hc of the second polarizing element PLhc may contact the second protective layer 230. In addition, a first end 2231c of each of the second gaps 223c located at the first edge E1hc of the second polarizing element PLhc may be sealed by the second protective layer 230. Likewise, a second end 2232c of each of the second gaps 223c which is located at the second edge E2hc of the second polarizing element PLhc may be sealed by the second protective layer 230. In addition, a side surface 2213c of a second linear pattern 221c located at the third edge E3hc of the second polarizing element PLhc and a side surface 2214c of a second linear pattern 221c located at the fourth edge E4hc of the second polarizing element PLhc may contact the second protective layer 230.

Like a first polarizing element PLc, the second polarizing element PLhc has a high probability of outgassing on its edge side. In the current embodiment, the first through fourth edges E1hc through E4hc of the second polarizing element PLhc with a high probability of outgassing may be disposed not in a display area DA but in a peripheral area PHA. Accordingly, even if outgassing occurs, that is, even if gas within each of the second gaps 223c is released out of the second protective layer 230, it may not affect the liquid crystal layer 300 of the display area DA. Further, since the second protective layer 230 completely covers the second polarizing element PLhc, the probability of corrosion of the second polarizing element PLhc can be reduced.

Hereinafter, a case where the first edge E1$hc$, the second edge E2$hc$, the third edge E3$hc$ and the fourth edge E4$hc$ of the second polarizing element PLhc are all located in the peripheral area PHA will be described as an example. When seen from above, a distance L1$h$ between the first edge E1$hc$ of the second polarizing element PLhc and the seal area SA or the sealant 400 may be 5 micrometers or more. Similarly, a distance L2$h$ between the second edge E2$hc$ and the seal area SA, a distance L3$h$ between the third edge E3$hc$ and the seal area SA, and a distance L4$h$ between the fourth edge E4$hc$ and the seal area SA may be 5 micrometers or more. Accordingly, the effect of outgassed gas on the liquid crystal layer 300 can be minimized.

In embodiments other than the above-described embodiments, a display device may include any one of the above-described first display substrates 100, 100*a*, 100*b*, and 100*c* and any one of the above-described second display substrates 200, 200*a*, 200*b*, 200*c*, and 200*d*. Alternatively, in embodiments other than the above-described embodiments, a display device may include a first display substrate without a polarizing element and any one of the second display substrates 200, 200*a*, 200*b*, 200*c*, and 200*d* described above. That is, various combinations of a first display substrate and a second display substrate are possible in addition to the above-described structures.

According to one or more embodiments, a display device includes a polarizing element having a plurality of linear patterns. Therefore, the display device is thinner than a display device to which a conventional polarizing plate is attached.

In addition, according to one or more embodiments, it is possible to prevent outgassing from occurring due to gas within each gap of the polarizing element. Therefore, a display device with improved reliability can be provided.

Further, according to one or more embodiments, even if outgassing occurs in the polarizing element, it is possible to prevent outgassed gas from affecting a liquid crystal layer. Accordingly, a display device with improved reliability can be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device including a display area and a seal area which surrounds the display area, the display device comprising:
   a first display substrate that includes
      a first base substrate,
      a first polarizing element including a plurality of first linear patterns extending in a first direction on the first base substrate in the display area, and
      a first protective layer on the first polarizing element and including a first opening;
   a second display substrate facing the first display substrate; and
   a sealant between the first display substrate and the second display substrate, disposed in the seal area, and covering the first opening,
   wherein adjacent first linear patterns are separated from each other in a second direction, intersecting the first direction, by a first gap, and the first opening overlaps at least a portion of the first gap in the seal area.

2. The display device as claimed in claim 1, wherein a space inside the first gap is in a vacuum state.

3. The display device as claimed in claim 1, wherein the sealant contacts the first linear patterns or the first base substrate through the first opening.

4. The display device as claimed in claim 1, wherein the first opening extends along the second direction.

5. The display device as claimed in claim 1, wherein the first opening includes a plurality of sub-openings which are separated from each other along the second direction.

6. The display device as claimed in claim 1, wherein:
   the first polarizing element includes a first edge and a second edge opposite each other along the first direction, and
   side surfaces of the first linear patterns at the first edge and side surfaces of the first linear patterns at the second edge contact the first protective layer.

7. The display device as claimed in claim 6, wherein:
   the first polarizing element further includes a third edge and a fourth edge located opposite each other along a second direction, and
   a side surface of a first linear pattern at the third edge and a side surface of a first linear pattern at the fourth edge contact the first protective layer.

8. The display device as claimed in claim 1, wherein the first display substrate further includes a pixel unit in the display area and on the first protective layer.

9. A display device including a display area and a seal area which surrounds the display area, the display device comprising:
   a first display substrate that includes
      a first base substrate,
      a first polarizing element including a plurality of first linear patterns extending in a first direction on the first base substrate, and
      a first protective layer on the first polarizing element and including a first opening;
   a second display substrate facing the first display substrate; and
   a sealant between the first display substrate and the second display substrate, disposed in the seal area, and covering the first opening,
   wherein adjacent first linear patterns are separated from each other in a second direction, intersecting the first direction, by a first gap, and the first opening overlaps at least a portion of the first gap in the seal area,
   wherein:
      the second display substrate includes
         a second base substrate,
         a second polarizing element including a plurality of second linear patterns extending along the second direction on a surface of the second base substrate which faces the first display substrate, and
         a second protective layer on the second polarizing element and covering the second polarizing element, and
      adjacent second linear patterns are separated from each other along the first direction by a second gap, and a second opening, which exposes at least one second gap, is in the second protective layer in the seal area, and the sealant covers the second opening.

10. The display device as claimed in claim 9, wherein the second opening extends along the first direction.

11. The display device as claimed in claim 9, wherein the second opening includes a plurality of sub-openings separated from each other along the first direction.

12. A display device including a display area, a seal area which surrounds the display area and a peripheral area which surrounds the seal area, the display device comprising:
a first display substrate including
a first base substrate,
a first polarizing element including a plurality of first linear patterns extending in a first direction on the first base substrate in the display area, and
a first protective layer on the first polarizing element;
a second display substrate facing the first display substrate; and
a sealant between the first display substrate and the second display substrate in the seal area,
wherein adjacent first linear patterns are separated from each other along a second direction, intersecting the first direction, by a first gap, and at least one edge of the first polarizing element is in the peripheral area, and at least a portion of the first gap is exposed in the peripheral area.

13. The display device as claimed in claim 12, wherein air exists in the first gap.

14. A display device including a display area, a seal area which surrounds the display area and a peripheral area which surrounds the seal area, the display device comprising:
a first display substrate including
a first base substrate,
a first polarizing element including a plurality of first linear patterns extending in a first direction on the first base substrate, and
a first protective layer on the first polarizing element;
a second display substrate facing the first display substrate; and
a sealant between the first display substrate and the second display substrate in the seal area,
wherein adjacent first linear patterns are separated from each other along a second direction, intersecting the first direction, by a first gap, and at least one edge of the first polarizing element is in the peripheral area, wherein:
the first polarizing element includes a first edge and a second edge opposite each other along the first direction,
the first edge is in the peripheral area,
side surfaces of the first linear patterns at the first edge do not contact the first protective layer, and
a first end of the first gap at the first edge exposed by the first protective layer.

15. The display device as claimed in claim 14, wherein:
the second edge is in the peripheral area,
side surfaces of the first linear patterns at the second edge do not contact the first protective layer, and
a second end of the first gap at the second edge is exposed by the first protective layer.

16. The display device as claimed in claim 14, wherein:
the first polarizing element further includes a third edge and a fourth edge in the peripheral area opposite each other along a second direction intersecting the first direction, and
a side surface of a first linear pattern at the third edge and a side surface of a first linear pattern at the fourth edge contact the first protective layer.

17. The display device as claimed in claim 14, further comprising an auxiliary sealing part in the peripheral area that seals the first end of the first gap.

18. The display device as claimed in claim 12, wherein a first opening in the first protective layer in the peripheral area exposes the portion of the first gap.

19. The display device as claimed in claim 18, wherein the first opening extends along the second direction.

20. The display device as claimed in claim 18, wherein:
the first polarizing element includes a first edge and a second edge opposite each other along the first direction,
the first edge is in the peripheral area, and
the first opening is between the first edge and the seal area in plan view.

21. The display device as claimed in claim 20, wherein side surfaces of the first linear patterns at the first edge contact the first protective layer.

22. The display device as claimed in claim 12, wherein:
the first polarizing element includes a first edge and a second edge opposite each other along the first direction,
the first edge and the second edge are in the peripheral area, and
side surfaces of the first linear patterns at the first edge and side surfaces of the first linear patterns disposed at the second edge contact the first protective layer.

23. A display device including a display area, a seal area which surrounds the display area and a peripheral area which surrounds the seal area, the display device comprising:
a first display substrate including
a first base substrate,
a first polarizing element including a plurality of first linear patterns extending in a first direction on the first base substrate, and
a first protective layer on the first polarizing element;
a second display substrate facing the first display substrate; and
a sealant between the first display substrate and the second display substrate in the seal area,
wherein adjacent first linear patterns are separated from each other along a second direction, intersecting the first direction, by a first gap, and at least one edge of the first polarizing element is in the peripheral area, wherein:
the first polarizing element includes a first edge and a second edge opposite each other along the first direction, and a third edge and a fourth edge in the peripheral area opposite each other along the second direction,
the first edge and the second edge are in the peripheral area,
side surfaces of the first linear patterns at the first edge and side surfaces of the first linear patterns disposed at the second edge contact the first protective layer, and
a side surface of a first linear pattern disposed at the third edge and a side surface of a first linear pattern disposed at the fourth edge contact the first protective layer.

24. The display device as claimed in claim 12, wherein the first display substrate further includes a pixel unit in the display area and on the first protective layer.

25. A display device including a display area, a seal area which surrounds the display area and a peripheral area which surrounds the seal area, the display device comprising:
- a first display substrate including
  - a first base substrate,
  - a first polarizing element including a plurality of first linear patterns extending in a first direction on the first base substrate, and
  - a first protective layer on the first polarizing element;
- a second display substrate facing the first display substrate; and
- a sealant between the first display substrate and the second display substrate in the seal area, wherein adjacent first linear patterns are separated from each other along a second direction, intersecting the first direction, by a first gap, and at least one edge of the first polarizing element is in the peripheral area, wherein:

the second display substrate includes
- a second base substrate,
- a second polarizing element including a plurality of second linear patterns extending along a second direction on a surface of the second base substrate that faces the first display substrate, and
- a second protective layer on the second polarizing element, and the second linear patterns are separated from each other along the first direction by a second gap, and at least one edge of the second polarizing element is in the peripheral area.

* * * * *